(12) United States Patent
Kato et al.

(10) Patent No.: US 8,918,613 B2
(45) Date of Patent: Dec. 23, 2014

(54) STORAGE APPARATUS AND DATA MANAGEMENT METHOD FOR STORAGE AREA ALLOCATION BASED ON ACCESS FREQUENCY

(75) Inventors: Tomoyuki Kato, Odawara (JP); Masami Maeda, Odawara (JP); Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 13/061,651

(22) PCT Filed: Feb. 2, 2011

(86) PCT No.: PCT/JP2011/000587
§ 371 (c)(1),
(2), (4) Date: Mar. 1, 2011

(87) PCT Pub. No.: WO2012/104912
PCT Pub. Date: Aug. 9, 2012

(65) Prior Publication Data
US 2012/0198151 A1    Aug. 2, 2012

(51) Int. Cl.
*G06F 12/00* (2006.01)
*G06F 3/06* (2006.01)
*G06F 17/30* (2006.01)

(52) U.S. Cl.
CPC ............ *G06F 3/0605* (2013.01); *G06F 3/0689* (2013.01); *G06F 3/067* (2013.01); *G06F 3/0649* (2013.01); *G06F 3/0653* (2013.01); *G06F 3/0665* (2013.01); *G06F 17/30091* (2013.01)
USPC ................ 711/165; 711/5; 711/117; 711/158

(58) Field of Classification Search
CPC ...... G06F 12/0607; G06F 12/08; G06F 13/18
USPC ...................... 711/5, 117, 158, 165
See application file for complete search history.

(56) References Cited

U.S. PATENT DOCUMENTS

| 5,956,750 A | 9/1999 | Yamamoto et al. |
| 8,321,646 B2 * | 11/2012 | Davies .......................... 711/165 |

(Continued)

FOREIGN PATENT DOCUMENTS

| JP | 2000-293317 A | 10/2000 |
| JP | 2005-108061 A | 4/2005 |

(Continued)

OTHER PUBLICATIONS

PCT International Search Report and Written Opinion on application No. PCT/JP2011/000587 mailed Oct. 28, 2011; 10 pages.

(Continued)

*Primary Examiner* — Gurtej Bansal
(74) *Attorney, Agent, or Firm* — Foley & Lardner LLP

(57) ABSTRACT

Provided are a storage apparatus and data management method with which the usage ratio of each of the storage tiers is determined beforehand for each virtual volume and data can be managed by being migrated between storage tiers within a range of predetermined usage ratios.

A storage apparatus 5, comprising storage devices 30 of a plurality of types of varying performance; and a controller 31 which manages each of storage areas provided by the storage devices 30 of a plurality of types by means of storage tiers ST of a plurality of different types respectively, and which assigns the storage areas in page units to virtual volumes VVOL from any storage tier among the storage tiers ST of a plurality of types, the controller 31 managing usage ratios of the storage tiers ST of a plurality of types and assigning the storage areas in page units to the virtual volumes VVOL based on the usage ratio managed.

13 Claims, 47 Drawing Sheets

(56) References Cited

U.S. PATENT DOCUMENTS

| | | | |
|---|---|---|---|
| 2002/0156944 A1* | 10/2002 | Benhase et al. | 710/8 |
| 2005/0125566 A1* | 6/2005 | Szolyga et al. | 710/1 |
| 2006/0173969 A1* | 8/2006 | Wilson | 709/215 |
| 2006/0242112 A1* | 10/2006 | Hikita | 707/1 |
| 2006/0288159 A1 | 12/2006 | Haruna et al. | |
| 2008/0104350 A1* | 5/2008 | Shimizu et al. | 711/165 |
| 2008/0168253 A1* | 7/2008 | Garrison | 711/202 |
| 2009/0276569 A1 | 11/2009 | Yamamoto et al. | |
| 2010/0023566 A1* | 1/2010 | Minamino et al. | 707/205 |
| 2010/0115222 A1 | 5/2010 | Usami | |
| 2011/0106862 A1* | 5/2011 | Mamidi et al. | 707/823 |

FOREIGN PATENT DOCUMENTS

| | | |
|---|---|---|
| JP | 2006-350780 A | 12/2006 |
| JP | 2010-108341 A | 5/2010 |
| WO | WO 2010/087803 A1 | 8/2010 |

OTHER PUBLICATIONS

Fast and Virtual LUN for Oracle Database and EMC Symmetrix V-Max with Enginuity 5874—Applied Technology; Apr. 2010; pp. 1-34; EMC Corporation.

Japan Patent Office action on application 2013-523403 dated Jan. 28, 2014; pp. 1-2 with partial English translation.

* cited by examiner

FIG. 6

<VIRTUAL VOLUME ASSIGNMENT
POOL PAGE MANAGEMENT TABLE>                                  36

| VIRTUAL VOLUME ID | HOST ASSIGNMENT STATUS | VIRTUAL CAPACITY | POOL ID | ASSIGNED LBA | ASSIGNED PAGE |
|---|---|---|---|---|---|
| v101 | Allocated (PID=2,LUN=1) | 10GB | Pool1 | [0MB]-[1MB] | p01 |
|  |  |  |  | [1MB]-[2MB] | p02 |
|  |  |  |  | [2MB]-[3MB] | p03 |
|  |  |  |  | [3MB]-[4MB] | p04 |
|  |  |  |  | [4MB]-[5MB] | p05 |
|  |  |  |  | [5MB]-[6MB] | p06 |
|  |  |  |  | [6MB]-[7MB] | p07 |
|  |  |  |  | [7MB]-[8MB] | p08 |
|  |  |  |  | [8MB]-[9MB] | p09 |
|  |  |  |  | [9MB]-[10MB] | p10 |
| v102 | Allocated (PID=2,LUN=2) | 4GB | Pool1 | [0MB]-[1MB] | p11 |
|  |  |  |  | [1MB]-[2MB] | p12 |
|  |  |  |  | [2MB]-[3MB] | p13 |
|  |  |  |  | [3MB]-[4MB] | p14 |
| v103 | Allocated (PID=3,LUN=1) | 2GB | Pool1 | [0MB]-[1MB] | p15 |
|  |  |  |  | [1MB]-[2MB] | p16 |
| v104 | Allocated (PID=3,LUN=2) | 4GB | Pool1 | [0MB]-[1MB] | p17 |
|  |  |  |  | [1MB]-[2MB] | p18 |
|  |  |  |  | [2MB]-[3MB] | p19 |
|  |  |  |  | [3MB]-[4MB] | p20 |
| v105 | Allocated (PID=3,LUN=3) | 2GB | Pool1 | [0MB]-[1MB] | p21 |
|  |  |  |  | [1MB]-[2MB] | p22 |
| ... | ... | ... | ... | ... | ... |
| 36A | 36B | 36C | 36D | 36E | 36F |

FIG. 7

<POOL-LOGICAL VOLUME ASSIGNMENT MANAGEMENT TABLE>    37

| POOL ID | PAGE ID | POOL VOLUME | LBA | VIRTUAL VOLUME ASSIGNMENT STATUS |
|---|---|---|---|---|
| Pool1 | p01 | (v201,5GB) | [0MB]-[1MB] | Allocated(v101) |
| | p02 | | [1MB]-[2MB] | Allocated(v101) |
| | p03 | | [2MB]-[3MB] | Allocated(v101) |
| | p04 | | [3MB]-[4MB] | Allocated(v101) |
| | p05 | | [4MB]-[5MB] | Allocated(v101) |
| | p06 | (v202,5GB) | [0MB]-[1MB] | Allocated(v101) |
| | p07 | | [1MB]-[2MB] | Allocated(v101) |
| | p08 | | [2MB]-[3MB] | Unallocated |
| | p09 | | [3MB]-[4MB] | Unallocated |
| | p10 | | [4MB]-[5MB] | Unallocated |
| | p11 | (v203,5GB) | [0MB]-[1MB] | Unallocated |
| | p12 | | [1MB]-[2MB] | Unallocated |
| | p13 | | [2MB]-[3MB] | Unallocated |
| | p14 | | [3MB]-[4MB] | Unallocated |
| | p15 | | [4MB]-[5MB] | Unallocated |
| | p16 | (v204,10GB) | [0MB]-[1MB] | Unallocated |
| | ... | ... | ... | ... |
| | p21 | (v205,4GB) | [0MB]-[1MB] | Unallocated |
| | ... | ... | ... | ... |
| | p25 | (v206,2GB) | [0MB]-[1MB] | Unallocated |
| | ... | ... | ... | ... |
| ... | ... | ... | ... | ... |

<POOL-LOGICAL VOLUME INFORMATION>  38

| POOL ID | PAGE ID | TIER | MEDIA TYPE | RAID GROUP | LDEV |
|---|---|---|---|---|---|
| Pool1 | p01 | Tier0 | SSD | 1 | 0001 |
| | p02 | Tier0 | SSD | 1 | 0001 |
| | p03 | Tier0 | SSD | 1 | 0001 |
| | p04 | Tier0 | SSD | 1 | 0001 |
| | p05 | Tier0 | SSD | 1 | 0001 |
| | p06 | Tier1 | SAS/FC | 2 | 0002 |
| | p07 | Tier1 | SAS/FC | 2 | 0002 |
| | p08 | Tier1 | SAS/FC | 2 | 0002 |
| | p09 | Tier1 | SAS/FC | 2 | 0002 |
| | p10 | Tier1 | SAS/FC | 2 | 0002 |
| | p11 | Tier2 | SATA | 3 | 0003 |
| | p12 | Tier2 | SATA | 3 | 0003 |
| | p13 | Tier2 | SATA | 3 | 0003 |
| | p14 | Tier2 | SATA | 3 | 0003 |
| | p15 | Tier2 | SATA | 3 | 0003 |
| | p16 | Tier2 | SATA | 4 | 0004 |
| | ... | ... | ... | ... | ... |
| | p21 | Tier1 | SAS/FC | 2 | 0010 |
| | ... | ... | ... | ... | ... |
| | p25 | Tier1 | SAS/FC | 2 | 0011 |
| | ... | ... | ... | ... | ... |
| ... | ... | ... | ... | ... | ... |

<VIRTUAL VOLUME CREATION MANAGEMENT TABLE>   39

| VIRTUAL VOLUME ID | CAPACITY | POOL ID | THRESHOLD | PERFORMANCE /COST LEVEL |
|---|---|---|---|---|
| v101 | 10GB | Pool1 | 8GB | HIGH |
| v102 | 20GB | Pool1 | 16GB | HIGH |
| v103 | 20GB | Pool1 | 16GB | HIGH |
| v104 | 10GB | Pool1 | 8GB | MEDIUM |
| v105 | 10GB | Pool1 | 8GB | LOW |
| v106 | 10GB | Pool1 | 8GB | MEDIUM |
| v107 | 10GB | Pool1 | 8GB | MEDIUM |
| v108 | 10GB | Pool1 | 8GB | HIGH |
| v109 | 10GB | Pool1 | 8GB | HIGH |
| v110 | 10GB | Pool1 | 8GB | HIGH |
| v111 | 10GB | Pool1 | 8GB | HIGH |
| ... | ... | ... | ... | ... |

<PERFORMANCE/COST LEVEL
TIER RATIO MANAGEMENT TABLE>   40

| PERFORMANCE/COST LEVEL | TIER0 RATIO | TIER1 RATIO | TIER2 RATIO |
|---|---|---|---|
| HIGH | 50% | 40% | 10% |
| MEDIUM | 30% | 50% | 20% |
| LOW | 10% | 40% | 50% |
| ... | ... | ... | ... |

<POOL CAPACITY MANAGEMENT TABLE>   41

| POOL ID | TOTAL CAPACITY (TOTAL NUMBER OF PAGES) | | | UNUSED CAPACITY (NUMBER OF UNUSED PAGES) | | |
|---|---|---|---|---|---|---|
| | Tier0 | Tier1 | Tier2 | Tier0 | Tier1 | Tier2 |
| Pool1 | 10000 | 30000 | 40000 | 8000 | 20000 | 18000 |
| Pool2 | 5000 | 5000 | 5000 | 4000 | 4000 | 4000 |
| ... | ... | ... | ... | ... | ... | ... |

<VIRTUAL VOLUME TIER MANAGEMENT TABLE>

| VIRTUAL VOLUME ID | CAPACITY | THRESHOLD | USAGE RATIO | | | MAXIMUM CAPACITY | | | ASSIGNED CAPACITY | | |
|---|---|---|---|---|---|---|---|---|---|---|---|
| | | | Tier0 | Tier1 | Tier2 | Tier0 | Tier1 | Tier2 | Tier0 | Tier1 | Tier2 |
| v101 | 10GB | 8GB | 50% | 40% | 10% | 5GB | 4GB | 1GB | 5GB | 4GB | 1GB |
| v102 | 20GB | 16GB | 50% | 40% | 10% | 10GB | 8GB | 2GB | 8GB | 0GB | 0GB |
| v103 | 20GB | 16GB | 50% | 40% | 10% | 10GB | 8GB | 2GB | 10GB | 5GB | 0GB |
| v104 | 10GB | 8GB | 30% | 50% | 20% | 3GB | 5GB | 2GB | 0GB | 0GB | 0GB |
| v105 | 10GB | 8GB | 10% | 40% | 50% | 1GB | 4GB | 5GB | 1GB | 1GB | 0GB |
| v106 | 10GB | 8GB | 30% | 50% | 20% | 3GB | 5GB | 2GB | 3GB | 5GB | 2GB |
| v107 | 10GB | 8GB | 30% | 50% | 20% | 3GB | 5GB | 2GB | 3GB | 5GB | 2GB |
| v108 | 10GB | 8GB | 30% | 40% | 10% | 5GB | 4GB | 1GB | 5GB | 4GB | 1GB |
| v109 | 10GB | 8GB | 30% | 40% | 10% | 5GB | 4GB | 1GB | 5GB | 4GB | 1GB |
| v110 | 10GB | 8GB | 30% | 40% | 10% | 5GB | 4GB | 1GB | 5GB | 4GB | 1GB |
| ... | ... | ... | ... | ... | ... | ... | ... | ... | ... | ... | ... |
| 42A | 42B | 42C | 42D | | | 42E | | | 42F | | |

<ACCESS FREQUENCY PER VIRTUAL VOLUME MANAGEMENT TABLE>                43

| VIRTUAL VOLUME ID | POOL ID | ASSIGNED LBA | PAGE ID | I/O FREQUENCY | TIER | MIGRATION DESTINATION TIER |
|---|---|---|---|---|---|---|
| v101 | Pool1 | [0MB]–[1MB] | p01 | 1000 | Tier0 | Tier0 |
| | | [1MB]–[2MB] | p02 | 2000 | Tier1 | Tier0 |
| | | [2MB]–[3MB] | p03 | 500 | Tier0 | Tier1 |
| | | [3MB]–[4MB] | p04 | 500 | Tier1 | Tier1 |
| | | [4MB]–[5MB] | p05 | 500 | Tier1 | Tier1 |
| | | [5MB]–[6MB] | p06 | 500 | Tier1 | Tier1 |
| | | [6MB]–[7MB] | p07 | 500 | Tier2 | Tier1 |
| | | [7MB]–[8MB] | p08 | 200 | Tier1 | Tier2 |
| | | [8MB]–[9MB] | p09 | 200 | Tier2 | Tier2 |
| | | [9MB]–[10MB] | p10 | 0 | Tier2 | Tier2 |
| v102 | Pool1 | [0MB]–[1MB] | p11 | 1000 | Tier0 | Tier0 |
| | | [1MB]–[2MB] | p12 | 1000 | Tier1 | Tier0 |
| | | [2MB]–[3MB] | p13 | 1000 | Tier2 | Tier0 |
| | | [3MB]–[4MB] | p14 | 500 | Tier2 | Tier1 |
| v103 | Pool1 | [0MB]–[1MB] | p15 | 500 | Tier0 | Tier1 |
| | | [1MB]–[2MB] | p16 | 500 | Tier1 | Tier1 |
| v104 | Pool1 | [0MB]–[1MB] | p17 | 500 | Tier0 | Tier1 |
| | | [1MB]–[2MB] | p18 | 500 | Tier1 | Tier1 |
| | | [2MB]–[3MB] | p19 | 500 | Tier2 | Tier1 |
| | | [3MB]–[4MB] | p20 | 500 | Tier2 | Tier1 |
| v105 | Pool1 | [0MB]–[1MB] | p21 | 500 | Tier0 | Tier1 |
| | | [1MB]–[2MB] | p22 | 500 | Tier1 | Tier0 |
| ... | ... | ... | ... | ... | ... | ... |
| 43A | 43B | 43C | 43D | 43E | 43F | 43G |

FIG. 14

<TIER MIGRATION PAGE MANAGEMENT TABLE>

| VIRTUAL VOLUME ID | DETERMINED PAGE COUNT | RELOCATION-COMPLETED PAGE COUNT | RELOCATION-INCOMPLETE PAGE COUNT | TIER0 TO TIER1 TARGET PAGE COUNT | TIER0 TO TIER2 TARGET PAGE COUNT | TIER1 TO TIER0 TARGET PAGE COUNT | TIER1 TO TIER2 TARGET PAGE COUNT | TIER2 TO TIER0 TARGET PAGE COUNT | TIER2 TO TIER1 TARGET PAGE COUNT |
|---|---|---|---|---|---|---|---|---|---|
| v101 | 2200 | 2200 | 0 | 600 | 300 | 800 | 100 | 100 | 300 |
| v102 | 300 | 0 | 300 | 0 | 0 | 0 | 0 | 0 | 0 |
| v103 | 3000 | 1200 | 1800 | 100 | 400 | 500 | 100 | 0 | 100 |
| ... | ... | ... | ... | ... | ... | ... | ... | ... | ... |
| 44A | 44B | 44C | 44D | 44E | | | | | |

FIG. 25

<PERFORMANCE/COST LEVEL TIER RATIO MANAGEMENT TABLE> 401

| PERFORMANCE/COST LEVEL | RELIABILTY LEVEL | Tier0 | Tier1 | Tier2 | RAID LEVEL |
|---|---|---|---|---|---|
| HIGH | HIGH | 50% | 40% | 10% | RAID1(2D+2D/4D+4D) |
| | MEDIUM | 30% | 50% | 20% | RAID6(6D+2P/14D+2P) |
| | LOW | 10% | 40% | 50% | RAID5(3D+1P/7D+1P) |
| MEDIUM | HIGH | 50% | 40% | 10% | RAID1(2D+2D/4D+4D) |
| | MEDIUM | 30% | 50% | 20% | RAID6(6D+2P/14D+2P) |
| | LOW | 10% | 40% | 50% | RAID5(3D+1P/7D+1P) |
| LOW | HIGH | 50% | 40% | 10% | RAID1(2D+2D/4D+4D) |
| | MEDIUM | 30% | 50% | 20% | RAID6(6D+2P/14D+2P) |
| | LOW | 10% | 40% | 50% | RAID5(3D+1P/7D+1P) |
| ... | ... | ... | | | ... |

<VIRTUAL VOLUME CREATION MANAGEMENT TABLE> 391

| VIRTUAL VOLUME ID | CAPACITY | POOL ID | THRESHOLD | PERFORMANCE /COST LEVEL | RAID LEVEL |
|---|---|---|---|---|---|
| v101 | 10GB | Pool1 | 8GB | HIGH | RAID1 |
| v102 | 20GB | Pool1 | 16GB | HIGH | RAID5 |
| v103 | 20GB | Pool1 | 16GB | HIGH | RAID6 |
| v104 | 10GB | Pool1 | 8GB | MEDIUM | RAID5 |
| v105 | 10GB | Pool1 | 8GB | LOW | RAID5 |
| v106 | 10GB | Pool1 | 8GB | MEDIUM | RAID1 |
| v107 | 10GB | Pool1 | 8GB | MEDIUM | RAID5 |
| v108 | 10GB | Pool1 | 8GB | HIGH | RAID5 |
| v109 | 10GB | Pool1 | 8GB | HIGH | RAID6 |
| v110 | 10GB | Pool1 | 8GB | HIGH | RAID6 |
| v111 | 10GB | Pool1 | 8GB | HIGH | RAID6 |
| ... | ... | ... | ... | ... | ... |
| 391A | 391B | 391C | 391D | 391E | 391F |

FIG. 30

<VIRTUAL VOLUME CREATION MANAGEMENT TABLE>   392

| VIRTUAL VOLUME ID | CAPACITY | POOL ID | THRESHOLD | TIER0 RATIO | TIER1 RATIO | TIER2 RATIO |
|---|---|---|---|---|---|---|
| v101 | 10GB | Pool1 | 8GB | 50% | 40% | 10% |
| v102 | 20GB | Pool1 | 16GB | 50% | 40% | 10% |
| v103 | 20GB | Pool1 | 16GB | 50% | 40% | 10% |
| v104 | 10GB | Pool1 | 8GB | 30% | 50% | 20% |
| v105 | 10GB | Pool1 | 8GB | 10% | 40% | 50% |
| v106 | 10GB | Pool1 | 8GB | 30% | 50% | 20% |
| v107 | 10GB | Pool1 | 8GB | 30% | 50% | 20% |
| v108 | 10GB | Pool1 | 8GB | 50% | 40% | 10% |
| v109 | 10GB | Pool1 | 8GB | 50% | 40% | 10% |
| v110 | 10GB | Pool1 | 8GB | 50% | 40% | 10% |
| v111 | 10GB | Pool1 | 8GB | 50% | 40% | 10% |
| ... | ... | ... | ... | ... | ... | ... |

<PERFORMANCE/COST LEVEL TIER UNIT I/O
FREQUENCY THRESHOLD MANAGEMENT TABLE>      45

| PERFORMANCE/<br>COST LEVEL | TIER0<br>THRESHOLD | TIER1<br>THRESHOLD | TIER2<br>THRESHOLD |
|---|---|---|---|
| HIGH | 1000 | 500 | 0 |
| MEDIUM | 5000 | 1000 | 0 |
| LOW | 10000 | 5000 | 0 |
| ... | ... | ... | ... |

<VIRTUAL VOLUME TIER MANAGEMENT TABLE>

421

| VIRTUAL VOLUME ID | CAPACITY THRESHOLD | USAGE RATIO | | | I/O FREQUENCY THRESHOLD (IOPS) | | | ASSIGNED CAPACITY | | |
|---|---|---|---|---|---|---|---|---|---|---|
| | | Tier0 | Tier1 | Tier2 | Tier0 | Tier1 | Tier2 | Tier0 | Tier1 | Tier2 |
| v101 | 10GB | 8GB | 50% | 40% | 10% | 1000 | 500 | 0 | 5GB | 4GB | 1GB |
| v102 | 20GB | 16GB | 50% | 40% | 10% | 1000 | 500 | 0 | 8GB | 0GB | 0GB |
| v103 | 20GB | 16GB | 50% | 40% | 10% | 1000 | 500 | 0 | 10GB | 5GB | 0GB |
| v104 | 10GB | 8GB | 30% | 50% | 20% | 5000 | 1000 | 0 | 0GB | 0GB | 0GB |
| v105 | 10GB | 8GB | 10% | 40% | 50% | 10000 | 5000 | 0 | 1GB | 1GB | 0GB |
| v106 | 10GB | 8GB | 30% | 50% | 20% | 5000 | 1000 | 0 | 3GB | 5GB | 2GB |
| v107 | 10GB | 8GB | 30% | 50% | 20% | 5000 | 1000 | 0 | 3GB | 5GB | 2GB |
| v108 | 10GB | 8GB | 30% | 40% | 10% | 1000 | 500 | 0 | 5GB | 4GB | 1GB |
| v109 | 10GB | 8GB | 30% | 40% | 10% | 1000 | 500 | 0 | 5GB | 4GB | 1GB |
| v110 | 10GB | 8GB | 30% | 40% | 10% | 1000 | 500 | 0 | 5GB | 4GB | 1GB |
| ... | ... | ... | ... | ... | ... | ... | ... | ... | ... | ... |

<I/O DISTRIBUTION MANAGEMENT TABLE>  46

| VIRTUAL VOLUME ID | NUMBER OF I/O THRESHOLD-EXCEEDING PAGES | | | | | | | | |
| --- | --- | --- | --- | --- | --- | --- | --- | --- | --- |
| | PERFORMANCE/ COST LEVEL: HIGH | | | PERFORMANCE/ COST LEVEL: MEDIUM | | | PERFORMANCE/ COST LEVEL: LOW | | |
| | Tier0 | Tier1 | Tier2 | Tier0 | Tier1 | Tier2 | Tier0 | Tier1 | Tier2 |
| v101 | 500 | 400 | 100 | 100 | 400 | 500 | 50 | 50 | 900 |
| v102 | 800 | 100 | 100 | 300 | 500 | 200 | 100 | 200 | 800 |
| v103 | 200 | 100 | 600 | 300 | 400 | 300 | 700 | 100 | 200 |
| ... | ... | ... | ... | ... | ... | ... | ... | ... | ... |

46A  46B

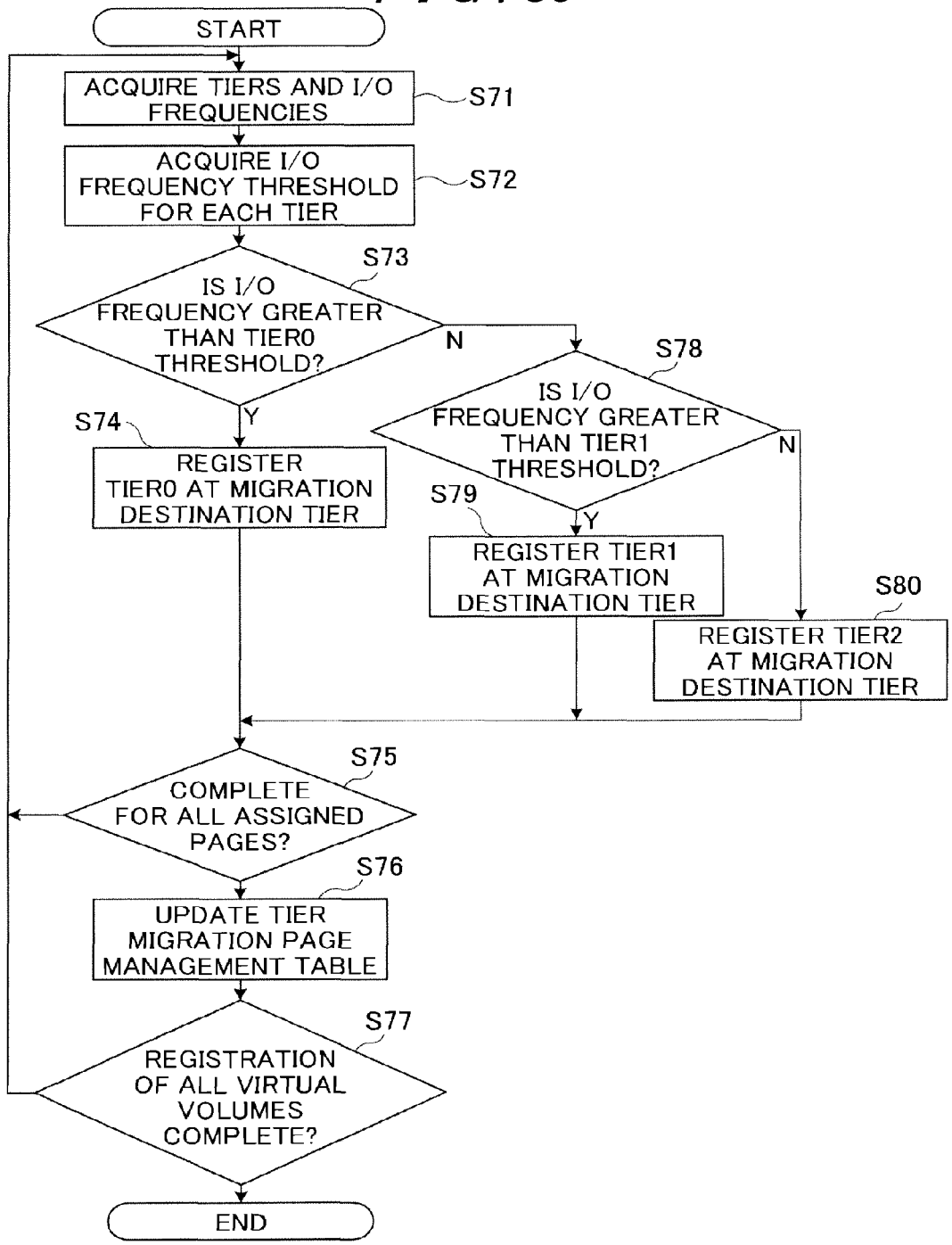

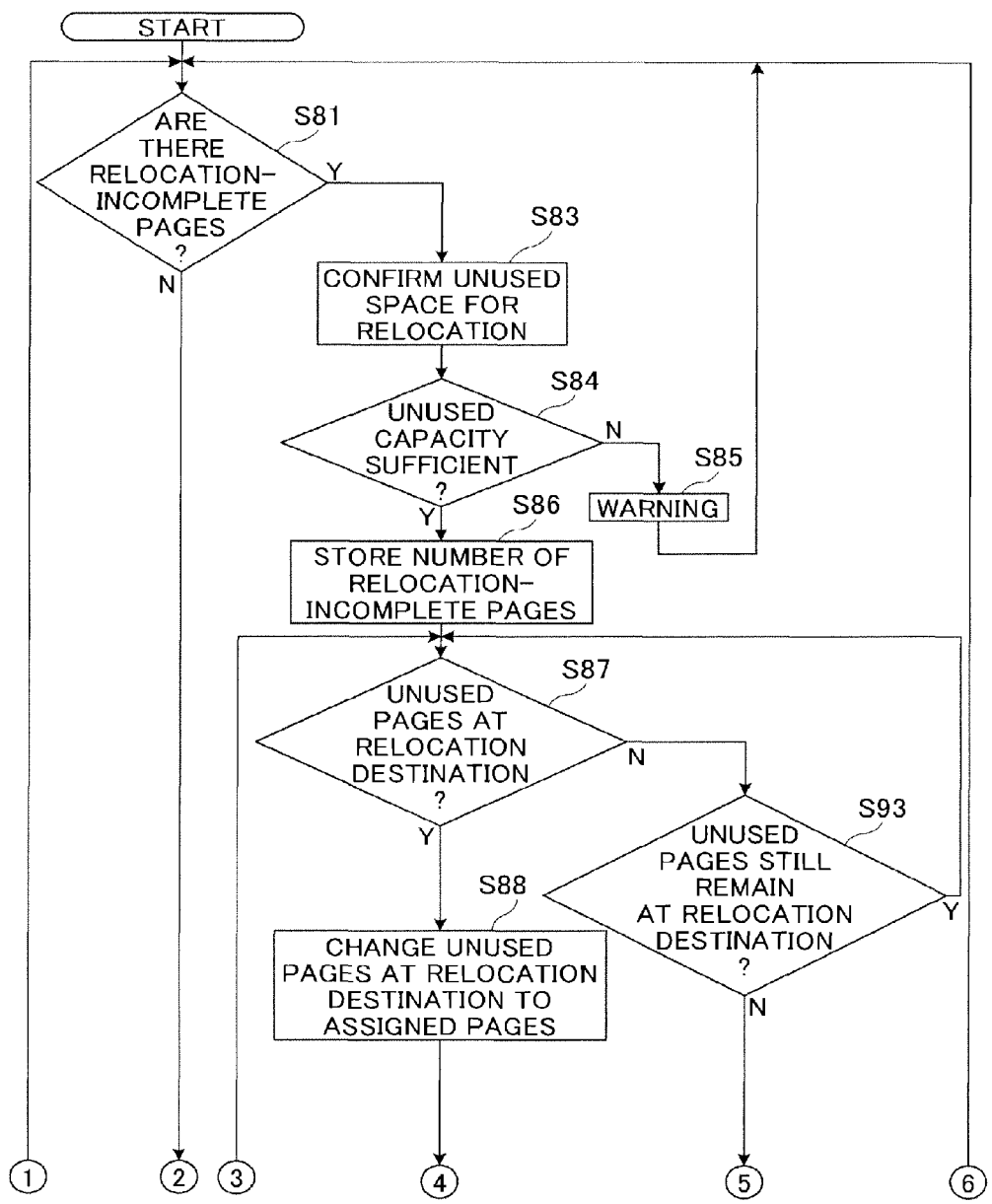

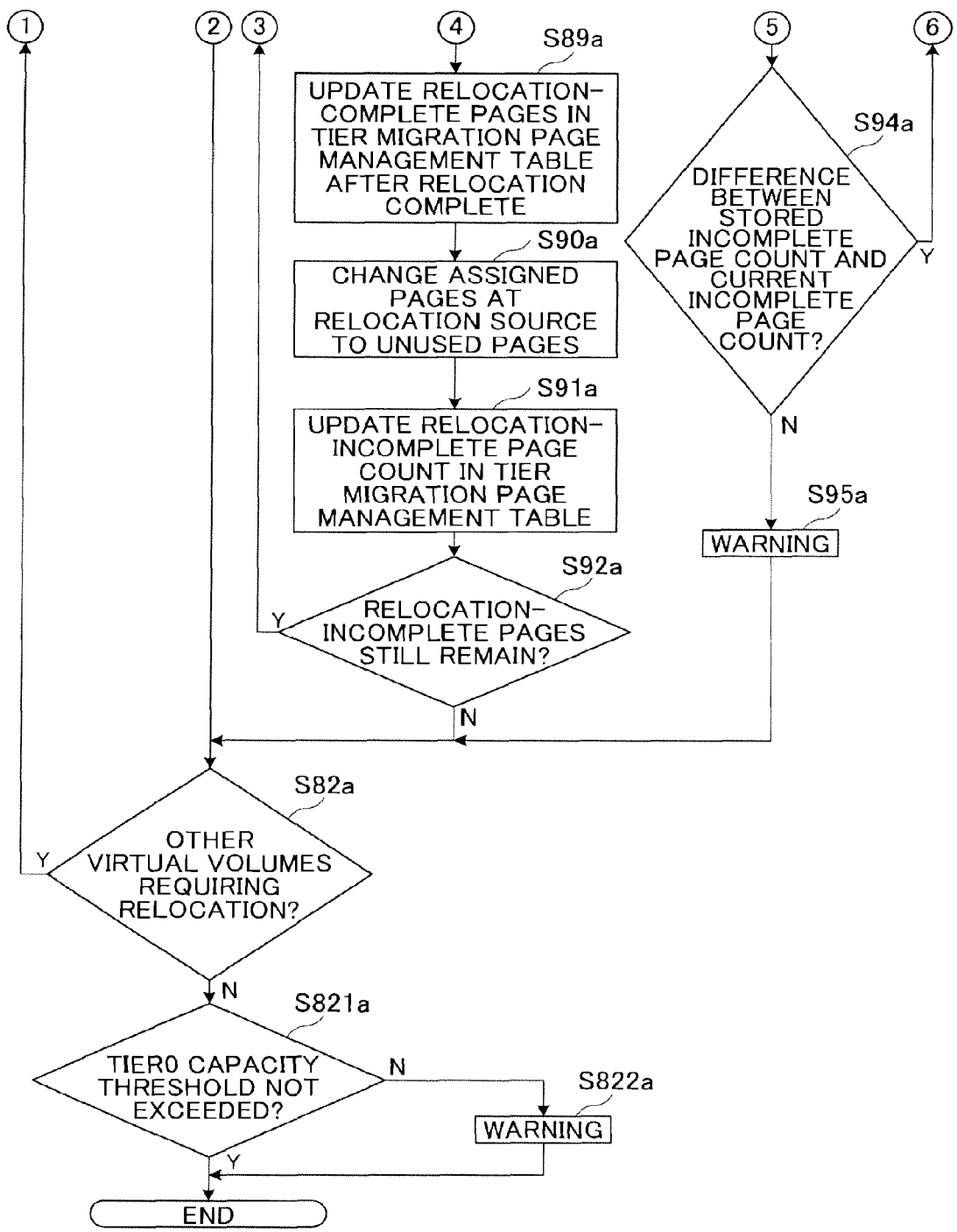

F I G . 42

<PERFORMANCE/COST LEVEL TIER RATIO MANAGEMENT TABLE> 401

| PERFORMANCE/COST LEVEL | TIER0 RATIO | TIER1 RATIO | TIER2 RATIO | TIER0 UPPER LIMIT RATIO |
|---|---|---|---|---|
| HIGH | 50% | 40% | 10% | 75% |
| MEDIUM | 30% | 50% | 20% | 36% |
| LOW | 10% | 40% | 50% | 10% |
| ... | ... | ... | ... | ... |

<VIRTUAL VOLUME CREATION MANAGEMENT TABLE>  393

| VIRTUAL VOLUME ID | CAPACITY | POOL ID | THRESHOLD | TIER0 RATIO | TIER1 RATIO | TIER2 RATIO | TIER0 UPPER LIMIT RATIO |
|---|---|---|---|---|---|---|---|
| v101 | 10GB | Pool1 | 8GB | 50% | 40% | 10% | 75% |
| v102 | 20GB | Pool1 | 16GB | 50% | 40% | 10% | 75% |
| v103 | 20GB | Pool1 | 16GB | 50% | 40% | 10% | 75% |
| v104 | 10GB | Pool1 | 8GB | 30% | 50% | 20% | 36% |
| v105 | 10GB | Pool1 | 8GB | 10% | 40% | 50% | 10% |
| v106 | 10GB | Pool1 | 8GB | 30% | 50% | 20% | 36% |
| v107 | 10GB | Pool1 | 8GB | 30% | 50% | 20% | 36% |
| v108 | 10GB | Pool1 | 8GB | 50% | 40% | 10% | 75% |
| v109 | 10GB | Pool1 | 8GB | 50% | 40% | 10% | 75% |
| v110 | 10GB | Pool1 | 8GB | 50% | 40% | 10% | 75% |
| v111 | 10GB | Pool1 | 8GB | 50% | 40% | 10% | 75% |
| ... | ... | ... | ... | ... | ... | ... | ... |

393A  393B  393C  393D  393E  393F

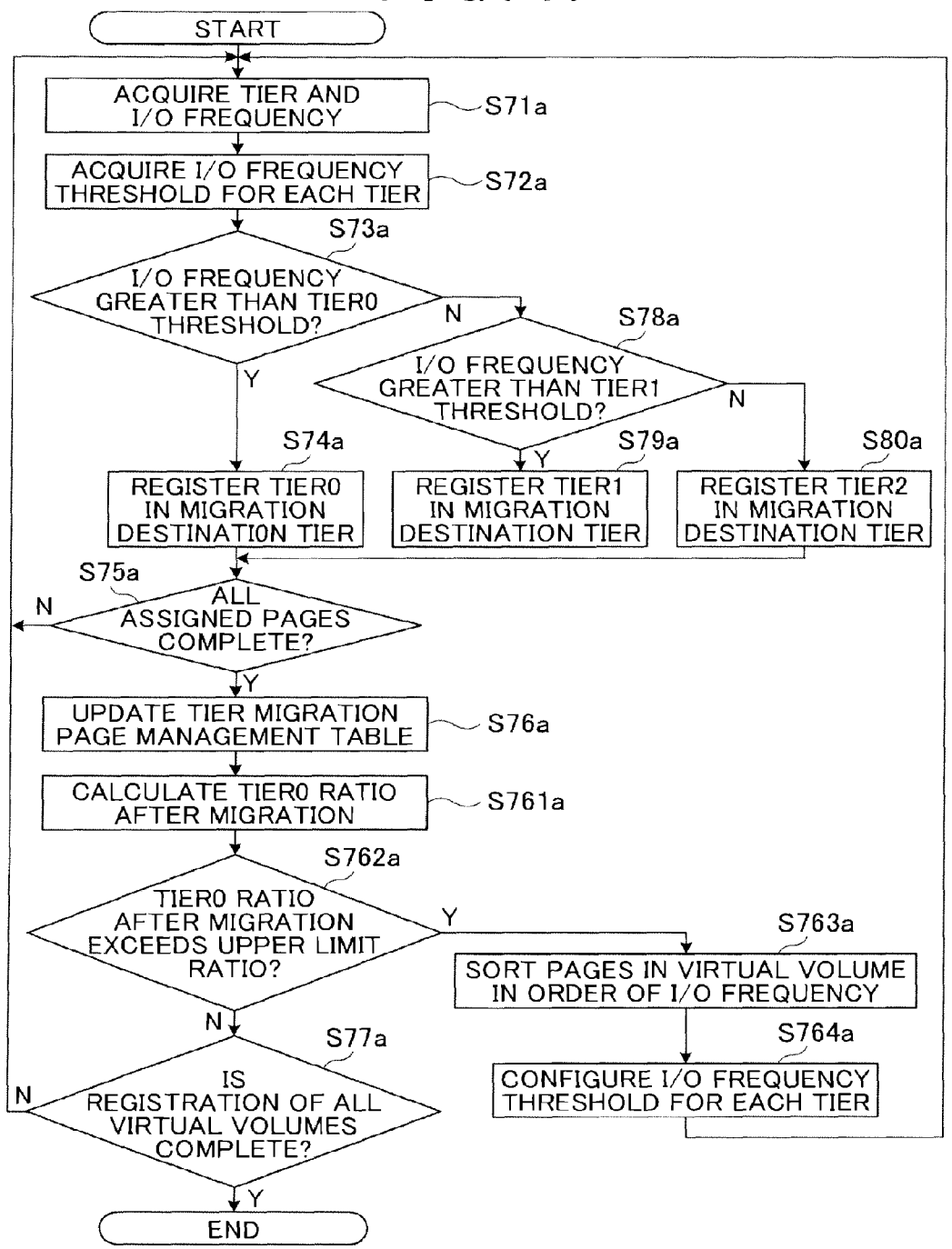

STORAGE APPARATUS AND DATA MANAGEMENT METHOD FOR STORAGE AREA ALLOCATION BASED ON ACCESS FREQUENCY

TECHNICAL FIELD

The present invention relates to a storage apparatus and a data management method and is suitably applied to a storage apparatus which has a built-in hierarchical-type data management function, for example.

BACKGROUND ART

In recent years, one such function which is installed in a storage apparatus that has been attracting attention is a virtualization function known as 'Thin Provisioning.' A Thin Provisioning function is a function which provides a host computer with a virtual logical volume (referred to hereinbelow as a virtual volume), and which, when a request to write data to the virtual volume is issued by the host computer, dynamically assigns a storage area to the virtual volume. The thin provisioning function is advantageous in providing the host computer with a virtual volume with a larger capacity than the storage area that is actually available and in affording the construction of a low-cost computer system by reducing the physical storage capacity in the storage apparatus to be pre-prepared.

Furthermore, as a data management method for this kind of storage apparatus with a built-in thin provisioning function, a hierarchical-type data management method has conventionally been proposed. A hierarchical-type data management method is a method in which storage areas provided by each of a plurality of types of storage devices of varying performance which are built into the storage apparatus are managed as storage tiers of a plurality of different types, where storage areas are assigned from a high-speed, high-performance storage tier to areas where data of high access frequency in the virtual volume is stored, and storage areas are assigned from a low-speed, low-performance storage tier to areas where data of low access frequency in the virtual volume is stored. With this hierarchical-type data management method, the cost performance of the storage apparatus can be improved.

PTL1 discloses technology relating to the foregoing hierarchical-type data management method. More specifically, a storage control apparatus collects access information relating to access to each of the logical disk devices and presents this access information to the maintenance manager. If a relocation instruction is received from the maintenance manager, the storage control apparatus relocates physical disk devices between two logical disk devices in response to this relocation instruction, and continuously revises the storage of all data to the relocated physical disk devices.

CITATION LIST

Patent Literature

[PTL 1]
Japanese Published Unexamined Application No. 2000-293317

SUMMARY OF INVENTION

Technical Problem

However, the hierarchical-type data management method disclosed in PTL1 only involves moving data between storage tiers based on the frequency of access to the data by the host computer and does not consider the usage ratio of each storage tier. In other words, when the usage ratio of each of the storage tier is predefined and the data is moved between the storage tiers based on the access frequency, data cannot be moved between storage tiers within the range of the predefined usage ratio. Furthermore, if a storage tier is assigned from each of the storage tiers to a plurality of virtual volumes, the usage efficiency of each of the storage tiers is predefined for each of the virtual volumes and data cannot be moved between the storage tiers within the range of the predefined usage ratio.

System administrators require that the usage ratio of each of the storage tiers which provide the virtual volume with storage areas be predefined as mentioned earlier and want to be able to manage data by moving it between storage tiers within the range of the predefined usage ratio. In addition, if a plurality of virtual volumes are provided with the storage area, there is a need for data to be managed by being moved between storage tiers within the usage ratio range of each storage tier which is predefined for each virtual volume. In other words, as long as the usage ratio for each storage tier is predefined for each virtual volume and data is managed by being moved between storage tiers within the predefined usage ratio ranges, there is greater convenience for the system administrator. However, the technology disclosed in PTL1 is unable to meet such demands.

The present invention was conceived in view of the above points and proposes a storage apparatus and data management method enabling improved convenience for the system administrator.

Solution to Problem

In order to solve this problem, the present invention comprises storage devices of a plurality of types of varying performance; and a controller which manages each of storage areas provided by the storage devices of a plurality of types by means of storage tiers of a plurality of different types respectively, and which assigns the storage areas in page units to virtual volumes from any storage tier among the storage tiers of a plurality of types, wherein the controller manages usage ratios of the storage tiers of a plurality of types and assigns the storage areas to the virtual volumes based on the usage ratio managed.

Furthermore, the present invention comprises a data management method for a storage apparatus comprising storage devices of a plurality of types of varying performance and a controller which manages each of storage areas provided by the storage devices of a plurality of types by means of storage tiers of a plurality of different types respectively, and which assigns the storage areas in page units to virtual volumes from any storage tier among the storage tiers of a plurality of types, the data management method comprising a first step in which the controller manages the usage ratios of the storage tiers of a plurality of types; and a second step in which the controller assigns storage area to the virtual volume on the basis of the usage ratio managed.

Advantageous Effects of Invention

The present invention enables superior convenience for system administrators.

BRIEF DESCRIPTION OF DRAWINGS

FIG. 6 is a conceptual view showing a virtual volume assignment pool page management table.

FIG. 7 is a conceptual view showing a pool-logical volume assignment management table.

FIG. 8 is a conceptual view showing pool-logical volume information.

FIG. 9 is a conceptual view showing a virtual volume creation management table.

FIG. 10 is a conceptual view showing a Tier ratio management table.

FIG. 11 is a conceptual view showing a pool capacity management table.

FIG. 12 is a conceptual view showing a Tier management table.

FIG. 13 is a conceptual view showing an access frequency management table.

FIG. 14 is a conceptual view showing a Tier migration page management table.

FIG. 25 is a conceptual view showing a Tier ratio management table.

FIG. 26 is a conceptual view showing a virtual volume creation management table.

FIG. 30 is a conceptual view of a virtual volume creation management table.

FIG. 31 is a conceptual view of an I/O frequency threshold management table.

FIG. 32 is a conceptual view of a Tier management table.

FIG. 33 is a conceptual view of an I/O distribution management table.

FIG. 35 is a flowchart showing a processing routine for access frequency management table creation processing.

FIG. 36A is a flowchart showing a processing routine for page relocation processing.

FIG. 41B is a flowchart showing the processing routine for page relocation processing.

FIG. 42 is a conceptual view showing a Tier ratio management table.

FIG. 43 is a conceptual view showing a virtual volume creation management table.

FIG. 44 is a flowchart showing a processing routine for an access frequency management table creation processing.

DESCRIPTION OF EMBODIMENTS

An embodiment of the present invention will be described in detail with reference to the drawings hereinbelow.

Figure 1:
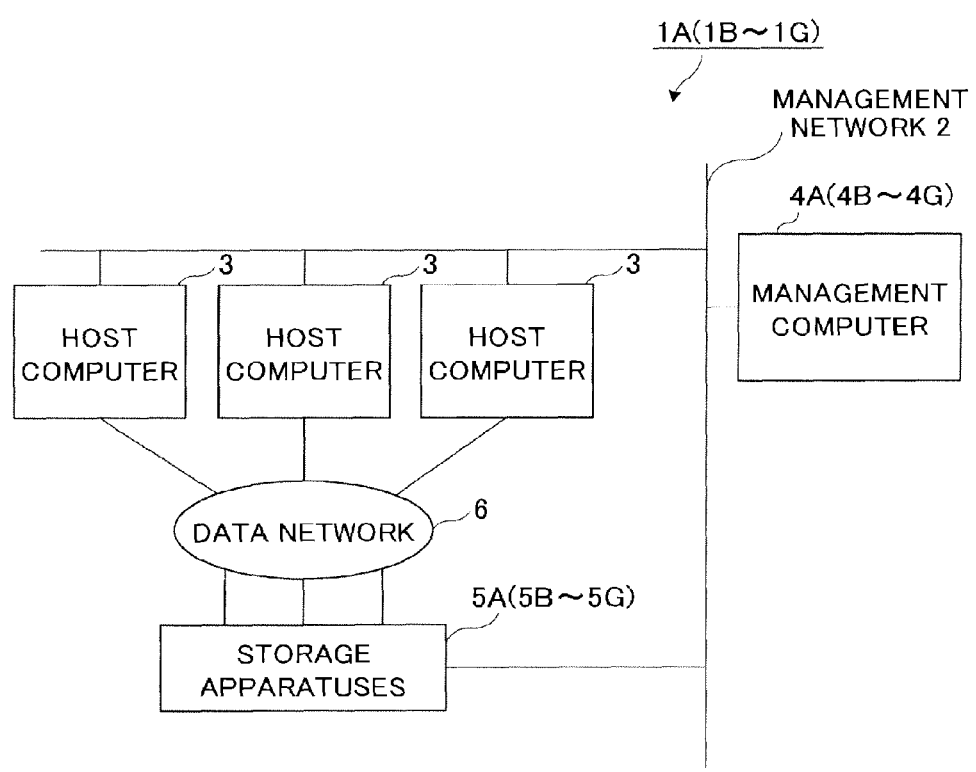
FIG. 1 is a block diagram showing the overall configuration of a computer system.

(1) First Embodiment (1-1) Configuration of the Computer System According to this Embodiment In FIG. 1, 1A represents an overall computer system 1A according to this embodiment. This computer system 1A is configured comprising a plurality of hosts 3, a management computer 4A, and a storage apparatus 5A which are mutually connected via a management network 2. Each of the host computers 3 and the storage apparatus 5A are connected via a data network 6 such as a SAN (Storage Area Network).

Figure 2:
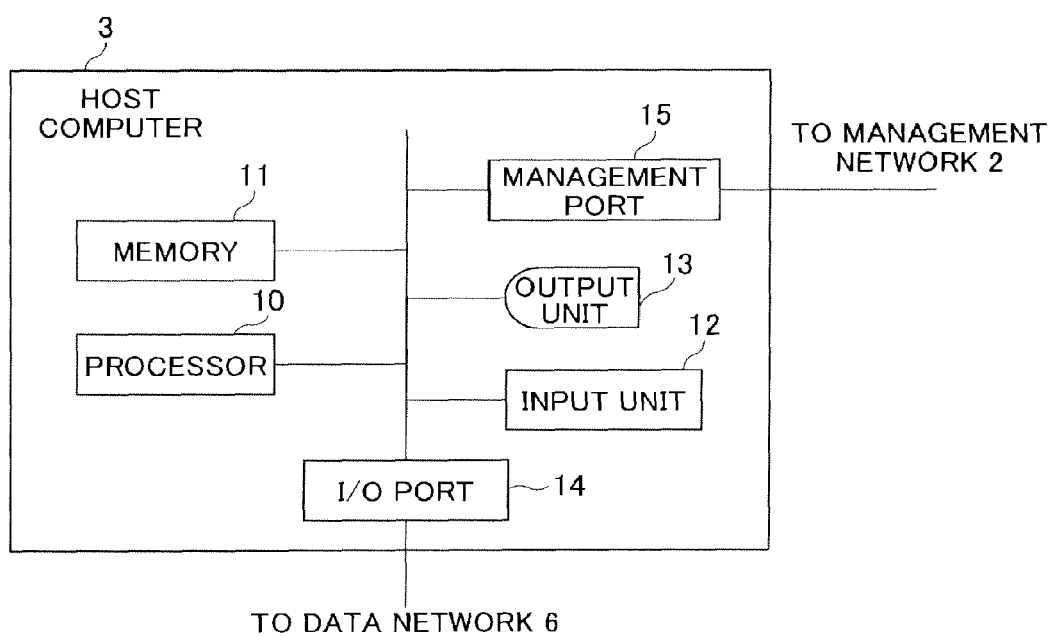
FIG. 2 is a block diagram providing an overview of the configuration of a host computer.

The host computer 3 is a computer device which executes various arithmetic processing corresponding to user tasks, and is configured from a personal computer, a work station, or mainframe, for example. As shown in FIG. 2, the host computer 3 comprises an information processing resource such as a processor 10 or memory 11, an input unit 12 configured from a keyboard, switch, pointing device, and/or microphone, and an output unit 13 which is configured from a monitor display and/or speaker or the like, and is connected to the data network 6 via a I/O port 14, and connected to the management network 2 via a management port 15.

Figure 3:
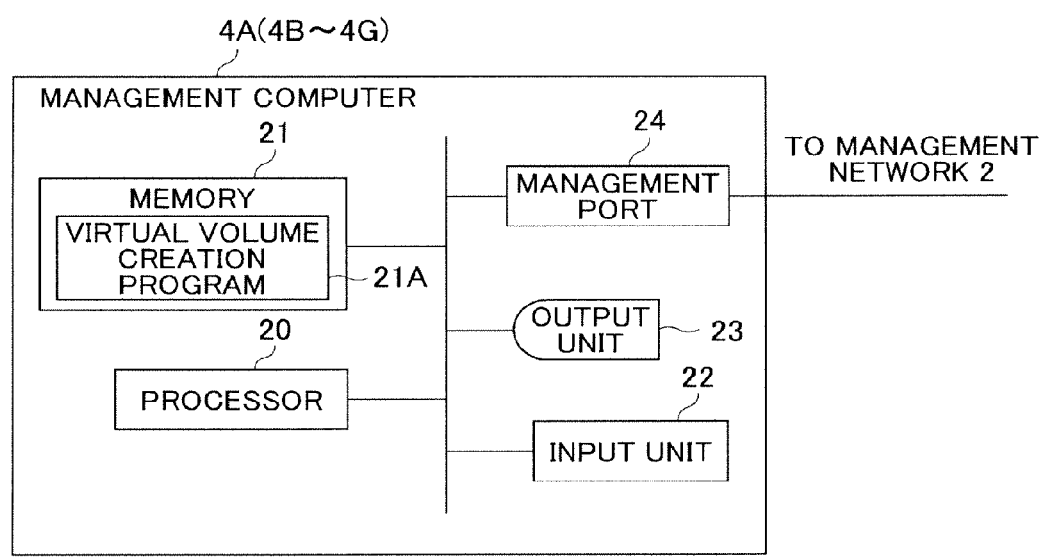
FIG. 3 is a block diagram providing an overview of the configuration of a management computer.

The management computer 4A is a computer device used by the system administrator to manage the computer system, and is configured from a personal computer, a workstation, or a mainframe, or the like, for example. As shown in FIG. 3, the management computer 4A comprises an information processing resource such as a processor 20 or memory 21, an input unit 22 which is configured from a keyboard, switch, a pointing device, and/or a microphone, and an output unit 23 which is configured from a monitor display and/or speaker or the like, and is connected to the management network 2 via a management port 24. The memory stores a virtual volume creation program 21A (described subsequently).

Figure 4:
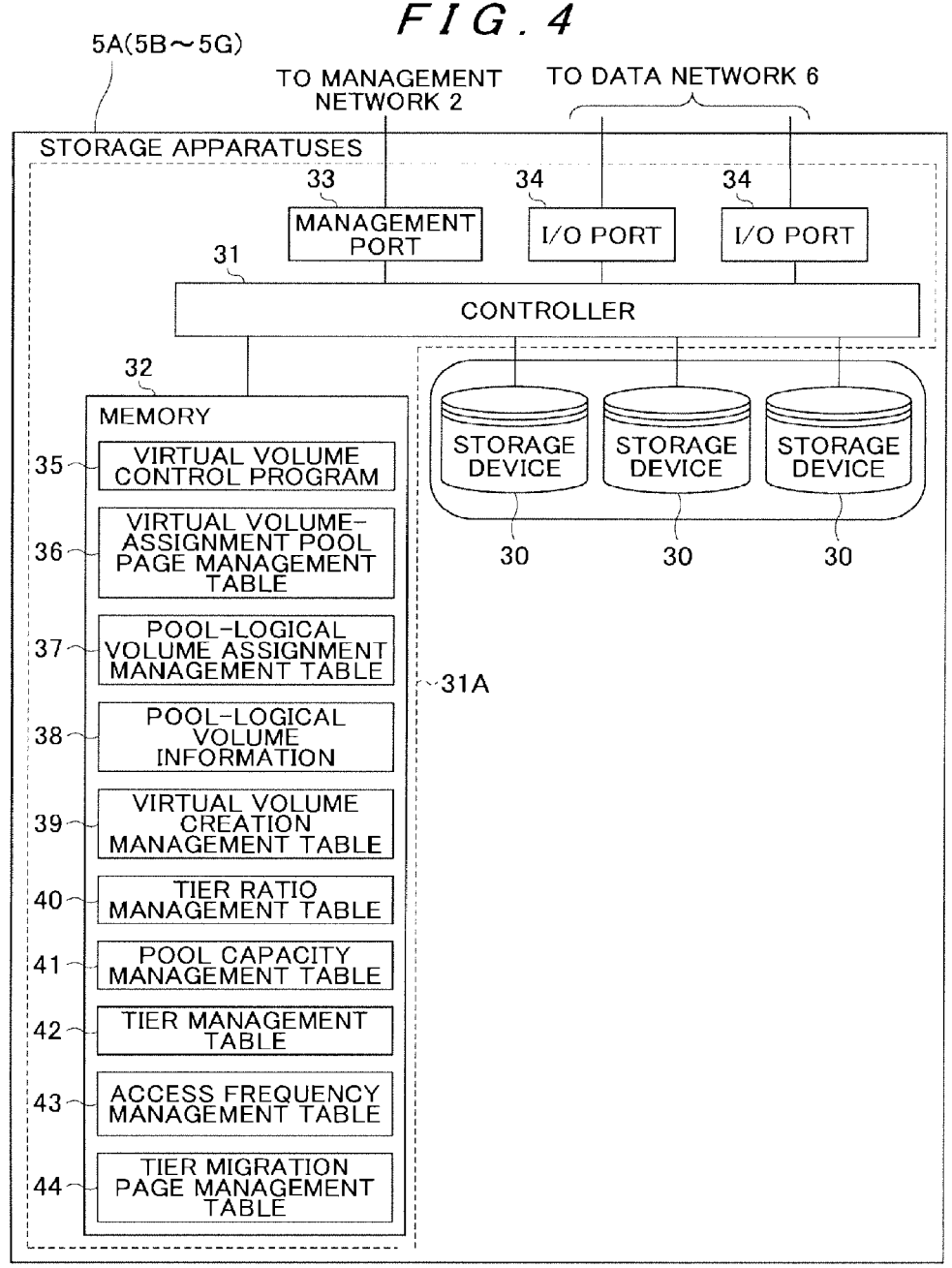
FIG. 4 is a block diagram providing an overview of the configuration of a storage apparatus.

As shown in FIG. 4, the storage apparatus 5A is configured from a plurality of types of storage devices 30, and a control unit 31A for controlling the data I/Os to and from the storage devices 30.

The storage devices 30 are configured from SSDs (Solid State Drives) or other semiconductor memory, SAS (Serial Attached SCSI) disks or FC (Fibre Channel) disks or other high-cost, high-performance disk devices, SATA (Serial AT Attachment) disks or other low-cost, low-performance disk devices. In the case of this embodiment, SSDs, SAS disks, FC disks and SATA disks are used as storage devices 30.

The control unit 31A is configured comprising information processing resources such as a controller 31 and memory 32, is connected to the management network 2 via a management port 33, and connected to the data network 6 via the I/O port 34.

The controller 31 is a processor which governs operational control of the whole storage apparatus 5A. Furthermore, in addition to being used to store various programs, the memory 32 is also used as the working memory of the controller 31. Various control processing is performed as a result of the controller 31 executing a program which is stored in the memory 32. A virtual volume control program 35, a virtual volume-assignment pool page management table 36, a pool-logical volume assignment management table 37, a pool-logical volume information 38, a virtual volume creation management table 39, a Tier ratio management table 40, a pool capacity management table 41, a Tier management table 42, an access frequency management table 43, and a Tier migration page management table 44, all of which will be described subsequently, are also stored and held in the memory 32.

Figure 5:
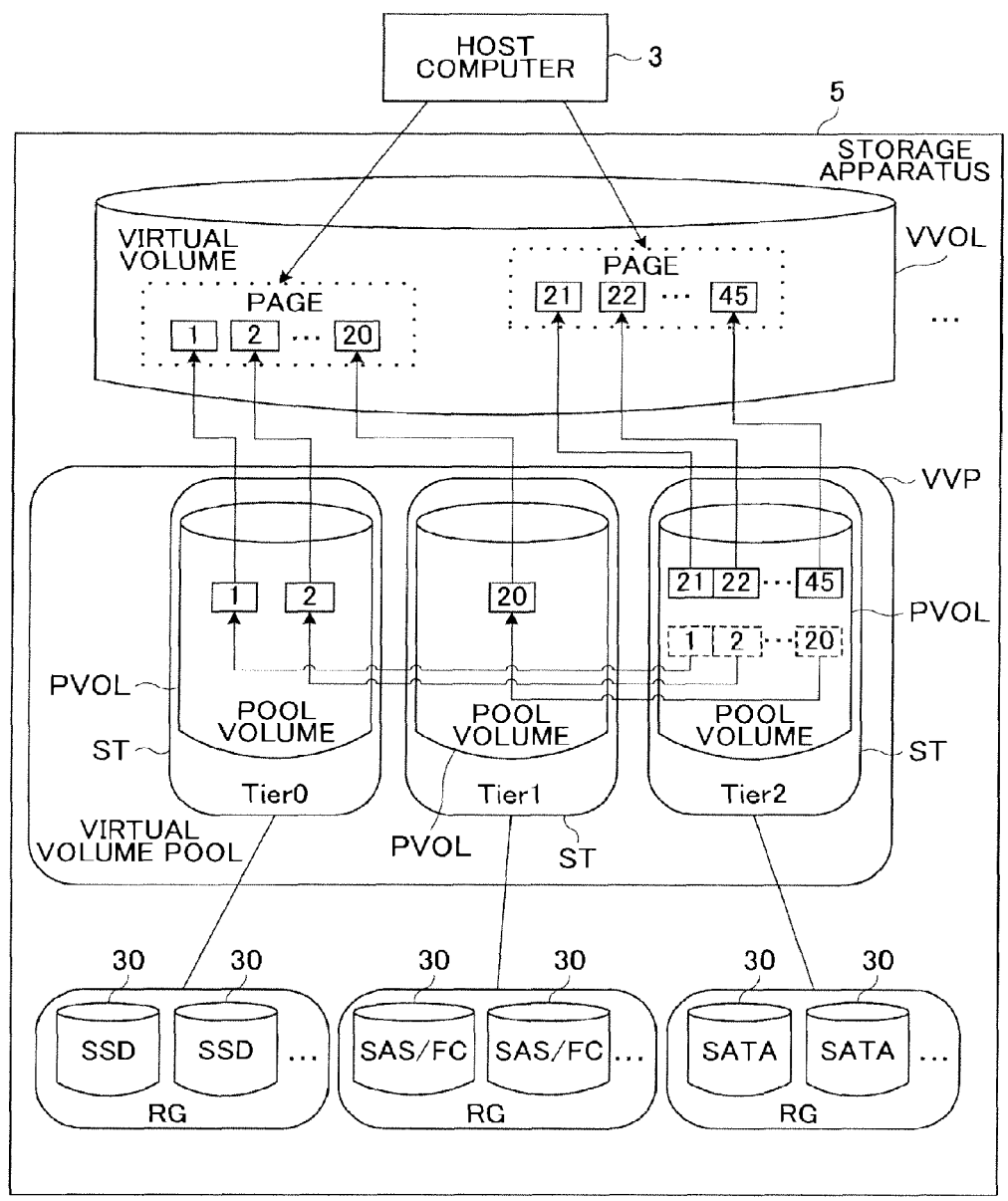
FIG. 5 is a conceptual view serving to explain a data management system according to this embodiment.

FIG. 5 shows a logical configuration of the storage apparatus 5A. As can also been seen from FIG. 5, in the storage apparatus 5A, a RAID group RG is defined by one or more storage devices 30 of the same type (SSD, SAS/FC and SATA and so forth), and one or more pool volumes PVOL are defined in the storage areas provided by one or more storage devices 30 which form a single RAID group. The pool volumes PVOL defined in the storage areas provided by the storage devices 30 of the same type are each managed as storage tiers ST of the same type, and a plurality of pool volumes PVOL belonging to mutually different storage tiers ST are managed as a single virtual volume pool VVP.

In the case of this embodiment, storage devices 30 of four types, namely, SSD, SAS disks, FC disks, and SATA disks are used as storage devices 30 as mentioned earlier; a pool volume PVOL which is defined in a storage area provided by one or more SSDs is managed as a storage tier called 'Tier0' (hereinafter called 'a first storage tier') ST, a pool volume PVOL which is defined in a storage area provided by one or more SAS disks or FC disks are managed as a storage tier called 'Tier1' (hereinafter called a 'second storage tier') ST, and a pool volume PVOL which is defined in a storage area provided by one or more SATA disks are managed as a storage tier called 'Tier2' (hereinafter called a 'third storage tier') ST.

Not that among these types (SSD, SAS/FC and SATA) of storage devices 30, the storage device with the highest reliability and response performance is SSD, the storage device with the next highest reliability and response performance is the SAS or FC disk, and the storage device with the lowest reliability and response performance is the SATA disk. Accordingly, in the case of this embodiment, among the first to third storage tiers ST which form the virtual volume pool VVP, the storage tier with the highest reliability and response performance is the first storage tier ST, the storage device with the next highest reliability and response performance is the second storage tier ST, and the storage device with the lowest reliability and response performance is the third storage tier ST.

Meanwhile, one or more virtual volumes VVOL are defined in the storage apparatus 5A. The virtual volumes VVOL are each assigned a unique identifier (hereinafter called the LUN (Logical Unit Number)). Furthermore, the area of the virtual volumes VVOL is divided into blocks of a predetermined size (hereinafter called 'logical blocks'), which are managed using unique numbers (hereinafter called LBAs (Logical Block Addresses) which are assigned to each of the logical blocks respectively. Data I/O requests (write requests and read requests) to input/output data to and from the virtual volumes VVOL from the host computer are made by designating the LUN of the virtual volume VVOL where data is read/written, the LBA of the first logical block of the area to which data is read/written in the virtual volume VVOL, and the data length.

A single virtual volume pool VVP is pre-associated with any of the virtual volumes VVOL. Furthermore, upon receiving a data write request to write data to the virtual volume VVOL from the host computer 3, the storage apparatus 5A assigns the required amount of storage area in units of a predetermined size known as 'pages' from the virtual volume pool VVP associated with the virtual volume VVOL to the area designated in the write request in the virtual volume VVOL designed in the write request and writes write target data to the assigned page.

Here, a 'page' is a basic unit of storage area which is assigned to a virtual volume VVOL from any of the storage tiers (first to third storage tiers) ST which form the virtual volume pool VVP associated with the virtual volume VVOL. Although the following description describes a single page and a single logical block of the virtual volume VVOL as being storage areas of the same size, the present invention is not necessarily limited to this arrangement.

In addition, when pages are assigned from the corresponding virtual volume pool VVP to the virtual volume VVOL, the storage apparatus 5A assigns pages in order from the pool volume PVOL belonging to a storage tier ST with the highest reliability and response performance among the assignable pool volumes PVOL. Therefore the storage apparatus 5A comes to assign pages to the virtual volume VVOL from the pool volume PVOL until pages not yet assigned to the pool volume PVOL are exhausted, in the following order: the pool volume PVOL which belongs to the first storage tier ST, the pool volume PVOL which belongs to the second storage tier ST, and then the pool volume PVOL which belongs to the third storage tier ST.

Meanwhile, the storage apparatus 5A monitors the frequency of access by the host computer 3 per unit time to each logical block of the virtual volume VVOL in parallel with the aforementioned processing to assign pages to the virtual volumes VVOL.

Furthermore, the storage apparatus 5A assigns pages from the first or second storage tier ST of higher reliability and response performance to logical blocks of high access frequency at regular intervals or irregular intervals based on the access frequency per unit time, and migrates data as required between the first and third storage tiers ST so that pages are assigned from the second or third storage tiers ST of lower reliability and response performance to logical blocks with a lower access frequency.

(1-2) Hierarchical-Type Data Management Method According to this Embodiment

The data management method of the storage apparatus 5A will be explained next. One feature of the computer system 1A is that, in the storage apparatus 5A, the system administrator is able to configure the usage ratio of the first to third storage tiers ST when data is migrated between the first to third storage tiers ST according to the access frequency per unit time from the host computer 3 as mentioned earlier.

For example, if the usage ratio of the first storage tier ST is configured as 50%, the usage ratio of the second storage tier ST as 40%, and the usage ratio of the third storage tier ST as 10%, when the storage apparatus 5A migrates data between the first to third storage tiers ST, data is migrated between the first to third storage tiers ST so that the page usage ratios of the first to third storage tiers ST are as described.

As means for implementing the above data management method according to this embodiment, the virtual volume creation program 21A is stored as shown in FIG. 3 in the memory 21 of the management computer 4A, and the memory 32 of the storage apparatus 5A stores, as shown in FIG. 4, the virtual volume control program 35, the virtual volume-assignment pool page management table 36, the pool-logical volume assignment management table 37, the pool-logical volume information 38, the virtual volume creation management table 39, the Tier ratio management table 40, the pool capacity management table 41, the Tier management table 42, the access frequency management table 43, and the Tier migration page management table 44.

The virtual volume creation program 21A is a program which presents the system administrator with a predetermined virtual volume creation screen 50 (see FIG. 15) for creating a virtual volume VVOL in the storage apparatus 5A. The virtual volume creation program 21A configures the storage apparatus 5A with a virtual volume VVOL which is created by the system administrator via the virtual volume creation screen 50 thus presented.

However, the virtual volume control program 35 is a program which, in the event of a data write request to write data to the virtual volume VVOL from the host computer 3, executes page assignment processing for assigning pages from the corresponding first to third storage tiers ST (see FIG. 5) to the virtual volume VVOL and page relocation processing for migrating data between the first to third storage tiers ST according to the access frequency per unit time from the host computer 3 at regular or irregular intervals.

Furthermore, the virtual volume-assignment pool page management table 36 is a table for managing each of the virtual volumes VVOL defined in the storage apparatus 5A by the virtual volume control program 35. The virtual volume-assignment pool page management table 36 shown in FIG. 6 is configured from a virtual volume ID field 36A, a host assignment status field 36B, a virtual capacity field 36C, a pool ID field 36D, an assigned LBA field 36E and an assigned page field 36F.

The virtual volume ID field 36A stores identifiers (volume IDs) for each of the virtual volumes VVOL defined in the storage apparatus 5A. Furthermore, the host assignment status field 36B stores information indicating whether or not the virtual volume VVOL has been assigned as a data write destination by the host computer 3. More specifically, the host assignment status field 36B stores 'Allocated' if a virtual volume VVOL has been assigned as a data write destination and 'Unallocated' if not assigned.

Furthermore, if the virtual volume VVOL has been assigned as a data write destination by the host computer 3, the host assignment status field 36B stores the ID (PID) of the host computer 3 connected to the virtual volume VVOL, and identification numbers (LUN) for the virtual volumes VVOL in the host computer 3.

In addition, the virtual capacity field 36C stores the capacity of the virtual volume VVOL, and the pool ID field 36D stores identifiers (volume pool IDs) of the virtual volume pool VVP associated with the virtual volume VVOL. The assigned LBA field 36E stores the LBAs of the logical blocks to which pages have already been assigned among the logical blocks in the virtual volumes VVOL, and the assigned page field 36F stores the identifiers of pages (page IDs) assigned to the logical blocks in the virtual volumes VVOL.

Hence, in the case of FIG. 6, for example, it can be seen that the virtual volume VVOL 'v101' is a virtual volume VVOL with an ('Allocated') capacity of '10 GB' assigned as 'LUN=1' to the host computer 3 with a port 'PID=2' and is associated with the virtual volume pool VVP 'Pool1.' Moreover, it can be seen that pages 'p01' to 'p10' have already been assigned to each of the LBA logical blocks '0 MB' to '10 MB' in the virtual volume VVOL associated with the virtual volume pool VVP 'Pool1.'

The pool-logical volume assignment management table 37 is a table for managing a virtual volume pool VVP defined in the storage apparatus 5A by means of a virtual volume control program 35 and, as shown in FIG. 7, is configured from a pool ID field 37A, a page ID field 37B, a pool volume field 37C, and an LBA field 37D, and a virtual volume assignment status field 37E.

Furthermore, the pool ID field 37A stores the volume pool IDs of the virtual volume pools VVP defined in the storage apparatus 5A, and the page ID field 37B stores the page IDs assigned to each of the pages in the virtual volume pools VVP respectively. In addition, the pool volume field 37C stores identifiers (pool volume IDs) and capacities of each of the pool volumes PVOL (see FIG. 5) which form the virtual volume pools VVP, and the LBA field 37D stores LBAs in the virtual volume pools which are the logical block addresses (LBAs) of the pages assigned to the virtual volume VVOL.

In addition, the virtual volume assignment status field 37E stores information indicating whether or not pages have been assigned to the virtual volume VVOL and, if assigned, the volume IDs of the assignment destination virtual volume VVOL. More specifically, the virtual volume assignment status field 37E stores 'Allocated' if pages have been assigned to the virtual volume VVOL and 'Unallocated' if no such pages have been as signed.

Hence, in FIG. 7, it can be seen, for example, that for the virtual volume pool VVP 'Pool1,' the pages 'p01' to 'p05' have each been assigned to areas with an LBA of '0 MB' to '5 MB' in a pool volume PVOL with a capacity of 5 GB called 'v201'.

The pool-logical volume information 38 is information on the virtual volume pool VVP defined in the storage apparatus 5A by the virtual volume control program 35 and, as shown in FIG. 8, is configured from a pool ID field 38A, a page ID field 38B, a Tier field 38C, a media type field 38D, a RAID group ID field 38E, and an LDEV ID field 38F.

The pool ID field 38A stores the volume pool IDs of the virtual volume pools VVP defined in the storage apparatus 5A and the page ID field 38B stores the page IDs respectively assigned to each of the pages in the virtual volume pools VVP. In addition, Tier field 38C stores identifiers for each of the storage tiers ST (Tier0, Tier1, and Tier2) defined in the virtual volume pools VVP, and the media type field 38D stores the types of the storage devices 30 (SSD, SAS/FC and SATA and so forth) which provide the virtual volume pools VVP.

The RAID group ID field 38E stores identifiers (RAID group IDs) for the RAID groups providing each of the storage tiers ST and the LDEVID field 38F stores the identifiers for the single pool volumes PVOL providing each of the storage tiers ST or for the storage areas (LDEV: Logical Devices) taken from within a single pool volume PVOL.

Hence, in the case of FIG. 8, for example, it is clear that all of the pages '01' to 'p05' in the virtual volume pool VVP 'Pool1' are pages which have been assigned from the first storage tier ST called 'Tier0' which is provided by the LDEV '0001.' It can also be seen that the first storage tier ST 'Tier0' is provided by 'SSD' storage devices 30, and that the 'SSD' storage devices 30 form RAID group '1.'

The virtual volume creation management table 39 is a table for managing, in the storage apparatus 5A, virtual volumes VVOL whose creation is instructed by the system administrator via the virtual volume creation screen 50 (see FIG. 15) displayed on the management computer 4A and, as shown in FIG. 9, the virtual volume creation management table 39 is configured from a virtual volume ID field 39A, a capacity field 39B, a pool ID field 39C, a threshold field 39D, and a performance/cost level field 39E.

The virtual volume ID field 39A stores the volume IDs of the virtual volumes VVOL provided by the host computers 3 and the capacity field 39B stores the capacities of the virtual volumes VVOL. In addition, the pool ID field 39C stores the volume pool IDs of the virtual volume pools VVP associated with the virtual volumes VVOL.

In addition, the threshold field 39D stores usage capacities which are preconfigured for the virtual volumes VVOL. If the used capacity of a virtual volume VVOL exceeds this threshold, a warning to that effect is reported to the system administrator. Furthermore, the performance/cost level field 39E stores performance/cost level information for the storage tiers ST associated with the virtual volumes VVOL.

Hence, in the case of FIG. 9, it can be seen that virtual volume VVOL 'v101,' for example, comprises a capacity of '10 GB' and is associated with a virtual volume pool VVP 'Pool1.' It can also be seen that a capacity threshold '8 GB' is configured for the virtual volume VVOL 'v101' and the performance/cost level of the corresponding storage tier ST is configured as 'high.'

The Tier ratio management table 40 is a table for managing combinations of the usage ratios of each of the storage tiers ST for each performance/cost level and, as shown in FIG. 10, is configured from the performance/cost level field 40A and Tier ratio fields 40B.

The performance/cost level field 40A stores the performance/cost level types (high, medium or low here), and the Tier ratio fields 40B for each storage tier ST store, for each type of performance/cost level, the usage ratios of each of the storage tiers ST of predefined combinations.

Hence, in the case of FIG. 10, it can be seen that the usage ratios of each of the storage tiers ST with a 'high' performance/cost level, for example, are predefined as '50%' for the usage ratio of the first storage tier ST, '40%' for the usage ratio of the second storage tier ST, and '10%' for the usage ratio of the third storage tier ST.

The pool capacity management table 41 is a table for managing, in the storage apparatus 5A, the total capacities and unused capacities of the virtual volume pools VVP defined in the storage apparatus 5A and, as shown in FIG. 11, is configured from the pool ID field 41A, the total capacity field 41B, and the unused capacity field 41C.

The pool ID field 41A stores the volume pool IDs of each of the virtual volume pools VVP defined in the storage apparatus 5A. Furthermore, the total capacity field 41B stores the total capacity (total number of pages) assignable to the corresponding virtual volume VVOL for each of the storage tiers ST. In addition, the unused capacity field 41C stores, for each of the storage tiers ST, the unused capacity (unused pages) which is calculated by deducting the assigned pages from the total capacity (total number of pages) which can be assigned to the corresponding virtual volume VVOL for each of the storage tiers ST.

Therefore, in the case of FIG. 11, for the virtual volume pool VVP 'Pool1,' for example, '1000' pages' worth can be assigned to the corresponding virtual volume VVOL from the first storage tier ST 'Tier0', but since pages have already been assigned, when these have been deducted, the unused capacity which can actually be assigned is equivalent to '8000' pages. Furthermore, similarly, '30000' pages are assignable from the second storage tier ST 'Tier1' to the corresponding virtual volume VVOL, the unused capacity which can actually be assigned when the assigned pages have been deducted is equivalent to 20000 pages. Likewise, '40000' pages are assignable to the virtual volume VVOL from the third storage tier ST 'Tier2' but the actual unused capacity which is assignable is '18000' pages when the assigned pages have been deducted.

The Tier management table 42 is a table for managing, in the management computer 4A, the storage tiers ST defined in the storage apparatus 5A and, as shown in FIG. 12, is configured from a virtual volume ID field 42A, a capacity field 42B, a threshold 42C, a usage ratio field 42D, a maximum capacity field 42E, and an assigned capacity field 42F.

The virtual volume ID field 42A stores the volume IDs of the virtual volumes VVOL defined in the storage apparatus 5A and the capacity field 42B stores the capacities of the virtual volumes VVOL. In addition, the threshold field 42C stores the thresholds for the usage capacities preconfigured for the virtual volumes VVOL. If the usage capacities of a virtual volume VVOL is exceeded, a warning to that effect is reported to the system administrator.

Further, the usage ratio field 42D stores the usage ratios for each of the storage tiers ST associated with the virtual volumes VVOL and the maximum capacity field 42E stores the assignable maximum capacities of each of the storage tiers ST associated with the virtual volumes VVOL. The assigned capacity field 42F stores the assigned capacities of each of the storage tiers ST associated with the virtual volumes VVOL.

Hence, in the case of FIG. 12, it can be seen that the virtual volume VVOL 'v101,' for example, comprises a capacity of '10 G,' and that a threshold of '8 GB' has been configured. It can also be seen that the usage ratios of each of the storage tiers ST associated with the virtual volume VVOL 'v101' are managed as '50%' for the first storage tier ST ('Tier0'), '40%' for the second storage tier ST ('Tier1'), and '10%' for the third storage tier ST ('Tier2').

Furthermore, it can be seen that the maximum capacities for each of the storage tiers ST of the virtual volume VVOL 'v101' are managed as '5 GB' for the first storage tier ('Tier0'), '4 GB' for the second storage tier ('Tier1'), and '1 GB' for the third storage tier ST ('Tier2'). Note that the maximum capacity of each of the storage tiers ST is a value which is obtained by multiplying the maximum capacity of a virtual volume VVOL by the usage ratio of each of the storage tiers ST. For example, the maximum capacity of the virtual volume VVOL 'v101' is '10 GB', and the usage ratios of each of the storage tiers ST are '50%' for the first storage tier ST, '40%' for the second storage tier ST, and '10%' for the third storage tier ST, and hence the maximum capacity which can be assigned from the first storage tier ST is calculated from the following equation:

[Math. 1]

$$10 \text{ GB} \times 50\% = 5 \text{ GB} \qquad (1)$$

and the maximum capacity which can be assigned from the second storage tier ST is calculated as per the following equation:

[Math. 2]

$$10\ GB \times 40\% = 4\ GB \quad (2)$$

and the maximum capacity which can be assigned from the third storage tier ST is calculated as per the following equation:

[Math. 3]

$$10\ GB \times 10\% = 1\ GB \quad (3)$$

Furthermore, it can be seen that the assigned capacities of each of the storage tiers ST associated with the virtual volume VVOL 'v101' are '5 GB' for the first storage tier ST ('Tier0'), '4 GB' for the second storage tier ST ('Tier1'), and '1 GB' for the third storage tier ST ('Tier2'). In other words, it is clear that pages have already been assigned across the full scope of the usage ratios for each of the storage tiers ST for the virtual volume VVOL 'v101.'

The access frequency management table 43 is a table for managing the access frequencies of access by the host computers 3 to the virtual volumes VVOL defined in the storage apparatus 5A and, as shown in FIG. 13, is configured from a virtual volume ID field 43A, a pool ID field 43B, an assigned LBA field 43C, a page ID field 43D, an I/O frequency field 43E, a Tier field 43F, and a migration destination Tier field 43G.

The virtual volume ID field 43A stores volume IDs of the virtual volumes VVOL defined in the storage apparatus 5A and the pool ID field 43B stores the volume pool IDs of the virtual volume pools VVP associated with the virtual volumes VVOL. The assigned LBA field 43C stores, among the logical blocks of the virtual volumes VVOL, the LBAs of assigned logical blocks with pages assigned.

In addition, the page ID field 43D stores the page IDs of the pages assigned to the logical blocks of the virtual volumes VVOL, and the I/O frequency field 43E stores the access frequencies per unit time by the host computers 3 to the data stored on the pages. Furthermore, the Tier field 43F stores the identifiers of the current storage tiers ST to which pages are assigned. The migration destination Tier field 43G stores the identifiers of the storage tiers ST of the migration-destination pages if data stored on the pages is moved between the storage tiers ST based on the access frequencies from the host computers 3.

Hence, in the case of FIG. 13, the virtual volume VVOL 'v101,' for example, is associated with the virtual volume pool VVP 'Pool1' and, among the logical blocks of the virtual volumes VVOL, the pages 'p01' to 'p10' are assigned in units of 1 MB in the range '0 MB to 10 MB.' Furthermore, the access frequency per unit time by the host computer 3 to the data stored on page 'p01' is '1000' and the storage tier ST to which page 'p01' is currently assigned is 'Tier0.' Further, even when data stored on page 'p01' is migrated between storage tiers ST based on the access frequency by the host computer 3, the migration destination storage tier ST is 'Tier0.'

Note that the access frequency per unit time by the host computers 3 to the data stored on page 'p02' is '2000,' and is greatest among the pages 'p01' to 'p10' which are assigned to the virtual volume VVOL 'v101.' Accordingly, if data stored on page 'p02' is migrated between storage tiers ST based on the access frequency by the host computer 3, data stored on page 'p02' comes to be migrated from the first storage tier ST 'Tier1' to the second storage tier ST 'Tier0' and is migrated between the storage tiers ST.

The Tier migration page management table 44 is a table for managing the number of pages storing data which is migrated between the storage tiers ST based on the access frequencies from the host computer 3 and, as shown in FIG. 14, is configured from a virtual volume ID field 44A, a determined page count field 44B, a relocation-incomplete page count field 44C, a relocation-complete page count field 44D, and a storage tier migration target page count field 44E.

The virtual volume ID field 44A stores the volume IDs of the virtual volumes VVOL defined in the storage apparatus 5A and the determined page count field 44B stores, among the pages assigned to the virtual volumes VVOL, the number of pages migrated between storage tiers ST. Note that, technically, the data is migrated between storage tiers ST and pages are not migrated between storage tiers ST. Rather, handling is such that pages storing data appear to be migrated as the data is migrated between the storage tiers ST. However, for the sake of simplification here, the migration of data between storage tiers ST will simply be expressed as pages being migrated between storage tiers ST.

The relocation-incomplete page count field 44C stores the number of pages for which migration is incomplete in the number of pages migrated between the storage tiers ST and the relocation-complete page count field 44D stores the number of pages for which migration is complete in the number of pages migrated between the storage tiers ST. Furthermore, the storage tier migration target count field 44E stores the storage-source and storage-destination storage tiers ST and the number of pages targeted for migration which correspond to these tiers ST.

Hence, in the case of FIG. 14, it can be seen that, among the pages which are assigned to the virtual volume VVOL 'v101,' for example, the number of pages migrated between storage tiers ST is '2200,' and of these '2200,' the number of relocation-incomplete pages which have not yet been migrated between storage tiers ST is '2200.' In other words, the number of pages which have actually been migrated between storage tiers ST is '0' pages.

Furthermore, in the virtual volume VVOL 'v101,' the planned number of pages to be migrated from the first storage tier ST ('Tier0') to the second storage tier ST ('Tier1') is '60' pages, the planned number of pages to be migrated from the first storage tier ST ('Tier0') to the third storage tier ST ('Tier2') is '300' pages, and the planned number of pages to be migrated from the second storage tier ST ('Tier1') to the first storage tier ST ('Tier0') is '800' pages.

(1-3) Configuration of Virtual Volume Creation Screen

Figure 15:
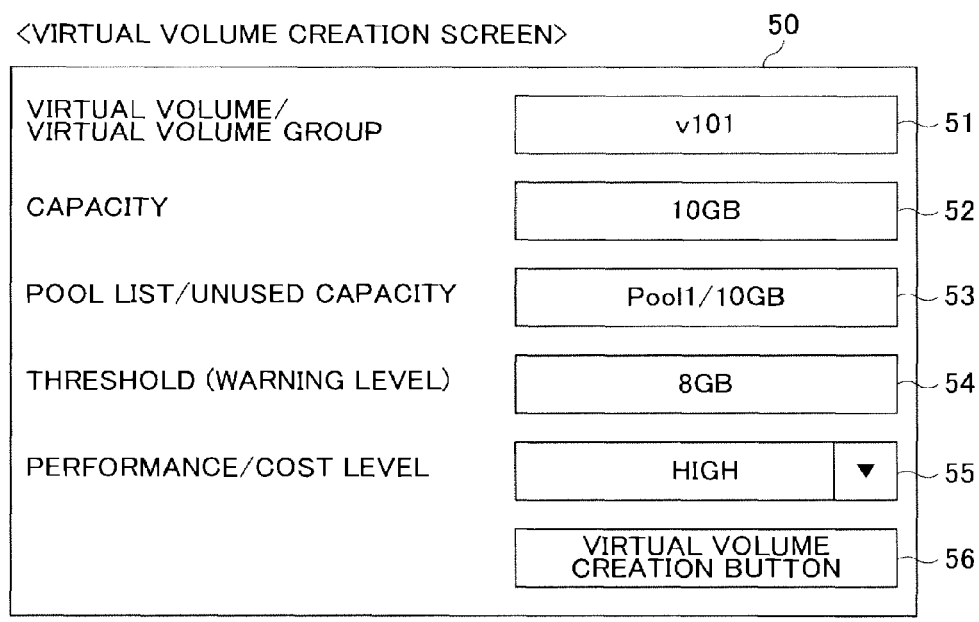
FIG. 15 is a line diagram showing an overview of the configuration of a virtual volume creation screen.

FIG. 15 shows a configuration example of the aforementioned virtual volume creation screen 50 which is displayed on the management computer 4A by starting up the virtual volume creation program 21A (see FIG. 3) of the management computer 4A. The system administrator uses the virtual volume creation screen 50 in order to be able to create, in the storage apparatus 5A, virtual volumes VVOL for which the usage ratios of the first to third storage tiers ST following the page relocation processing are desirable ratios.

In reality, as shown in FIG. 15, the virtual volume creation screen 50 is configured with a virtual volume/virtual volume group field 51, a capacity field 52, a pool list/unused capacity field 53, a threshold field 54, a performance/cost level field 55, and a virtual volume creation button 56.

The virtual volume/virtual volume group field 51 is a field with which the system administrator designates (inputs) the volume ID of the virtual volume VVOL to be created at the time or the identifier of the group of the virtual volume VVOL (virtual volume group VVOL). Furthermore, the capacity field 52 is a field for designating the capacities of one or more of virtual volumes VVOL, and the pool list/unused capacity field 53 is a field for designating the volume pool IDs of one or more virtual volumes VVP which are associated with the virtual volumes VVOL.

In addition, the threshold field 54 is a field for designating the threshold (warning level) for the capacities of the virtual volumes VVOL. If the used capacity of a virtual volume exceeds the threshold designated here, a warning to that effect is reported to the system administrator. A suitable threshold to be used may be the write capacity of the virtual volume VVOL ('8 GB' for example) or may be the percentage of the write capacity relative to the total capacity of the virtual volume VVOL ('80%' for example).

The performance/cost level field 55 is a field for designating the performance/cost level of the virtual volume VVOL. In the case of this embodiment, a pulldown button is provided at the right end of the performance/cost level field 55 and by clicking the pulldown button, a pulldown menu with characters expressing the performance/cost level in three levels, namely, 'high,' 'medium,' and 'low' can be displayed. The system administrator is then able to select the desired performance/cost level from the performance/cost level displayed in the pulldown menu, at which point a character representing the performance/cost level selected is displayed in the performance/cost level field 55.

The virtual volume creation button 56 is a button for executing processing to create a virtual volume VVOL which corresponds to the content input to each of the fields, namely, the virtual volume/virtual volume group field 51, the capacity field 52, the pool list/unused capacity field 53, the threshold field 54, and the performance/cost level field 55. When the virtual volume creation button 56 is clicked after the required items are input to each of the virtual volume creation program 21A, the virtual volume/virtual volume group field 51, the capacity field 52, the pool list/unused capacity field 53, the threshold field 54, and the performance/cost level field 55, the virtual volume creation program 21A transfers the content input by the system administrator via the virtual volume creation screen 50 to the storage apparatus 5A together with a virtual volume creation instruction command as virtual volume requirement information. Upon receipt of the virtual volume creation instruction command and virtual volume requirement information, the storage apparatus 5A internally creates a virtual volume VVOL according to the virtual volume requirement information.

Note that the volume ID of the virtual volume VVOL need not be designated by the system administrator via the virtual volume creation screen 50 but instead may be selected by the virtual volume creation program 21A according to a predetermined rule, for example.

(1-4) Various Processing

The processing routine for various processing relating to the data management method according to this embodiment will be explained next. Note that, in the following description, various processes are explained in terms of 'programs' but it is understood that, in reality, the processor 20 of the management computer 4A or the controller 31 of the storage apparatus 5A execute these processes based on the 'programs.'

(1-4-1) Virtual Volume Parent Creation Processing

Figure 16:
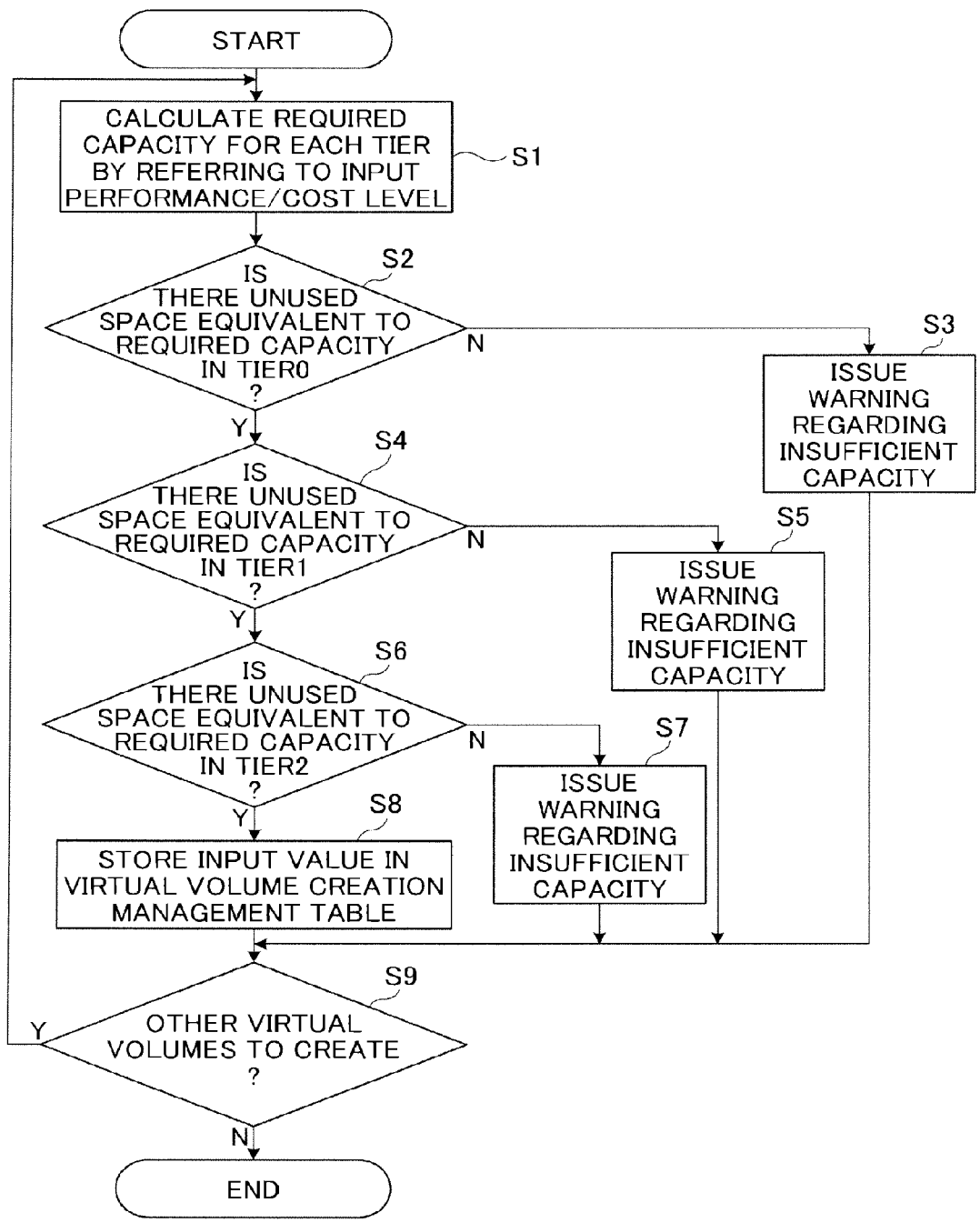
FIG. 16 is a flowchart showing the processing routine for virtual volume parent creation processing.

FIG. 16 shows a processing routine for virtual volume parent creation processing which is executed by the virtual volume control program 35 (see FIG. 4) of the storage apparatus 5A in association with the data management method according to this embodiment. When the virtual volume creation instruction command and virtual volume requirement information are issued from the management computer 4A, the virtual volume control program 35 of the storage apparatus 5A creates a new virtual volume VVOL which satisfies the virtual volume requirement information according to the processing routine shown in FIG. 16.

That is, the virtual volume control program 35 starts the virtual volume parent creation processing when the virtual volume creation instruction command and the virtual volume requirement information are issued from the management computer 4A, and first extracts, from the virtual volume requirement information, the performance/cost level and capacity designated by the system administrator for the virtual volume VVOL which is to be created, and calculates the capacities of the first to third storage tiers ST which are required during page relocation processing of the virtual volume VVOL based on the extracted performance/cost level and capacities, and Tier ratio management table 40 (see FIG. 10) (S1).

For example, suppose that '10 GB' is designated as the capacity of the virtual volume VVOL and 'high' is designated as the performance/cost level. In this case, when the Tier ratio management table 40 is referred to, the usage ratios for the first to third storage tiers ST with 'high' performance/cost levels are controlled to be '50%' for the first tier ST ('Tier0'), '40%' for the second tier ST ('Tier1'), and '10%' for the third storage tier ST ('Tier2'). Accordingly, the virtual volume control program 35 calculates the storage capacity which is to be assigned from the first storage tier ST to the virtual volume VVOL from the following equation:

[Math. 4]

$$10\ GB \times 50\% = 5\ GB \qquad (4)$$

and the storage capacity to be assigned to the virtual volume VVOL from the second storage tier ST is calculated as per the following equation:

[Math. 5]

$$10\ GB \times 40\% = 4\ GB \qquad (5)$$

and the storage capacity which can be assigned to the virtual volume VVOL from the third storage tier ST is calculated as per the following equation:

[Math. 6]

$$10\ GB \times 10\% = 1\ GB \qquad (6)$$

The virtual volume control program 35 then extracts, from the virtual volume requirement information, the pool ID of the virtual volume pool VVP which is to be associated with the virtual volume VVOL to be created, and determines, based on the extracted pool ID and the pool capacity management table 41 (see FIG. 11), whether or not there is an unused capacity equivalent to the capacity required that was calculated in step S1 in the pool volume PVOL of the first storage tier ST forming the virtual volume pool VVP (S2).

Upon receiving a negative result in this determination, the virtual volume control program 35 issues a warning to the effect that there is insufficient capacity, according to whether there is a sound or image (S3) and then moves to step S9.

However, upon obtaining an affirmative result in the determination of step S2, the virtual volume control program 35 determines whether or not there is unused capacity equivalent to the capacity required which was calculated in step S1 in the pool volume PVOL of the second storage tier ST which forms the virtual volume pool VVP (S4).

Furthermore, upon obtaining a negative result in this determination, the virtual volume control program 35 issues a warning to the effect that there is insufficient capacity according to whether there is a sound or image (S5) and then moves to step S9.

If, on the other hand, an affirmative result is obtained in the determination of step S4, the virtual volume control program 35 determines whether or not there is unused capacity equivalent to the capacity required which was calculated in step S1 in the pool volume PVOL of the third storage tier ST which forms the virtual volume pool VVP (S6).

Upon obtaining a negative result in this determination, the virtual volume control program 35 issues a warning to the effect that there is insufficient capacity according to whether there is a sound or image (S7) and then moves to step S9.

If, on the other hand, an affirmative result is obtained in the determination of step S6, the virtual volume control program 35 extracts, from the virtual volume requirement information, the volume ID and capacity of the virtual volume VVOL to be created at the time, the pool ID, threshold, and performance/cost level of the virtual volume pool VVP which is to be associated with the virtual volume VVOL, and stores the extracted information in the respective fields (39A to 39E) of the virtual volume creation management table 39 (see FIG. 9) (S8).

The virtual volume control program 35 subsequently determines whether or not there is another virtual volume VVOL to be created based on the virtual volume requirement information (S9). For example, if a plurality of volume IDs are input to the virtual volume ID field 51 in the virtual volume creation screen 50 described earlier with reference to FIG. 15, these volume IDs are included in the virtual volume requirement information and hence, in this case, the virtual volume control program 35 determines that there is a virtual volume VVOL which should also be newly created.

Hence, the virtual volume control program 35 returns to step S1 upon obtaining the affirmative result in this determination and subsequently repeats the loop of steps S1 to S9 until the creation of the virtual volumes VVOL is complete for all the volume IDs contained in the virtual volume requirement information.

If, on the other hand, the virtual volume control program 35 obtains a negative result in step S9, the virtual volume control program 35 terminates the virtual volume parent creation processing. Note that, according to this embodiment, in consideration of reliability, if there is no free capacity in each of the storage layers ST in Tiers 0 to 2, that is, if there is no real volume therein, it is assumed that a virtual volume VVOL cannot be created when a capacity shortage warning is issued however, the embodiment is not limited to such an arrangement, i.e. a virtual volume VVOL could be created even when a real volume is lacking.

(1-4-2) Tier Management Table Creation Processing

Figure 17:
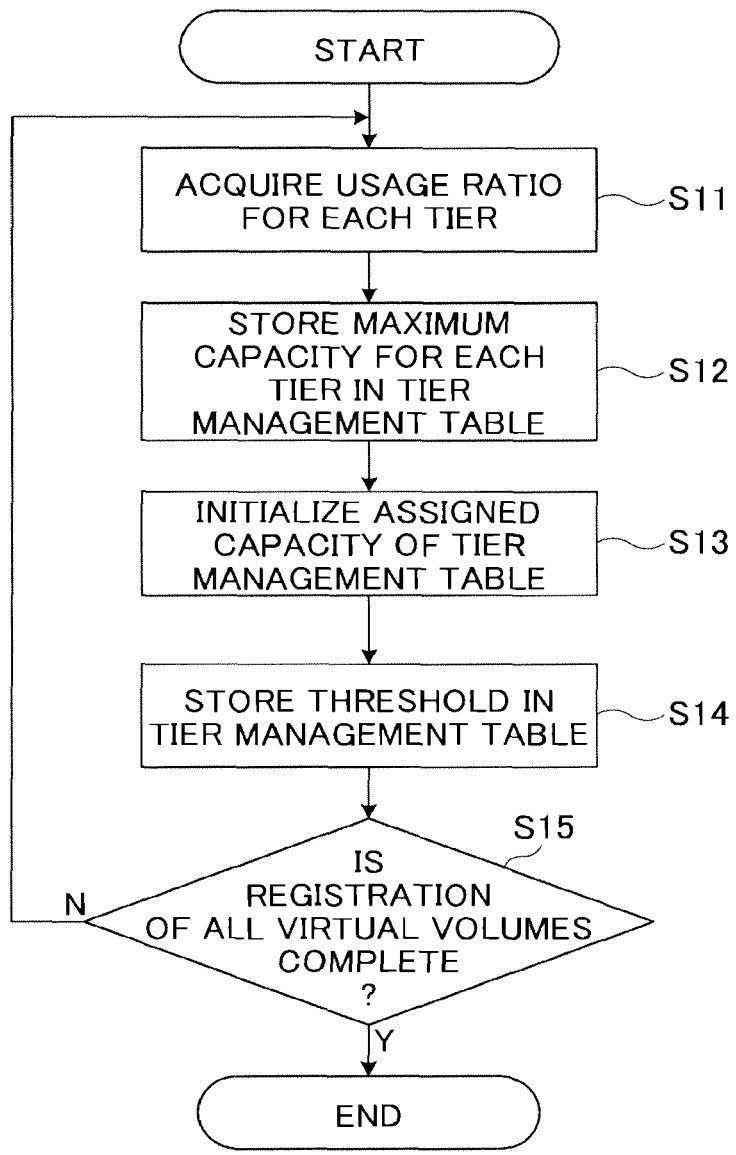
FIG. 17 is a flowchart showing the processing routine for Tier management table creation processing.

Meanwhile, FIG. 17 shows a processing routine for Tier management table creation processing which is executed by the virtual volume control program 35 (see FIG. 4) of the storage apparatus 5A in association with the data management method according to this embodiment. When the parent virtual volume VVOL is created, the virtual volume control program 35 stores various information on the newly created virtual volume VVOL in the Tier management table 42 (see FIG. 12) according to the processing routine shown in FIG. 17.

That is, the virtual volume control program 35 starts the virtual volume parent creation processing (see FIG. 16) when the virtual volume creation instruction command and the virtual volume requirement information are issued from the management computer 4A, and starts the Tier management table creation processing when the new virtual volume VVOL is created by the virtual volume parent creation processing.

The virtual volume control program 35 first creates a new row (entry) in the Tier management table 42 (see FIG. 12) and, of the various fields in the created entry (virtual volume ID field 42A, capacity field 42B, threshold 42C, usage ratio field 42D, maximum capacity field 42E, and assigned capacity field 42F), the virtual volume control program 35 stores the virtual volume ID and the capacity of the virtual volume VVOL which were extracted from the virtual volume requirement information in the virtual volume ID field 42A and capacity field 42B. Furthermore, the virtual volume control program 35 stores the usage ratios of the various storage tiers ST associated with the virtual volume VVOL in the usage ratio field 42D on the basis of the performance/cost level and Tier ratio management table 40 (see FIG. 10) which were extracted from the virtual volume requirement information.

The virtual volume VVOL control program 35 then acquires the usage ratios of each of the storage tiers ST associated with the virtual volume VVOL on the basis of the performance/cost levels stored in the virtual volume creation management table 39 (see FIG. 9) and the usage ratios of each of the storage tiers ST associated with the performance/cost levels stored in the Tier ratio management table 40 (see FIG. 10) (S11).

The virtual volume control program 35 subsequently calculates the maximum capacity of each of the storage tiers ST by multiplying the capacities of the virtual volumes VVOL stored in the virtual volume creation management table 39 by the usage ratios of each of the storage tiers ST acquired in step S11 and stores the maximum capacities of the each of the calculated storage tiers ST in the maximum capacity field 42E of the Tier management table 42 (S12).

The virtual volume control program 35 initializes the capacities stored in the assigned capacity field 42F in the Tier management table 42 (S13), and the virtual volume control program 35 stores the threshold stored in the threshold 39D of the virtual volume creation management table 39 in the threshold field 42C of the Tier management table 42 (S14).

The virtual volume control program 35 determines whether or not registration in the Tier management table 42 is complete for all the newly created virtual volumes VVOL (S15).

Upon obtaining a negative result in this determination, the virtual volume control program 35 determines that there is another virtual volume VVOL to be registered in the Tier management table 42 and advances to step S11, and repeats the loop of steps S11 to S15 until registration is complete for all the virtual volumes VVOL.

However, upon obtaining an affirmative result in the determination of step S15, the virtual volume control program 35 terminates the Tier management table creation processing.

(1-4-3) Tier Range Creation Processing

Figure 18:
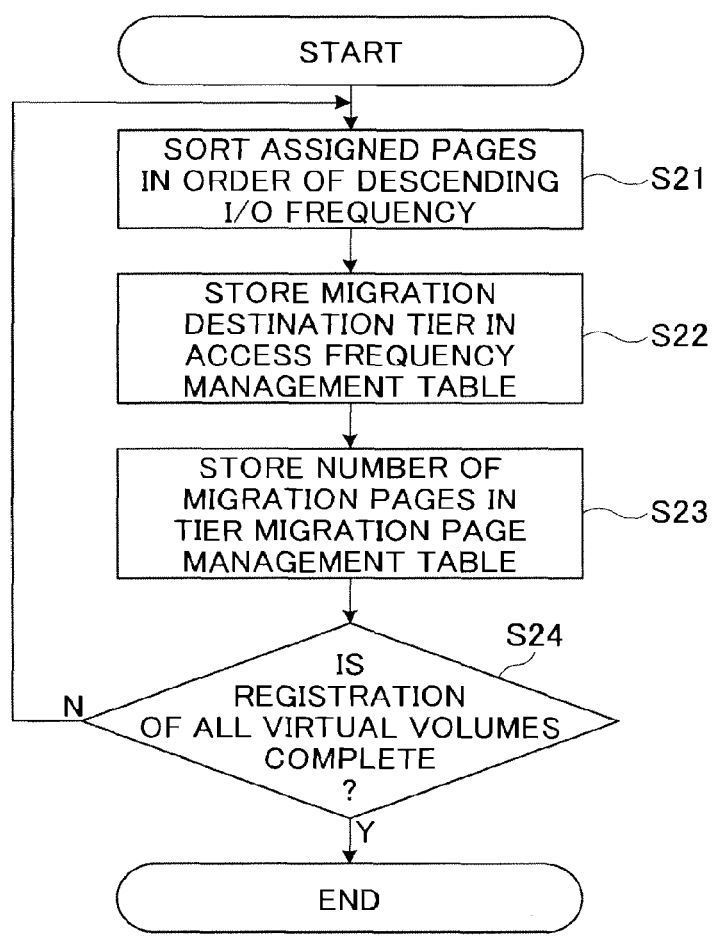
FIG. 18 is a flowchart showing the processing routine for Tier range creation processing.

FIG. 18 shows a processing routine for Tier range creation processing which is executed by the virtual volume control program 35 (see FIG. 4) of the storage apparatus 5A in association with the data management method according to this embodiment. The virtual volume control program 35 performs page relocation processing for migrating data, which is stored on the pages assigned to the logic blocks in the virtual volume VVOL, between storage tiers ST at regular or irregular intervals according to the schedule, referring at this time to the access frequency management table 43 (see FIG. 43) and the Tier migration page management table 44 (see FIG. 14). The virtual volume control program 35 executes Tier range creation processing shown in FIG. 18 in order to store information required in the access frequency management table 43 and Tier migration page management table 44 which are referred to when page relocation processing is performed.

In reality, the user or system administrator is able to create this schedule by operating the host computer 3 or management computer 4A and is able to configure this schedule for the storage apparatus 5A. The virtual volume control program 35 of the storage apparatus 5A continually monitors this schedule and ultimately starts the Tier range creation processing shown in FIG. 18 before the page relocation processing according to the timing for executing the page relocation processing (see FIG. 22).

First, the virtual volume control program 35 creates a new row (entry) in the access frequency management table 43 (see FIG. 13) and, among each of the fields of the created entry (the virtual volume ID field 43A, the pool ID field 43B, the assigned LBA field 43C, the page ID field 43D, the I/O frequency field 43E, the Tier field 43F, and the migration destination Tier field 43G), stores the required information in all the fields (43A to 43F) excluding the migration destination Tier field 43G. Note that, here, the virtual volume control program 35 extracts the information required from the virtual volume requirement information, virtual volume-assignment pool page management table 36, pool-logical volume assignment management table 37, and the pool-logical volume information 38.

Thereafter, the virtual volume control program 35 refers to the page ID field 43D and I/O frequency field 43E of the access frequency management table 43 and sorts through the assigned page associated with the virtual volume VVOL in the order of the access frequencies per unit time (I/O (Input-Output) frequencies) (S21), and assigns storage tiers ST to the assigned pages sorted in order starting with the highest I/O frequency (S21).

Here, at the time of the assignment of the storage tiers ST, the virtual volume control program 35 first refers to the Tier management table 42 (see FIG. 12) and acquires the maximum capacity of each of the storage tiers ST. The virtual volume control program 35 subsequently assigns storage tiers ST to the assigned pages which have been sorted in order starting with the highest I/O frequency within the range of the maximum capacity of the acquired storage tiers ST (that is, in the range of the usage ratios of each of the storage tiers ST).

The virtual volume control program 35 then stores the storage tiers ST which have been re-assigned to an assigned page in the migration destination Tier field 43G of the access frequency management table 43 (S22).

Meanwhile, the virtual volume control program 35 creates a new row (entry) in the Tier migration page management table 44 (see FIG. 14), and stores the volume IDs of the virtual volumes VVOL which are targets of the page relocation processing in the virtual volume ID field 44A in the entry thus created. Further, the virtual volume control program 35 refers to the migration destination Tier field 43G of the access frequency management table 43 stored in step S22 and the Tier field 43F which indicates the current storage tier ST, calculates the number of pages to be migrated between storage tiers ST, and stores the calculated page count in the determined page count field 44A of the Tier migration page management table 44 (S23).

The virtual volume control program 35 additionally refers to the Tier field 43F of the access frequency management table 43 and the migration destination Tier field 44F and stores the number of pages to be migrated between the storage tiers ST in the storage tier migration target page count field 44E in the Tier migration page management table 44.

Note that, when page relocation processing is or has been performed at regular or irregular intervals according to the schedule, the virtual volume control program 35 stores the number of pages in the relocation-incomplete page count field 44C, relocation-complete page count field 44D, and the storage tier migration target page count field 44E. For example, if pages are migrated between the storage tiers ST based on the access frequency by the host computers 3, the virtual volume control program 35 stores the number of pages following the page relocation processing in each of the relocation-incomplete page count field 44C, relocation-complete page count field 44D, and storage tier migration target page count field 44E.

The virtual volume control program 35 determines whether or not registration in the access frequency management table 43 and Tier migration page management table is complete for all the virtual volumes VVOL on which page relocation processing is to be executed (S24).

If a negative result is obtained in this determination, the virtual volume control program 35 determines that there is another virtual volume VVOL which is a target for page relocation processing and advances to step S21, and repeats the loop of steps S21 to S23 until registration is complete for all the virtual volumes VVOL.

However, upon obtaining an affirmative result in the determination of step S24, the virtual volume control program 35 terminates the Tier range creation processing.

(1-4-4) Write Processing

Figure 19:
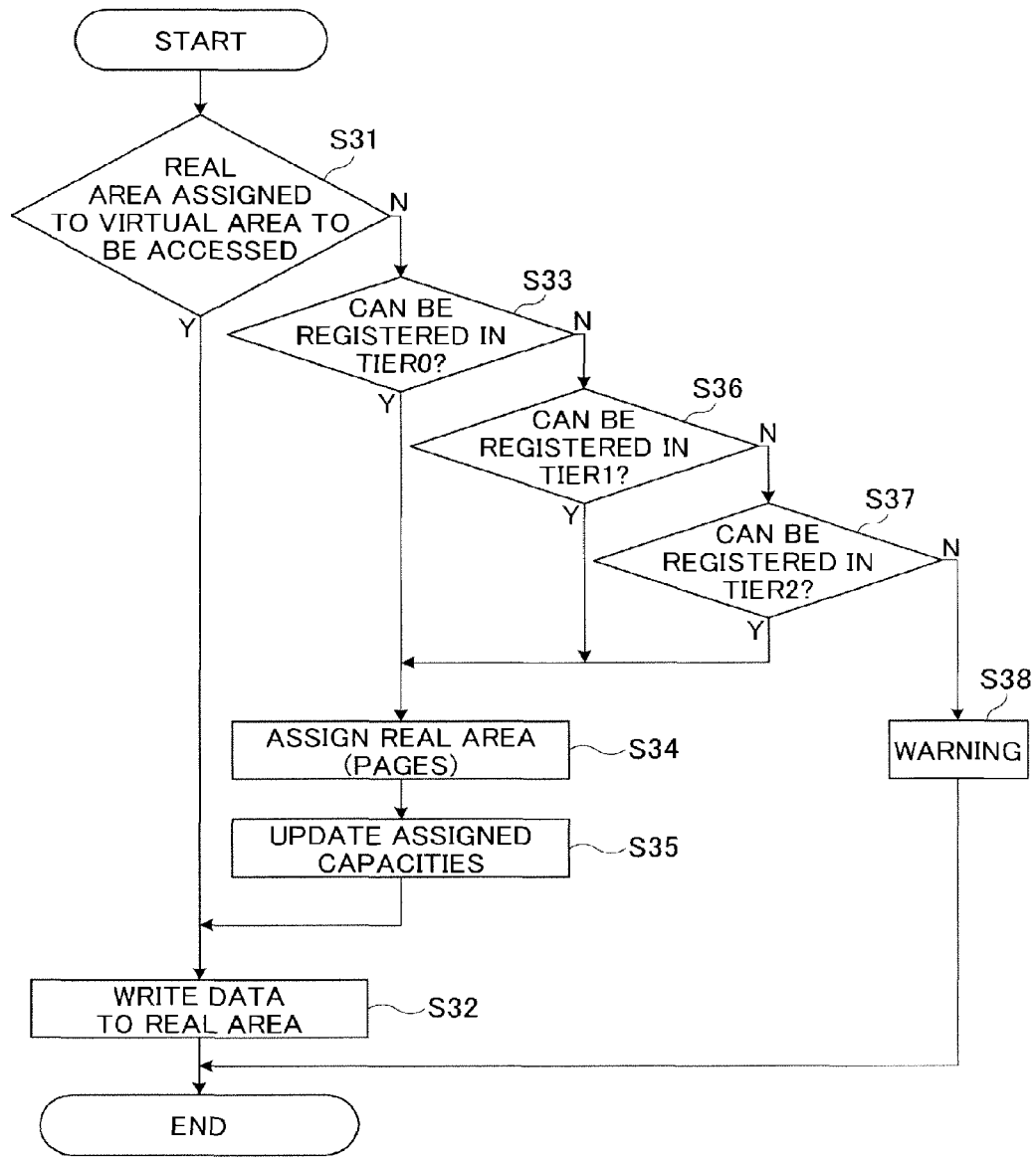
FIG. 19 is a flowchart showing the processing routine for write processing.

FIG. 19 shows a processing routine for write processing which is executed by the virtual volume control program 35 (see FIG. 4) of the storage apparatus 5A. The virtual volume control program 35 starts this write processing upon receiving data write requests from the host computers 3 to write to the storage apparatus 5A at regular or irregular intervals. In addition, the virtual volume control program 35 updates the assigned capacities stored in the assigned capacity field 42F of the Tier management table 42 in this write processing.

First, upon receiving the data write request from the host computer 3, the virtual volume control program 35 determines whether or not a real area has been assigned to the virtual area accessed by the write request (S31).

In other words, the virtual volume control program 35 determines whether or not a page has been assigned from any of the storage tiers ST among the first to third storage tiers ST to the logical blocks of the virtual volume VVOL.

Upon obtaining an affirmative result in this determination, the virtual volume control program 35 writes data to the pages which are real areas (S32) and ends the write processing.

If, on the other hand, the virtual volume control program 35 obtains a negative result in the determination of step S31, the virtual volume control program 35 determines whether or not a page can be assigned from the first storage tier ST (Tier0) (S33).

Figure 20:
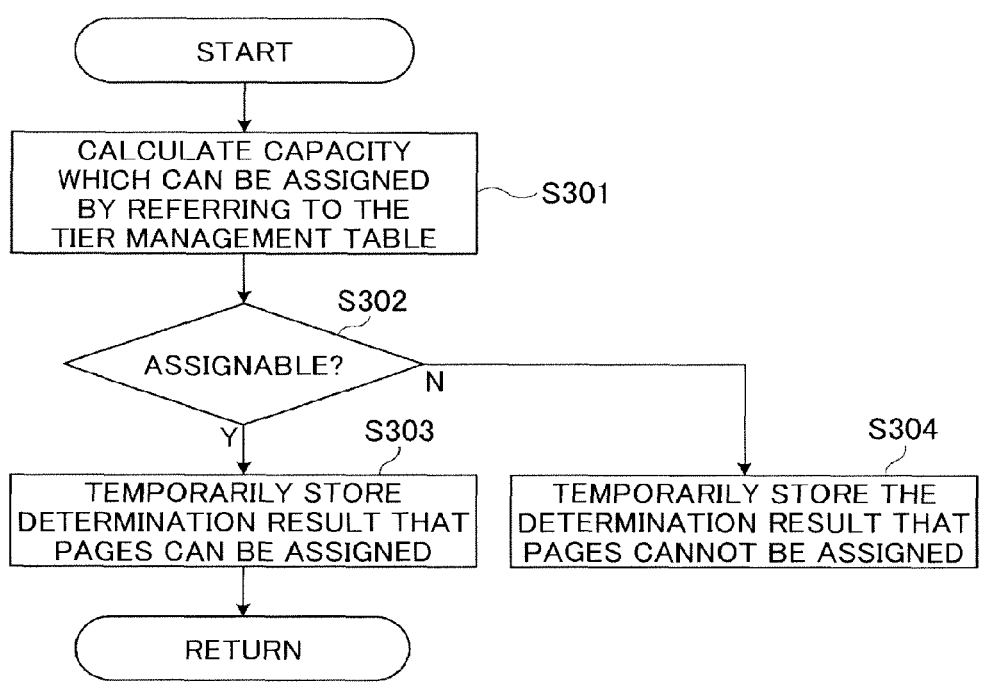
FIG. 20 is a flowchart showing the processing routine for Tier registration determination processing.

Here, in order to determine whether or not pages can be assigned from the first storage tiers ST, the virtual volume control program 35 performs Tier registration determination processing (see FIG. 20). With the Tier registration determination processing, the virtual volume control program 35 is able to determine whether or not pages can be registered in the storage tiers ST (pages can be assigned from the storage tiers ST).

Upon obtaining an affirmative result in the determination of step S33, the virtual volume control program 35 assigns pages from the first storage tier ST (S34) and updates the assigned capacity field 42F of the Tier management table 42 (see FIG. 12) (S35). The virtual volume control program 35 then writes data to pages assigned from the first storage tier ST (S32) and terminates the write processing.

However, upon obtaining a negative result in the determination of step S33, the virtual volume control program 35 performs Tier registration determination processing (see FIG. 20), and determines whether or not pages can be assigned from the second storage tier ST (Tier1) (S36).

Upon receiving an affirmative result in this determination, the virtual volume control program 35 assigns pages from the second storage tier ST (S34) and updates the assigned capacity field 42F in the Tier management table 42 (see FIG. 12) (S35). The virtual volume control program 35 then writes data to the pages assigned from the second storage tier ST (S32) and terminates the write processing.

However, upon obtaining a negative result in the determination of step S36, the virtual volume control program 35 performs Tier registration determination processing (see FIG. 20), and determines whether or not pages can be assigned from the third storage tier ST (Tier2) (S37).

Upon obtaining an affirmative result in this determination, the virtual volume control program 35 assigns pages from the third storage tier ST (S34) and updates the assigned capacity field 42F in the Tier management table 42 (see FIG. 12) (S35).

The virtual volume control program 35 then writes data to the pages assigned form the third storage tier ST (S32) and terminates the write processing.

However, upon obtaining a negative result in the determination of step S37, the virtual volume control program 35 issues a warning to the effect that pages cannot be assigned from any of the storage tiers ST among the first to third storage tiers ST (S38). More specifically, the virtual volume control program 35 issues a warning to the host computers 3 to the effect that data cannot be written to the virtual volume VVOL. The virtual volume control program 35 then terminates the write processing.

(1-4-5) Tier Registration Determination Processing

FIG. 20 shows a processing routine for Tier registration determination processing which is executed by the virtual volume control program 35 (see FIG. 4) of the storage apparatus 5A. Upon advancing to steps S33, S36 and S37 of the above write processing (see FIG. 19), the virtual volume control program 35 starts Tier registration determination processing in order to determine whether or not it is possible to assign pages from each of the storage tiers ST.

First, the virtual volume control program 35 refers to the Tier management table 42 (see FIG. 12) and acquires the maximum capacity and assigned capacity of each of the storage tiers ST, and calculates the assignable capacities of the storage tiers ST on the basis of the acquired maximum capacities and assigned capacities (S301).

For example, the maximum capacity of the first storage tier ST ('Tier0') associated with the virtual volume VVOL 'v101' is '5 GB' and the assigned capacity is '5 GB.' In the case of the virtual volume VVOL 'v101,' pages can then not be assigned from the first storage tier ST. However, the maximum capacity of the first storage tier ST associated with the virtual volume VVOL 'v102' is '10 GB' and the assigned capacity is '8 GB.' Accordingly, in the case of the virtual volume VVOL 'v102,' pages can be assigned from the first storage tier ST only in the amount of 2 GB which is obtained by deducting the assigned capacity from the maximum capacity.

The virtual volume control program 35 determines whether or not pages can be assigned from the assignable capacity calculated in step S301 (S302).

Upon obtaining an affirmative result in this determination, the virtual volume control program 35 temporarily stores the determination result to the effect that pages can be assigned in the memory 32 or the like (S303), and terminates the Tier registration determination processing.

However, upon obtaining a negative result in the determination of step S302, the virtual volume control program 35 temporarily stores the determination result to the effect that pages cannot be assigned in the memory 32 (S304) and terminates the Tier registration determination processing.

(1-4-6) Read Processing

Figure 21:
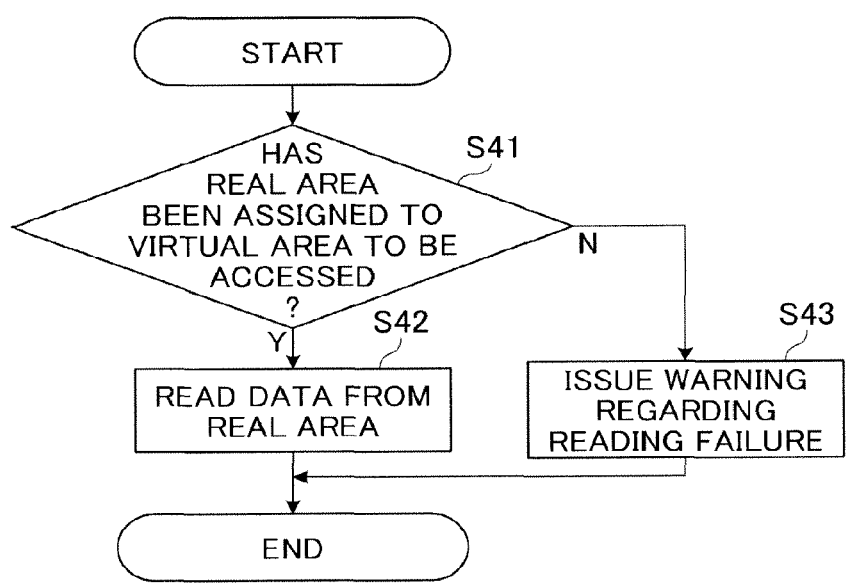
FIG. 21 is a flowchart showing the processing routine for read processing.

FIG. 21 shows the processing routine for read processing which is executed by the virtual volume control program 35 (see FIG. 4) of the storage apparatus 5A. Upon receipt of a data read request from the host computer 3 to read the storage apparatus 5A at regular/irregular intervals, the virtual volume control program 35 starts this read processing.

First, upon receiving the data read request from the host computer 3, the virtual volume control program 35 determines whether or not real area has been assigned to the virtual area accessed by the read request (S41). In other words, the virtual volume control program 35 determines whether or not pages have been assigned, from any of the storage tiers ST among the first to third storage tiers ST, to the logical blocks of the virtual volumes VVOL.

Upon receiving an affirmative result in this determination, the virtual volume control program 35 reads the data stored on the assigned page (S42) and terminates the read processing.

If, on the other hand, a negative result is obtained in the determination of step S41, the virtual volume control program 35 issues a warning to the effect that reading has failed to the host computer 3 (S43). The read processing is thus terminated.

(1-4-7) Page Relocation Processing

Figure 22:
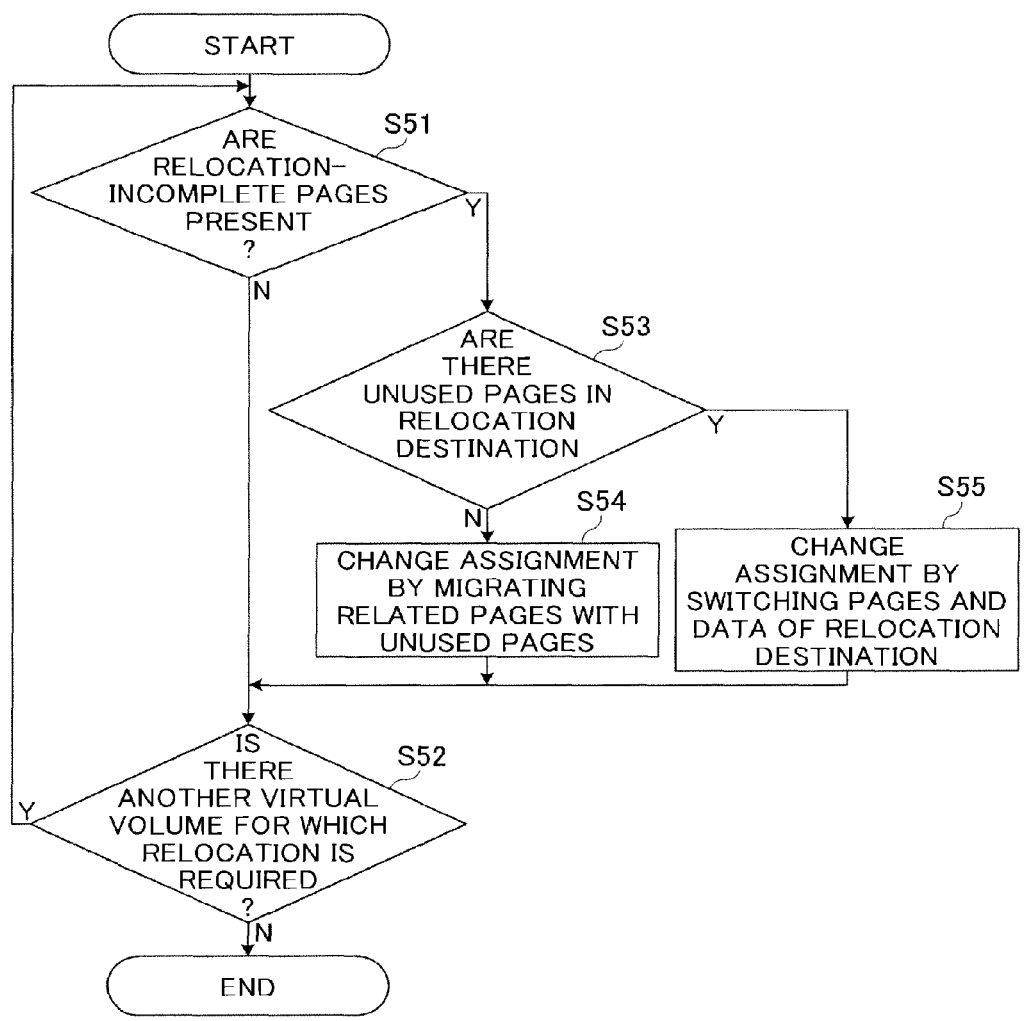
FIG. 22 is a flowchart showing the processing routine for page relocation processing.

FIG. 22 shows the processing routine for page relocation processing which is executed by the virtual volume control program 35 (see FIG. 4) in the storage apparatus 5A in association with the data management method according to this embodiment. The virtual volume control program 35 executes this page relocation processing when data stored on pages which have been assigned to logical blocks in the virtual volume VVOL is migrated based on the access frequency by the host computers 3 at regular or irregular intervals according to a schedule.

In reality, the users and system administrators are able to create this schedule by operating the host computer 3 or management computer 4A and configure this schedule in the storage apparatus 5A. The virtual volume control program 35 of the storage apparatus 5A continually monitors this schedule and ultimately starts the page relocation processing shown in FIG. 22 according to the timing for executing the page relocation processing.

The virtual volume control program 35 refers to the relocation-incomplete page count field 44C of the Tier migration page management table 44 (see FIG. 14) and determines whether there is a page for which relocation is incomplete among the pages assigned to the virtual volume VVOL which is targeted for page relocation processing (S51).

Upon obtaining a negative result in this determination, the virtual volume control program 35 determines that the page relocation processing is not required and determines whether or not there is another virtual volume VVOL for which page relocation processing is required (S52). Furthermore, upon obtaining an affirmative result in this determination, the virtual volume control program 35 performs the processing of step S51 on the other virtual volume VVOL. However, upon obtaining a negative result in the determination of step S52, the virtual volume control program 35 determines that currently there is no virtual volume VVOL for which page relocation processing is required and terminates the page relocation processing.

If, on the other hand, an affirmative result is obtained in the determination of step S51, the virtual volume control program 35 determines whether or not there are unused pages at the relocation destination (S53).

In other words, the virtual volume control program 35 determines whether or not there is unused capacity in the storage tier ST which is the data migration destination if data is migrated between storage tiers ST.

Upon obtaining a negative result in this determination, the virtual volume control program 35 secures unused pages at the relocation destination, and therefore data stored in the relocation planned pages (associated pages) which are pages currently assigned to the relocation destination is migrated to another storage tier ST and page assignment is changed (S54). The virtual volume control program 35 determines whether or not relocation is required for virtual volumes VVOL after the assignment has been changed (S52), and upon obtaining an affirmative result, moves to step S51 and determines whether or not there are once again pages for which relocation is incomplete (S51) and unused pages at the relocation destination (S53).

However, upon obtaining an affirmative result in the determination of step S53, the virtual volume control program 35 changes the page assignment destination from the storage tier ST to which the current pages are assigned to the relocation destination storage tier ST (S55). The virtual volume control program 35 then moves to step S52, determines whether or not there is a virtual volume VVOL requiring relocation (S52) and when an affirmative result is obtained in this determination, terminates the page relocation processing.

(1-5) Effect of the Embodiment

As mentioned earlier, with this embodiment, the performance/cost level of the storage tiers ST to which pages are assigned can be decided for each virtual volume VVOL and when page relocation processing is executed at regular or irregular intervals according to the schedule, data can be migrated between the first to third storage tiers ST based on the performance/cost level. Convenience for the user or system administrator can be improved accordingly.

(2) Second Embodiment (2-1) Computer System Configuration

In FIG. 1, 1B represents a computer system 1B according to a second embodiment. The computer system 1B is configured in the same way as the computer system 1A according to the first embodiment except for the fact it is possible to use numerical values to designate the usage ratios of the first to third storage tiers ST when data is migrated between the first to third storage tiers ST for the performance/cost levels of the virtual volumes VVOL created in a storage apparatus 5B.

Figure 23:
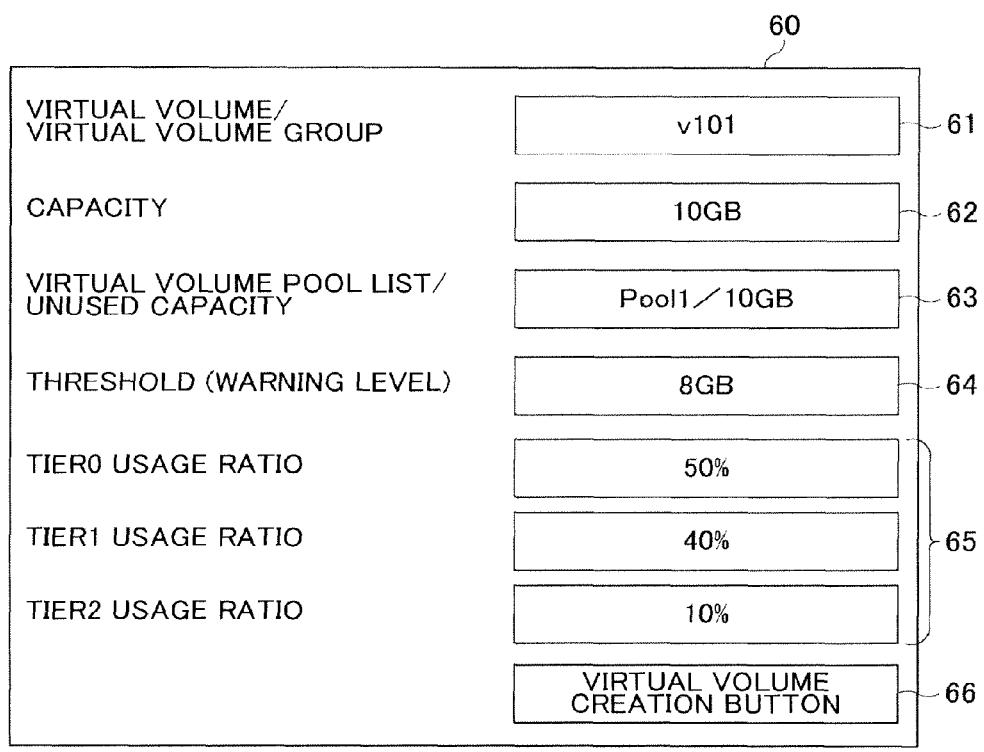
FIG. 23 is a line diagram showing an overview of the configuration of a virtual volume creation screen.

(2-2) Configuration of the Virtual Volume Creation Screen According to the Second Embodiment FIG. 23 shows a configuration example of the virtual volume creation screen 60 displayed on the management computer 4B by activating the virtual volume creation program 21A (see FIG. 3) of the management computer 4B. The system administrator is able to create, in the storage apparatus 5B, virtual volumes VVOL with the desired usage ratios for the first to third storage tiers ST following page relocation processing by using a virtual volume creation screen 60. The virtual volume creation screen 60 according to this embodiment differs from the virtual volume creation screen 50 (see FIG. 15) according to the first embodiment in that not only is it possible to configure the performance/cost levels of the storage tiers ST as 'high,' 'medium,' and 'low,' but specific numerical values can be entered and configured in detail for the usage ratios of each of the storage tiers ST.

In reality, as shown in FIG. 23, the virtual volume creation screen 60 provides a virtual volume/virtual volume group field 61, a capacity field 62, a pool list/unused capacity field 63, a threshold field 64, a usage ratio configuration field 65 and a virtual volume creation button 66.

The content of the virtual volume/virtual volume group field 61, capacity field 62, pool list/unused capacity field 63, and threshold field 64 is the same as that designated in the virtual volume/virtual volume group field 51, capacity field 52, pool list/unused capacity field 53, and threshold field 54 on the virtual volume creation screen 50 according to the first embodiment, and therefore will not be described here.

The usage ratio configuration field 65 is a field allowing the system administrator to designate (input) the usage ratios of the first to third storage tiers ST. The usage ratios may be designated by specific numerical values (50%, 40%, 10%, for example) for the usage ratios of each of the storage tiers ST or may be designated by specific numerical values (10 GB, 20 GB, 30 GB, for example) for the virtual capacities of each of the storage tiers ST.

The virtual volume creation button 66 is a button for executing processing to create a virtual volume VVOL corresponding to the content which is input to the virtual volume/virtual volume group field 61, capacity field 62, pool list/unused capacity field 63, threshold field 64, and usage ratio configuration field 65 respectively. When the virtual volume creation button 66 is clicked after the required items are input to each of the virtual volume/virtual volume group field 61, capacity field 62, pool list/unused capacity field 63, threshold field 64, and usage ratio configuration field 65, the virtual volume creation program 21A transfers the content input by the system administrator via the virtual volume creation screen 60 to the storage apparatus 5A together with a virtual volume creation instruction command as virtual volume requirement information. Upon receipt of the virtual volume creation instruction command and virtual volume requirement information, the storage apparatus 5B internally creates a virtual volume VVOL according to the virtual volume requirement information.

Note that the volume ID of the virtual volume VVOL need not be designated by the system administrator via the virtual volume creation screen 60 but instead may be selected by the virtual volume creation program 21A according to a predetermined rule, for example.

Figure 24:
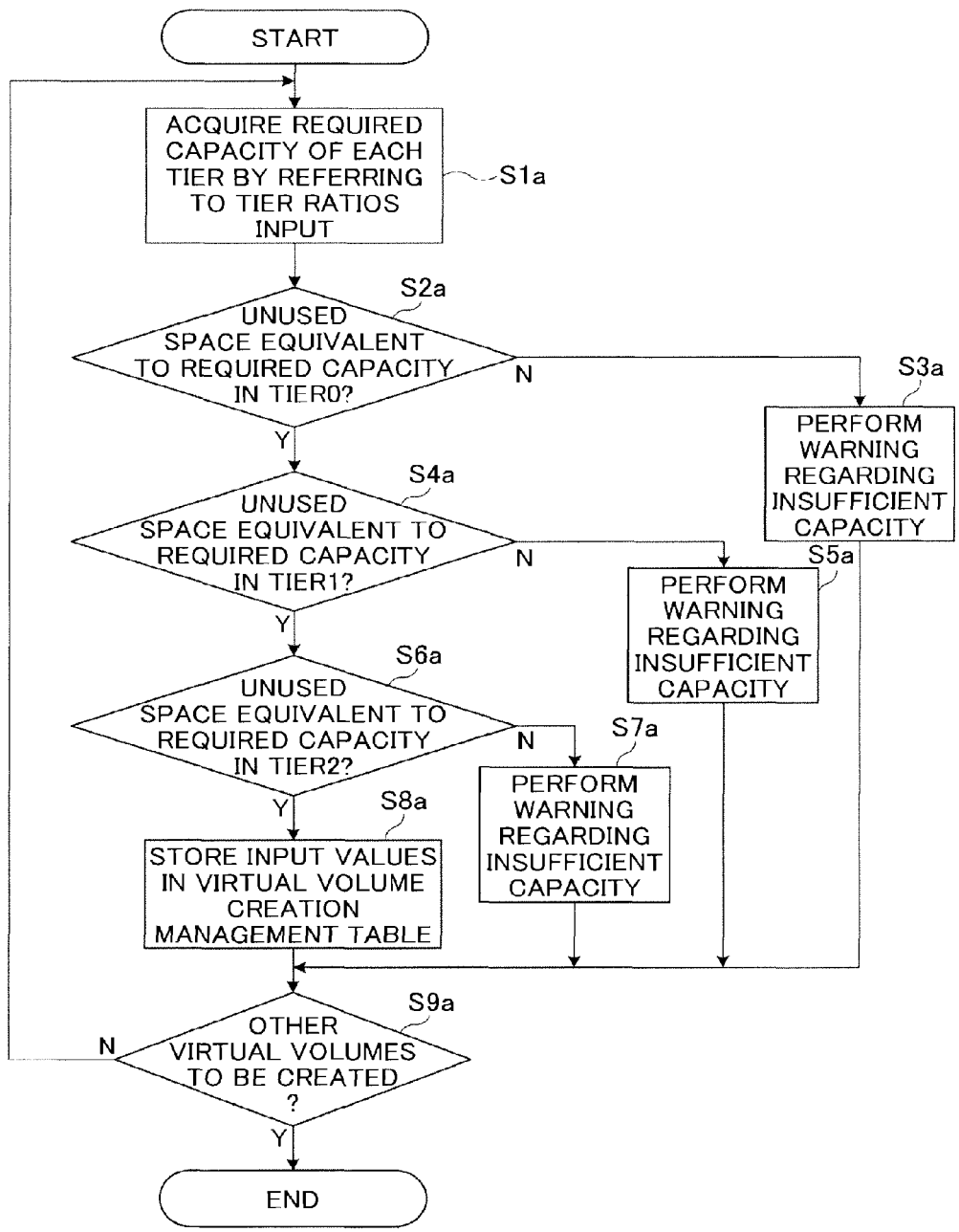
FIG. 24 is a flowchart showing the processing routine for virtual volume parent creation processing.

(2-3) Virtual Volume Parent Creation Processing According to the Second Embodiment FIG. 24 shows the processing routine for the virtual volume parent creation processing which is executed by the virtual volume control program 35 (see FIG. 4) of the storage apparatus 5B in association with the data management method according to the embodiment. When the virtual volume creation instruction command and virtual volume requirement information are supplied by the management computer 4B, the virtual volume control program 35 of the storage apparatus 5B creates the new virtual volume VVOL which satisfies the virtual volume requirement information according to the processing routine shown in FIG. 24.

In other words, the virtual volume control program 35 starts the virtual volume parent creation processing when the virtual volume creation instruction command and virtual volume requirement information are issued from the management computer 4B, extracts, from the virtual volume requirement information, the capacities of the virtual volumes VVOL and usage ratios of the first to third storage tiers ST which are designated by the system administrator for the virtual volume VVOL to be created at the time, and acquires the required capacity of the first to third storage tiers ST required during page relocation processing of the virtual volume VVOL based on the extracted capacities and usage ratios (S1a).

For example, if '10 GB' is designated as the capacity of a virtual volume VVOL and '70%,' '20%,' and '10%' are designated as the usage ratios of the first to third storage tiers ST, the virtual volume control program 35 tier ST calculates the required capacity which is to be assigned to the virtual volume VVOL from the first storage tier ST from the following equation:

[Math. 7]

$$10 \text{ GB} \times 70\% = 7 \text{ GB} \quad (7)$$

and the required capacity to be assigned from the second storage tier ST is calculated as per the following equation:

[Math. 8]

$$10 \text{ GB} \times 20\% = 2 \text{ GB} \quad (8)$$

and the required capacity to be assigned from the third storage tier ST is calculated as per the following equation:

[Math. 9]

$$10 \text{ GB} \times 10\% = 1 \text{ GB} \quad (9)$$

Although processing advances to step S2a after calculating the required capacities of the first to third storage tiers ST, the processing of steps S2a to S9a are similar to the processing of steps S2 to S9 in FIG. 16 and hence the description here is omitted. Note that the performance/cost level field 39E of the virtual volume creation management table 39 stores specific numerical values for usage ratios of the first to third storage tiers ST such as '70%,' '20%,' and '10%,' instead of 'high,' 'medium,' and 'low.'

(2-4) Effect of this Embodiment

As mentioned earlier, according to this embodiment, since the usage ratios of the first to third storage tiers ST can be designated by numerical values as the performance/cost level of the virtual volumes VVOL created in the storage apparatus 5B, a system build which is better suited to the requirements of the system administrator can be made in comparison with the computer system 1A of the first embodiment. Thus, in comparison with the computer system 1 according to the first embodiment, a computer system which allows convenience for the user or system administrator to be further improved can be implemented.

(3) Third Embodiment

(3-1) Computer System Configuration

In FIG. 1, 1C denotes a computer system 1C according to a third embodiment. The computer system 1C is configured in the same way as the computer system 1A according to the first embodiment except for the fact, in addition to being able to designate the performance/cost levels of the virtual volumes VVOL created in a storage apparatus 5C, it is also possible to designate the RAID level of the first to third storage tiers ST providing the virtual volume VVOL.

(3-2) Hierarchical-Type Data Management Method

(3-2-1) Configuration of Tier Ratio Management Table According to the Third Embodiment Here, FIG. 25 shows the configuration of a Tier ratio management table 401 which is used by the computer system 1C according to the third embodiment. The Tier ratio management table 401 is a table for managing combinations of usage ratios for each of the storage tiers ST for each performance/cost level, and for managing the combinations of usage ratios for each storage tier ST for each reliability level (RAID level) and, as shown in FIG. 25, is configured from a performance/cost level field 401A, a reliability level field 401B, a Tier ratio field 401C and a RAID level field 401D.

The performance/cost level field 401A and Tier ratio field 401C store the same kind of information as the performance/cost level field 40A and Tier ratio field 40B of the Tier ratio management table 40 according to the first embodiment and will therefore not be described here. The reliability level field 401B stores the types of reliability level (high, medium or low here) and the RAID level field 401D stores the types of RAID level (RAID1, 5 or 6 here). Note that 'D' in the RAID level field 401D denotes data and 'P' denotes parity. For example, '2D+2D' indicates that two normal data and two mirrored data are stored on an SSD or other storage medium. Furthermore, '6D+6P,' for example, indicates that six data and two parities are stored on an SSD or other storage medium.

Hence, in the case of FIG. 25, it can be seen that the usage ratios of each storage tier ST for which the performance/cost level and reliability level are 'high,' for example, are a usage ratio of '50%' for the first storage tier ST, a usage ratio of '40%' for the second storage tier ST, and a usage ratio of '10%' for the third storage tier ST. It can also be seen that the storage tiers ST with a 'high' reliability level have a RAID level of 'RAID1.'

(3-2-2) Configuration of the Virtual Volume Creation Management Table According to the Third Embodiment In addition, FIG. 26 shows the configuration of the virtual volume creation management table 391 which is used by the computer system 1C according to the third embodiment. The virtual volume creation management table 391 is a table for managing, in the storage apparatus 5C, the virtual volume VVOL whose creation is instructed by the system administrator via a virtual volume creation screen 70 (see FIG. 27) displayed on the management computer 4C and, as shown in FIG. 26, is configured from a virtual volume ID field 391A, a capacity field 391B, a pool ID field 391C, a threshold field 391D, a performance/cost level field 391E, and a RAID level field 391F.

The virtual volume ID field 391A, capacity field 391B, pool ID field 391C, threshold field 391D, and performance/cost level field 391E store the same information as the virtual volume ID field 39A, capacity field 39B, pool ID field 39C, threshold field 39D, and performance/cost level field 39E of the virtual volume creation management table 39 according to the first embodiment, and hence will not be described here. The RAID level field 391F stores RAID level types (RAID1, 5, or 6 here).

Hence, in the case of FIG. 26, for example, it can be seen that the virtual volume VVOL 'v101' has the capacity '10 GB' and is associated with the virtual volume pool VVP 'Pool1.' Furthermore, it can be seen that the virtual volume VVOL 'v101' is configured with a threshold of '8 GB,' that the corresponding performance/cost level is configured 'high,' and that the RAID level has been configured as 'RAID1.'

Figure 27:
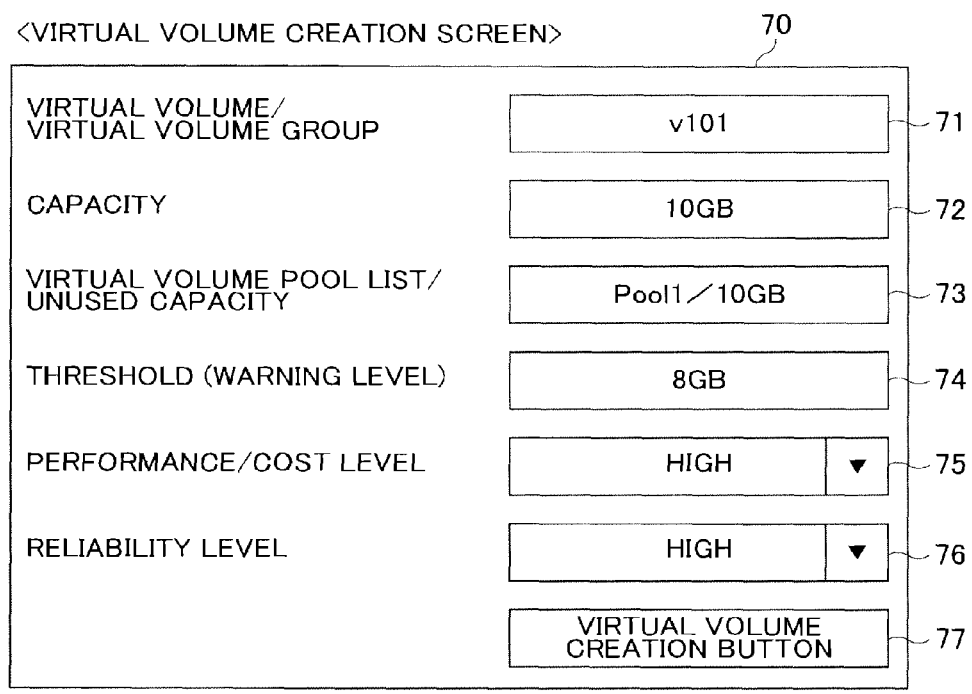
FIG. 27 is a line diagram showing an overview of the configuration of the virtual volume creation screen.

(3-3) Configuration of Virtual Volume Creation Screen According to Third Embodiment FIG. 27 shows a configuration example of the virtual volume creation screen 70 according to the third embodiment which is displayed by the management computer 4 by starting the virtual volume creation program 21A (see FIG. 3) of the management computer 4. The system administrator is able to use the virtual volume creation screen 70 to create, in the storage apparatus 5C, virtual volumes VVOL which have the desired usage ratios of the first to third storage tiers following the page relocation processing and virtual volumes VVOL with the desired RAID level for the first to third storage tiers ST after page relocation processing.

In reality, as shown in FIG. 27, the virtual volume creation screen 70 comprises a virtual volume/virtual volume group field 71, a capacity field 72, a pool list/unused capacity field 73, a threshold field 74, a performance/cost level field 75, a reliability level field 76, and a virtual volume creation button 77.

Since the virtual volume/virtual volume group field 71, capacity field 72, pool list/unused capacity field 73, threshold field 74, and performance/cost level field 75 are the same as the virtual volume creation screen 50 (see FIG. 15) according to the first embodiment are the same as for the virtual volume creation screen 50 (see FIG. 15) according to the first embodiment, these fields will not be described here. The reliability level field 76 is a field allowing the system administrator to designate (input) the RAID level.

The virtual volume creation button 77 is a button for executing processing to create a virtual volume VVOL according to the content which is respectively entered in the virtual volume/virtual volume group field 71, capacity field 72, pool list/unused capacity field 73, threshold field 74, performance/cost level field 75, and reliability level field 76. When the virtual volume creation button 77 is clicked after the required items are input to each of the virtual volume/virtual volume group field 71, capacity field 72, pool list/unused capacity field 73, threshold field 74, performance/cost level field 75, and reliability level field 76, the virtual volume creation program 21A transfers the content input by the system administrator via the virtual volume creation screen 70 to the storage apparatus 5C together with a virtual volume creation instruction command as virtual volume requirement information. Upon receipt of the virtual volume creation instruction command and virtual volume requirement information, the storage apparatus 5C internally creates a virtual volume VVOL according to the virtual volume requirement information.

Note that the volume ID of the virtual volume VVOL need not be designated by the system administrator via the virtual volume creation screen 70 but instead may be selected by the virtual volume creation program 21A according to a predetermined rule, for example.

(3-4) Various Processing

Figure 28:
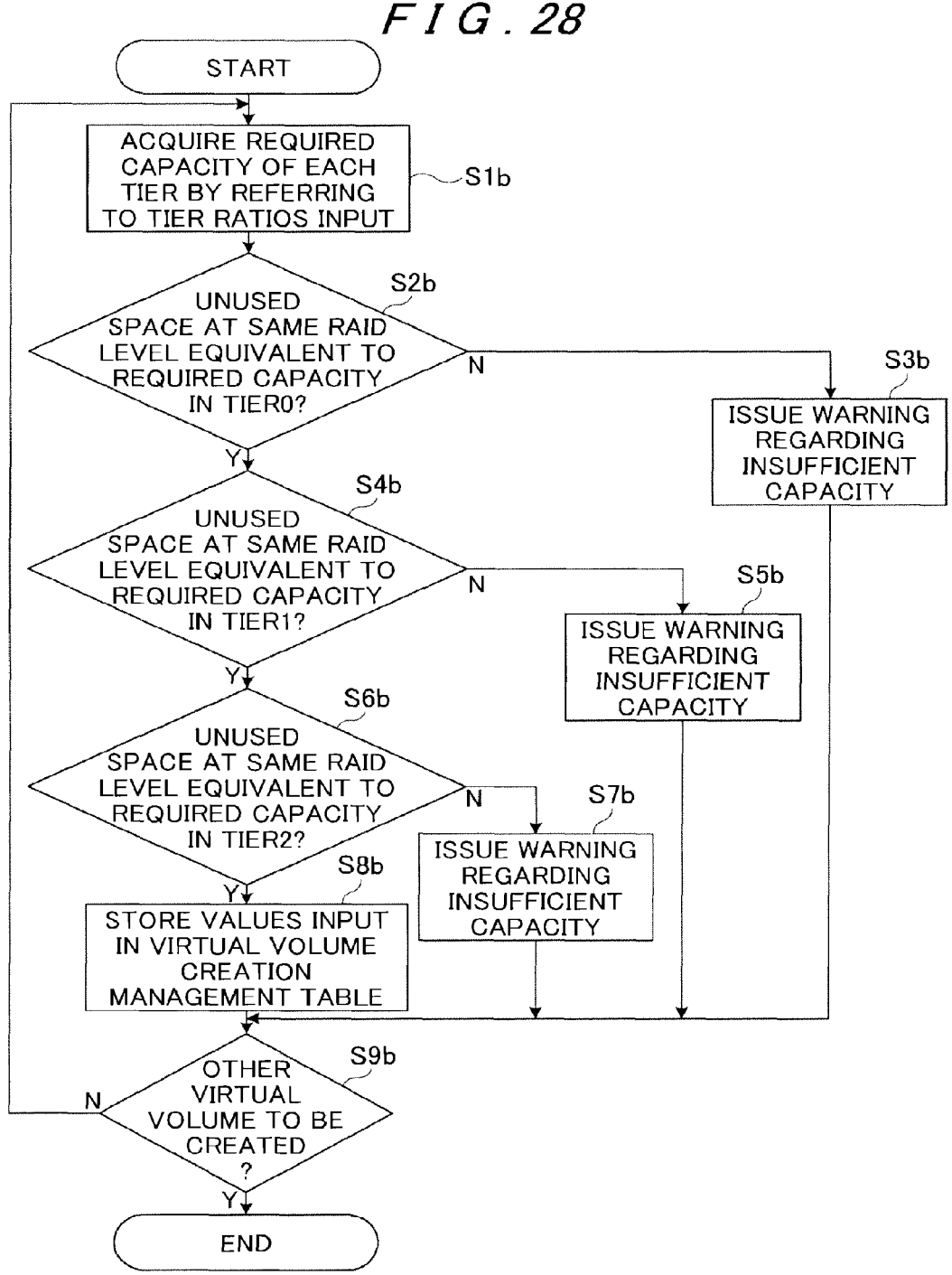
FIG. 28 is a flowchart showing the processing routine for the virtual volume parent creation processing.

(3-4-1) Virtual Volume Parent Creation Processing According to the Third Embodiment FIG. 28 shows the processing routine for the virtual volume parent creation processing which is executed by the virtual volume control program 35 (see FIG. 4) of the storage apparatus 5C in association with the data management method according to the embodiment. When the virtual volume creation instruction command and virtual volume requirement information are supplied by the management computer 4C, the virtual volume control program 35 of the storage apparatus 5C creates the new virtual volume VVOL which satisfies the virtual volume requirement information according to the processing routine shown in FIG. 28.

In other words, the virtual volume control program 35 starts the virtual volume parent creation processing when the virtual volume creation instruction command and virtual volume requirement information are issued from the management computer 4C, and first acquires the required capacity of the first to third storage tiers ST required during page relocation processing of the virtual volume VVOL based on the performance/cost level and capacity designated by the system administrator for the virtual volume VVOL to be created at the time, and the Tier ratio management table 401 (see FIG. 25) (S1b).

For example, suppose that '10 GB' is designated as the capacity of the virtual volume VVOL is designated as the capacity of the virtual volume VVOL and 'high' is designated as the performance/cost level. In this case, when the Tier ratio management table 40 is referred to, the usage ratios for the first to third storage tiers ST with 'high' performance/cost levels are controlled to be '50%' for the first storage tier ST ('Tier0'), '40%' for the second tier ST ('Tier1'), and '10%' for the third storage tier ST ('Tier2'). Accordingly, the virtual volume control program 35 calculates the storage capacity which is to be assigned from the first storage tier ST to the virtual volume VVOL from the following equation:

[Math. 10]

$$10\ GB \times 50\% = 5\ GB \tag{10}$$

and the storage capacity to be assigned to the virtual volume VVOL from the second storage tier ST is calculated as per the following equation:

[Math. 11]

$$10\ GB \times 40\% = 4\ GB \tag{11}$$

and the storage capacity to be assigned to the virtual volume VVOL from the third storage tier ST is calculated as per the following equation:

[Math. 12]

$$10 \text{ GB} \times 10\% = 1 \text{ GB} \quad (12)$$

The virtual volume control program 35 then extracts, from the virtual volume requirement information, the pool ID of the virtual volume pool VVP which is to be associated with the virtual volume VVOL to be created at this time, and determines, based on the extracted pool ID and the pool capacity management table 41 (see FIG. 11) and the virtual volume creation management table 391 (FIG. 26), whether or not there is an unused capacity of the same RAID level equivalent to the capacity required that was calculated in step S1b in the pool volume PVOL of the first storage tier ST forming the virtual volume pool VVP (S2b).

Upon obtaining a negative result in this determination, the virtual volume control program 35 issues a warning to the effect that there is insufficient capacity, according to whether there is a sound or image (S3b) and then moves to step S9b.

However, upon obtaining an affirmative result in the determination of step S2b, the virtual volume control program 35 determines whether or not there is unused capacity of the same RAID level equivalent to the capacity required which was calculated in step S1b in the pool volume PVOL of the second storage tier ST which forms the virtual volume pool VVP (S4b).

Furthermore, upon obtaining a negative result in this determination, the virtual volume control program 35 issues a warning to the effect that there is insufficient capacity according to whether there is a sound or image (S5b) and then moves to step S9b.

If, on the other hand, an affirmative result is obtained in the determination of step S4b, the virtual volume control program 35 determines whether or not there is unused capacity of the same RAID level equivalent to the capacity required which was calculated in step S1b in the pool volume PVOL of the third storage tier ST which forms the virtual volume pool VVP (S6b).

Upon obtaining a negative result in this determination, the virtual volume control program 35 issues a warning to the effect that there is insufficient capacity according to whether there is a sound or image (S7b) and then moves to step S9b.

If, on the other hand, an affirmative result is obtained in the determination of step S6b, the virtual volume control program 35 extracts, from the virtual volume requirement information, the volume ID and capacity of the virtual volume VVOL to be created at the time, the pool ID, threshold, and performance/cost level and RAID level of the virtual volume pool VVP which is to be associated with the virtual volume VVOL, and stores the extracted information in the respective fields (391A to 391F) of the virtual volume creation management table 391 (see FIG. 26) (S8b).

The virtual volume control program 35 subsequently determines whether or not there is another virtual volume VVOL to be created based on the virtual volume requirement information (S9b). For example, if a plurality of volume IDs are input to the virtual volume ID field 51 in the virtual volume creation screen 70 described earlier with reference to FIG. 27, these volume IDs are included in the virtual volume requirement information and hence, in this case, the virtual volume control program 35 determines that there is a virtual volume VVOL which should also be newly created.

Hence, the virtual volume control program 35 returns to step S1b upon obtaining the affirmative result in this determination and subsequently repeats the loop of steps S1b to S9b until the creation of the virtual volumes VVOL is complete for all the volume IDs contained in the virtual volume requirement information.

If, on the other hand, the virtual volume control program 35 obtains a negative result in step S9b, the virtual volume control program 35 terminates the virtual volume parent creation processing.

(3-4-2) Pool Automatic Generation Processing

Figure 29:
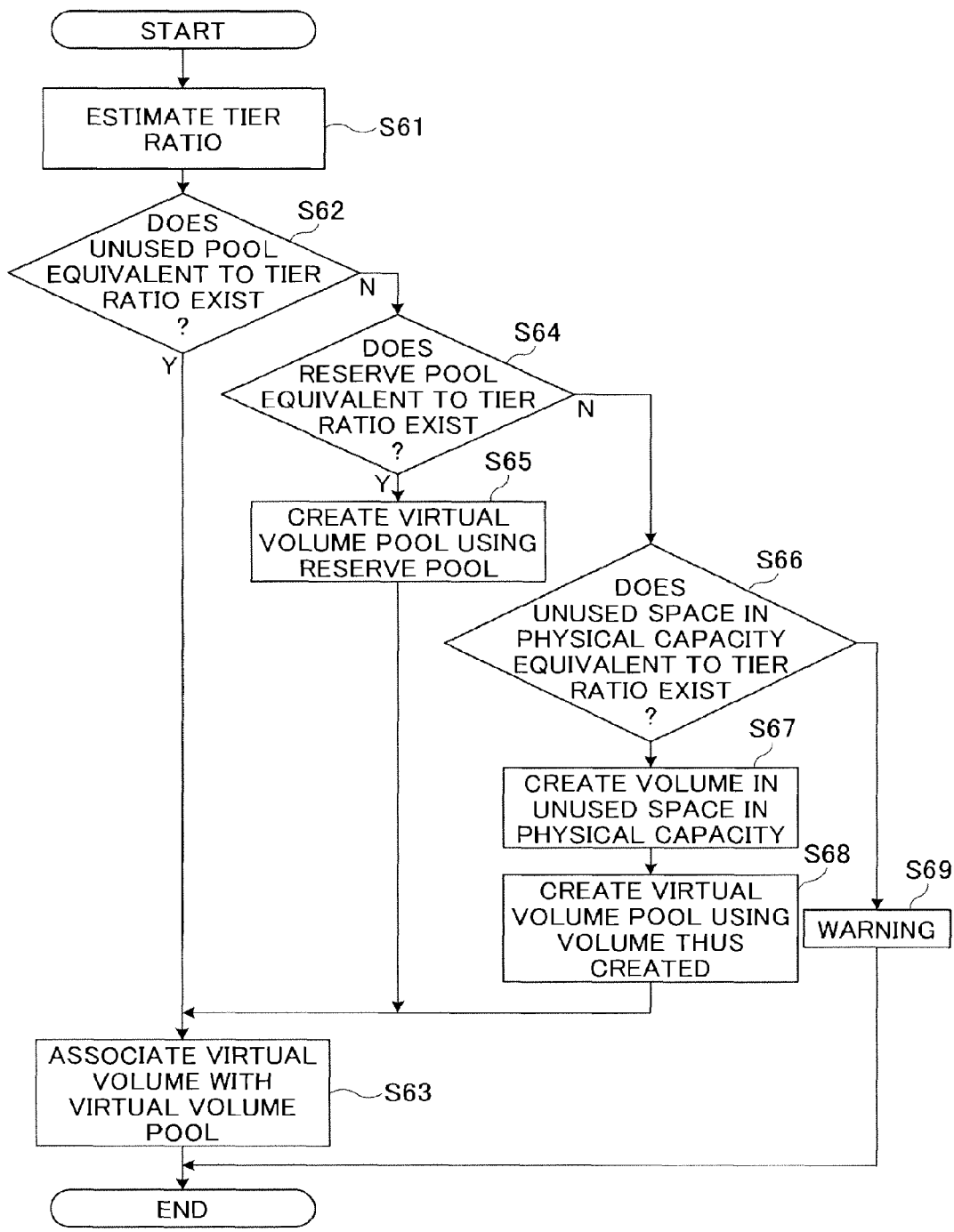
FIG. 29 is a flowchart showing the processing routine for the pool automatic generation processing.

FIG. 29 shows a processing routine for pool automatic generation processing which is executed by the virtual volume control program 35 (see FIG. 4) of the storage apparatus 5C in association with the data management method according to this embodiment. When the virtual volume creation instruction command and the virtual volume requirement information are issued, the virtual volume control program 35 of the storage apparatus 5C creates the parent virtual volume VVOL by means of the virtual volume parent creation processing (see FIG. 28), and if there is no unused capacity in the virtual volume pool VVP associated with the virtual volume VVPL, executes this pool automatic generation processing.

In other words, when the virtual volume creation instruction command and virtual volume requirement information are supplied by the management computer 4C, the virtual volume control program 35 starts the virtual volume parent creation processing (see FIG. 28), and if there is no unused capacity in the virtual volume pool VVP associated with the virtual volume VVOL to be created as the parent, starts the pool automatic generation processing.

First, the virtual volume control program 35 estimates the usage ratios of the first to third storage tiers ST associated with the virtual volume VVOL (S61).

The virtual volume control program 35 then determines whether or not there is actually a virtual volume pool VVP comprising an unused pool equivalent to the Tier ratio (required capacity) for the first to third storage tiers ST (S62).

Upon obtaining an affirmative result in this determination, the virtual volume control program 35 associates the virtual volume VVOL to be newly created with the virtual volume pool VVP associated with the virtual volume VVOL (S63) and terminates the pool automatic generation processing.

If, on the other hand, a negative result is obtained in the determination of step S62, the virtual volume control program 35 determines whether or not there is actually another virtual volume pool VVP (reserve pool VVP) which comprises an unused pool which is equivalent to the Tier ratio (S64).

Upon obtaining an affirmative result in this determination, the virtual volume control program 35 associates the virtual volume VVOL to be newly created with the reserve pool VVP which is associated with the virtual volume VVOL (S63), and terminates the pool automatic generation processing.

However, upon obtaining a negative result in the determination of step S64, the virtual volume control program 35 determines whether or not there is unused physical capacity equivalent to the Tier ratio (S66).

Upon obtaining an affirmative result in this determination, the virtual volume control program 35 creates a volume in the unused physical capacity that exists (S67).

The virtual volume control program 35 creates a virtual volume pool VVP from the volume thus created (S68).

The virtual volume control program 35 makes an association between the virtual volume pool VVP created in step S68 and the virtual volume VVOL (S63) and terminates the pool automatic generation processing.

However, upon obtaining a negative result in the determination of step S66, the virtual volume control program 35 issues a warning to the effect that there is insufficient physical capacity to create the virtual volume pool VVP (S69), and then terminates the pool automatic generation processing.

(3-5) Effect of the Embodiment

As described earlier, according to this embodiment, the performance/cost level of the storage tier ST to which pages are assigned can be decided for each virtual volume VVOL created in the storage apparatus 5C and the RAID level of the first to third storage tiers ST to which the pages are assigned can be decided. Convenience can accordingly be improved for the user/system administrator.

(4) Fourth Embodiment

(4-1) Computer System Configuration

In FIG. 1, 1D denotes a computer system 1D according to a fourth embodiment. The computer system 1D is configured in the same way as the computer system 1A according to the first embodiment except for the fact that the performance/cost levels of the virtual volumes VVOL created in a storage apparatus 5D are managed with ratios left unchanged, that page relocation processing can be implemented by considering the I/O frequency threshold of the first to third storage tiers ST and that the system administrator can be notified of a suitable performance/cost level if the performance/cost level configured by the system administrator is not appropriate.

(4-2) Virtual Volume Creation Management Table According to the Fourth Embodiment The virtual volume creation management table 392 is a table for managing, in the storage apparatus 5D, the virtual volume VVOL whose creation is instructed by the system administrator via a virtual volume creation screen displayed on the management computer 4D and, as shown in FIG. 30, is configured from a virtual volume ID field 392A, a capacity field 392B, a pool ID field 392C, a threshold field 392D, and a usage ratio field 392E.

The virtual volume ID field 392A, capacity field 392B, pool ID field 392C, threshold field 392D store the same information as the virtual volume ID field 39A, capacity field 39B, pool ID field 39C and threshold field 39D of the virtual volume creation management table 39 according to the first embodiment, and hence will not be described here. The usage ratio field 392E stores usage ratios of the first to third storage tiers ST ('Tier0' to 'Tier2').

Hence, in the case of FIG. 30, for example, it can be seen that the virtual volume VVOL 'v101' has the capacity '10 GB' and is associated with the virtual volume pool VVP 'Pool1.' Furthermore, it can be seen that the virtual volume VVOL 'v101' is configured with a threshold of '8 GB,' and that the usage ratios of the storage tiers ST associated with the virtual volume VVOL are managed as '50%' for the first storage tier ST ('Tier0'), '40%' for the second storage tier ST ('Tier1'), and '10%' for the third storage tier ST ('Tier2').

A I/O frequency threshold management table 45 is a table for managing thresholds for the access frequencies by the host computers 3 to the virtual volumes VVOL defined in the storage apparatus 5D and, as shown in FIG. 31, is configured from a performance/cost field 45A and a threshold field 45B.

The performance/cost field 45A stores types of performance/cost levels (high, medium, or low here) and the threshold field 45B stores the thresholds of the access frequencies (I/O frequencies) of the first to third storage tiers ST. The thresholds for the I/O frequencies stored here are referenced during page relocation processing and, for pages for which access by the host computers 3 is frequent in excess of the thresholds for the I/O frequency, for example, processing to migrate the data stored on these pages to another storage tier ST comes to be performed.

Therefore, in the case of FIG. 31, when the performance/cost level is 'high,' for example, the threshold for the I/O frequency of the first storage tier ST ('Tier0') is regulated as '1000,' the threshold for the I/O frequency of the second storage tier ST ('Tier1') as '500,' and the threshold for the I/O frequency of the third storage tier ST ('Tier2') as '0'.

A Tier management table 421 is a table for managing the storage tiers ST defined in the storage apparatus 5D in the management computer 4D and, as shown in FIG. 32, is configured from a virtual volume ID field 421A, a capacity field 421B, a threshold field 421C, a usage ratio field 421D, an I/O frequency threshold field 421E, and an assigned capacity field 421F.

The virtual volume ID field 421A, capacity field 421B, threshold field 421C, usage ratio field 421D, and assigned capacity field 421F store the same various information as the virtual volume ID field 42A, capacity field 42B, threshold field 42C, usage ratio field 42D, and assigned capacity field 42F in the Tier management table 42 according to the first embodiment, and hence will not be described here. The I/O frequency threshold field 421E stores the I/O frequency threshold values of the first to third storage tiers ST.

Hence, in the case of FIG. 32, it can be seen that the virtual volume VVOL 'v101,' for example, has a capacity of '10 GB,' and is configured with a threshold of '8 GB.' Furthermore, it can be seen that the usage ratios of each of the storage tiers ST associated with the virtual volume VVOL 'v101' are managed as '50%' for the first storage tier ST ('Tier0'), '40%' for the second storage tier ST ('Tier1'), and '10%' for the third storage tier ST ('Tier2').

It can also be seen that the I/O frequency thresholds of each of the storage tiers ST associated with the virtual volume VVOL 'v101' are configured as '1000' for the first storage tier ST ('Tier0'), '500' for the second storage tier ST ('Tier1') and '0' for the third storage tier ST ('Tier2').

In addition, it is clear that the assigned capacities of each of the storage tiers ST associated with the virtual volume VVOL 'v101' are already assigned as '5 GB' for the first storage layer ST ('Tier0'), '4 GB' for the second storage tier ST ('Tier1'), and '1 GB' for the third storage tier ST ('Tier2'). In other words, for the virtual volume VVOL 'v101,' pages have already been assigned across the full range of usage ratios for the first to third storage tiers ST.

The I/O distribution management table 46 is a table to be referred to when processing (see FIG. 37) is performed for correcting the currently configured performance/cost level and, as shown in FIG. 33, is configured from a virtual volume ID field 46A and a I/O threshold-exceeding page count field 46B.

The virtual volume ID field 46A stores the volumes IDs of the virtual volume VVOLs, and the I/O threshold-exceeding page count field 46B stores, for all cases of performance/cost level (here high, medium and low), the number of pages for which the I/O frequency threshold is exceeded in the first to third storage tiers ST.

Hence, in the case of FIG. 33, it can be seen that, if the performance/cost level is configured as being 'high' for virtual volume VVOL 'v101,' for example, pages where the access frequency by the host computer 3 is exceeded for the pages assigned from the first storage tier ST ('Tier0') is '500'.

(4-3) Various Processing

Figure 34:
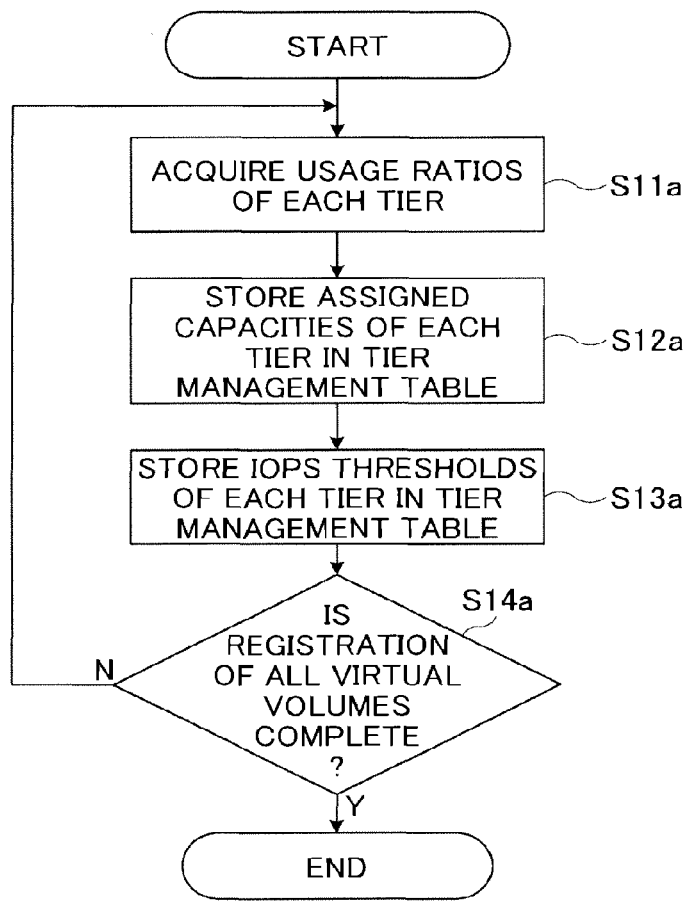
FIG. 34 is a flowchart showing a processing routine for Tier management table creation processing.

(4-3-1) Tier Management Table Creation Processing According to the Fourth Embodiment FIG. 34 shows the processing routine for Tier management table creation processing which is executed by the virtual volume control program (see FIG. 4) of the storage apparatus 5D in association with the data management method according to the embodiment. When the parent virtual volume VVOL is created, the virtual volume control program 35 stores various information on the newly created virtual volume VVOL according to the processing routine shown in FIG. 34 in the Tier management table 421 (see FIG. 32).

In other words, the virtual volume control program 35 starts the virtual volume parent creation processing when the virtual volume creation instruction command and virtual volume requirement information are issued from the management computer 4D, and starts the Tier management table creation processing when a newer virtual volume VVOL is created by means of the virtual volume parent creation processing.

First, the virtual volume control program 35 first creates a new row (entry) in the Tier management table 421 (see FIG. 32) and, of the various fields in the created entry (virtual volume ID field 421A, capacity field 421B, threshold 421C, usage ratio field 421D, and I/O frequency threshold 421E and assigned capacity field 421F), the virtual volume control program 35 stores the virtual volume ID and the capacity which were extracted from the virtual volume requirement information in the virtual volume ID field 421A, capacity field 421B, and threshold field 421C. Furthermore, the virtual volume control program 35 stores the usage ratios of the various storage tiers ST associated with the virtual volume VVOL in the usage ratio field 421D on the basis of the performance/cost level and Tier ratio management table 40 (see FIG. 10) which were extracted from the virtual volume requirement information.

The virtual volume VVOL control program 35 acquires the usage ratios of each of the storage tiers ST on the basis of the usage ratios of each of the storage tiers ST associated with the Tier management table 421 (see FIG. 32) (S11a).

The virtual volume control program 35 subsequently refers to the pool-logical volume assignment management table 37 (see FIG. 7) and the pool-logical volume information 38 (see FIG. 8), calculates the assigned capacities of each of the storage tiers ST, and stores the assigned capacities thus calculated in the assigned capacity field 421F of the Tier management table 421 (S12a).

The virtual volume control program 35 then acquires the I/O frequency thresholds of each of the storage tiers ST which correspond to the performance/cost level designated by the system administrator on the basis of the performance/cost level extracted from the I/O frequency threshold management table 45 (see FIG. 31) and the virtual volume requirement information, and stores the acquired I/O frequency threshold in the I/O frequency threshold field 421E of the Tier management table 421 (S13a).

The virtual volume control program 35 determines whether or not registration in the Tier management table 421 is complete for all the newly created virtual volumes VVOL (S14a).

Upon obtaining a negative result in this determination, the virtual volume control program 35 determines that there is another virtual volume VVOL to be registered in the Tier management table 42 and advances to step S11a, and repeats the loop of steps S11a to S14a until registration is complete for all the virtual volumes VVOL.

However, upon obtaining an affirmative result in the determination of step S14a, the virtual volume control program 35 terminates the Tier management table creation processing.

(4-3-2) Access Frequency Management Table Creation Processing

FIG. 35 shows a processing routine for access frequency management table creation processing which is executed by the virtual volume control program 35 (see FIG. 4) of the storage apparatus 5D in association with the data management method according to this embodiment. The virtual volume control program 35 of the storage apparatus 5D performs page relocation processing for migrating data, which is stored on the pages assigned to the logic blocks in the virtual volume VVOL, between storage tiers ST at regular or irregular intervals according to the schedule, referring at this time to the access frequency management table 43 (see FIG. 43) and the Tier migration page management table 43 (see FIG. 13). The virtual volume control program 35 executes the access frequency management table creation processing shown in FIG. 35 in order to store information required in the access frequency management table 43 which are referred to when page relocation processing is performed.

In reality, the user or system administrator is able to create this schedule by operating the host computer 3 or management computer 4D and is able to configure this schedule for the storage apparatus 5D. The virtual volume control program 35 of the storage apparatus 5D continually monitors this schedule and ultimately starts the access frequency management table creation processing shown in FIG. 35 prior to the timing for executing the page relocation processing (see FIG. 36).

First, the virtual volume control program 35 creates a new row (entry) in the access frequency management table 43 (see FIG. 13) and, of the various fields in the created entry (virtual volume ID field 43A, pool ID field 43B, assigned LBA field 43C, page ID field 43D, I/O frequency field 43E, Tier field 43F, and migration destination Tier field 43G), the virtual volume control program 35 stores the information required in all the fields (43A to 43F) except for the migration destination Tier field 43G. Note that the virtual volume control program 35 extracts required information from the virtual volume requirement information, virtual volume-assignment pool page management table 36, pool-logical volume assignment management table 37, and pool-logical volume information 38.

The virtual volume control program 35 then acquires the storage tiers ST ('Tier') and 'I/O frequency' of the assigned pages registered in the access frequency management table 43 on the basis of the access frequency management table 43 (see FIG. 13) (S71).

The virtual volume control program 35 subsequently acquires the 'I/O frequency thresholds' of each of the storage tiers ST registered in the access frequency management table 43 on the basis of the I/O frequency threshold management table 45 (see FIG. 31) (S72).

The virtual volume control program 35 then determines whether or not the I/O frequency of the pages assigned from the first storage tier ST (Tier0) acquired in step S71 is greater than the I/O frequency threshold of the first storage tier ST (Tier0) acquired in step S72 (S73).

In other words, the virtual volume control program 35 determines whether or not the I/O frequency of the I/O pages assigned from Tier0 exceed the I/O frequency threshold.

Upon obtaining an affirmative result in this determination, the virtual volume control program 35 registers 'Tier0' in the migration destination Tier field 43G of the access frequency management table 43 corresponding to this page (S74).

The virtual volume control program 35 subsequently determines whether or not the comparison between the I/O frequency and the I/O frequency threshold is complete for all the assigned pages (S75).

That is, the virtual volume control program 35 determines whether or not the processing of steps S71 to S74 is complete for all the assigned pages.

Upon obtaining a negative result in this determination, the virtual volume control program 35 compares the I/O frequency with the I/O frequency threshold for the other assigned pages.

Upon obtaining an affirmative result in the determination of step S75, the virtual volume control program 35 refers to the created access frequency management table 43 and updates the Tier migration page management table 44 (see FIG. 14) (S76).

The virtual volume control program 35 determines whether or not registration in the access frequency management table 43 has ended for all the virtual volumes VVOL (S77).

Upon obtaining a negative result in this determination, the virtual volume control program 35 determines that there is another virtual volume VVOL to be registered in the access frequency management table 43 and advances to step S71, and repeats the loop of steps S71 to S77 until registration is complete for all the virtual volumes VVOL.

However, upon obtaining an affirmative result in the determination of step S77, the virtual volume control program 35 terminates the access frequency management table creation processing.

Returning now to step S73, upon obtaining a negative result in the determination of step S73, the virtual volume control program 35 determines whether the I/O frequency of pages assigned from the second storage tier ST (Tier1) acquired in step S71 is greater than the I/O frequency threshold of the second storage tier ST (Tier1) acquired in step S72 (S78).

In other words, the virtual volume control program 35 determines whether or not the I/O frequency of the pages assigned from Tier1 exceeds the I/O frequency threshold.

Upon obtaining an affirmative result in this determination, the virtual volume control program 35 registers Tier1 in the migration destination Tier field 43G of the access frequency management table 43 (S79).

However, upon obtaining a negative result in the determination of step S78, the virtual volume control program 35 registers Tier2 in the migration destination Tier field 43G of the access frequency management table 43 (S80).

After executing the processing of step S79 or step S80, the virtual volume control program 35 performs the processing of steps S75 to S77 as mentioned earlier. Upon obtaining an affirmative result in the determination of step S77, the virtual volume control program 35 terminates the access frequency management table creation processing.

(4-3-3) Page Relocation Processing According to Fourth Embodiment

Figure 36B:
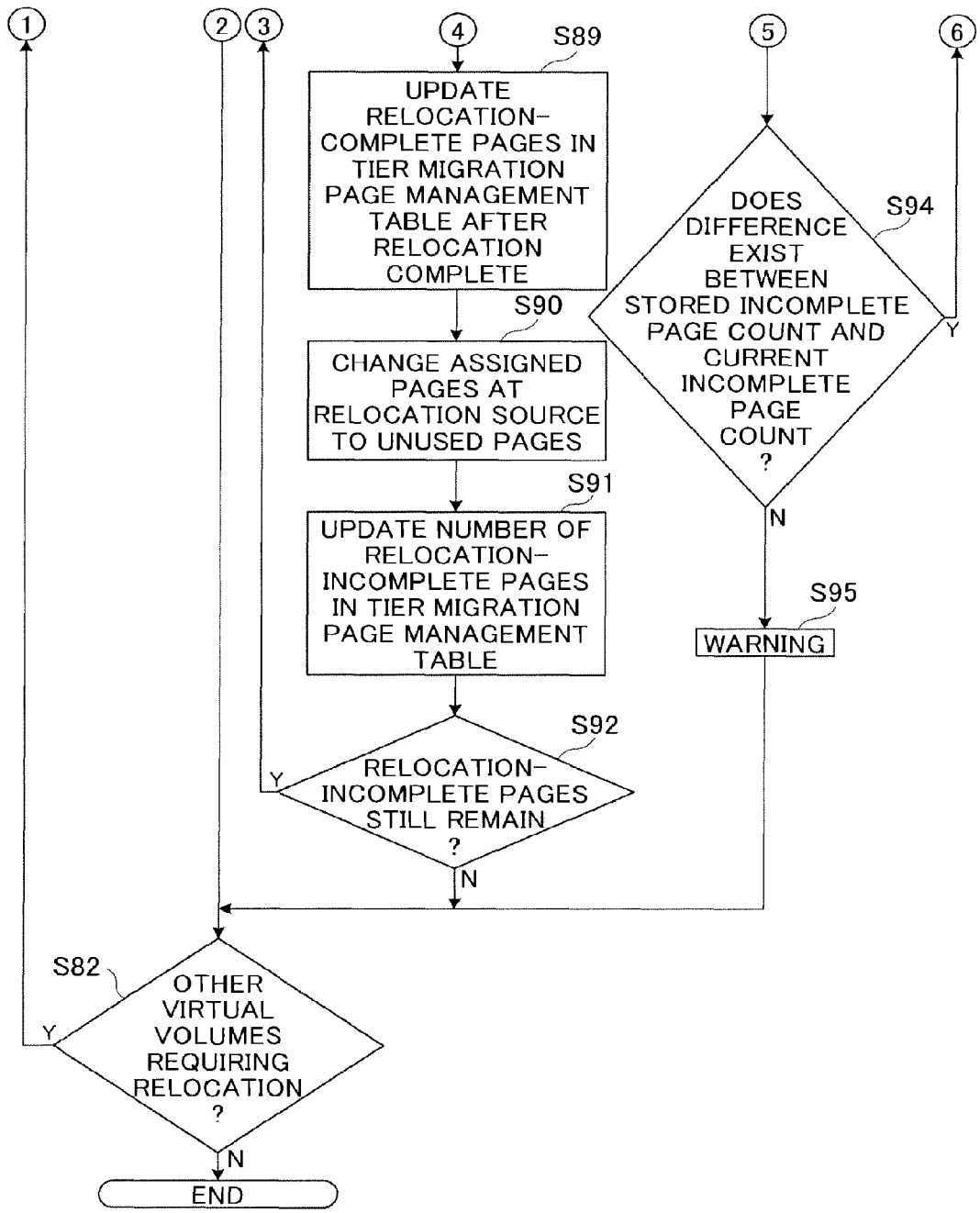
FIG. 36B is a flowchart showing a processing routine for page relocation processing.

FIG. 36 shows a processing routine for page relocation processing which is executed by the virtual volume control program 35 (see FIG. 4) of the storage apparatus 5D in association with the data management method according to this embodiment. The virtual volume control program 35 executes this page relocation processing when data stored on the pages assigned to the logical blocks in the virtual volume VVOL is migrated between storage tiers ST on the basis of the access frequency by the host computer 3 at regular or irregular intervals according to a schedule.

In reality, the user or system administrator is able to create this schedule by operating the host computer 3 or management computer 4D and is able to configure the schedule in the storage apparatus 5D. The virtual volume control program 35 of the storage apparatus 5D then continually monitors this schedule and ultimately starts the page relocation processing shown in FIG. 36 according to the timing for executing the page relocation processing.

The virtual volume control program 35 first refers to the relocation-incomplete page count field 44C of the Tier migration page management table 44 (see FIG. 14) and determines whether there is a page for which relocation is incomplete among the pages assigned to the virtual volume VVOL which is targeted for page relocation processing (S81).

Upon obtaining a negative result in this determination, the virtual volume control program 35 determines that the page relocation processing is not required for this virtual volume VVOL and determines whether or not there is another virtual volume VVOL for which page relocation processing is required (S82). Furthermore, upon obtaining a negative result in this determination, the virtual volume control program 35 determines that currently there is no virtual volume VVOL for which page relocation processing is required and terminates the page relocation processing. However, upon obtaining an affirmative result in the determination of step S82, the virtual volume control program 35 advances to step S81.

Returning now to step S81, upon obtaining an affirmative result in the determination of step S81, the virtual volume control program 35 refers to the pool capacity management table 41 (see FIG. 11) and confirms the unused capacity of the relocation target (number of unused pages) (S83), and determines whether or not there is sufficient unused capacity in the storage tier ST targeted for relocation (S84).

Upon obtaining a negative result in this determination, the virtual volume control program 35 issues a warning to the effect that there is insufficient unused capacity (S85).

If, on the other hand, an affirmative result is obtained in the determination of step S84, the virtual volume control program 35 temporarily stores the number of relocation-incomplete pages in the memory 32 (S86). Here, if the number of relocation-incomplete pages is '1000' pages, for example, the virtual volume control program 35 temporarily stores the value '1000' in the memory 32 or the like.

The virtual volume control program 35 subsequently determines whether or not there are unused pages at the relocation destination (S87).

Upon obtaining an affirmative result in this determination, the virtual volume control program 35 changes the unused pages of the relocation destination to assigned pages (S88). The virtual volume control program 35 then implements page relocation processing and updates the number of pages in the relocation-complete page count field 44D in the Tier migration page management table 44 (see FIG. 14) after relocation is complete (S89).

The virtual volume control program 35 also changes the assigned pages of the relocation source to unused pages (S90). The virtual volume control program 35 subsequently updates the number of pages in the relocation-incomplete page count field 44C of the Tier migration page management table 44 (S91).

The virtual volume control program 35 determines whether or not relocation-incomplete pages still remain (S92).

Upon obtaining a negative result in this determination, the virtual volume control program 35 moves to step S82 and determines whether or not there is another virtual volume VVOL requiring relocation (S82), and terminates the page relocation processing when a negative result is obtained in this determination.

However, when an affirmative result is obtained in the determination of step S92, the virtual volume control program 35 moves to step S87 and repeats the above-described processing of steps S87 to S92 on the other pages.

Upon obtaining a negative result in the determination of step S87, the virtual volume control program 35 determines whether or not relocation-incomplete pages still remain (S93). In step S93, there are sometimes cases where, as a result of implementing the page relocation processing in steps S87 to S92, though there may be assigned pages before relocation is carried out, these pages are unused following the relocation. It is therefore determined once again in step S93 whether or not relocation-incomplete pages still remain.

Upon obtaining in affirmative result in this determination, the virtual volume control program 35 advances to step S87 and repeats the processing of steps S87 to S93 for the other pages.

When a negative result is obtained in the determination of step S93, the virtual volume control program 35 compares the number of relocation-incomplete pages temporarily stored in the memory 32 or the like in step S87 with the current number of relocation-incomplete pages and determines whether or not there is any difference (S94).

Upon obtaining an affirmative result in this determination, the virtual volume control program 35 advances to step S81 and determines whether or not there are once again relocation-incomplete pages. That is, the virtual volume control program 35 performs relocation (S88 to S92) when there are relocation-incomplete pages (S81; Y), and if, as a result of implementing relocation on all the pages (S93; N), there is a difference between the number of relocation-incomplete pages temporarily stored in the memory 32 or the like prior to performing relocation (S86) and the current number of relocation-incomplete pages (S94: Y), the virtual volume control program 35 determines that relocation can be performed once again and carries out relocation. When there are no relocation-incomplete pages (S81; N) and a negative result is obtained in the determination of step S82, the virtual volume control program 35 then performs this page relocation processing.

If, on the other hand, a negative result is obtained in the determination of step S94, the virtual volume control program 35 issues a warning (S95), and terminates the page relocation processing. That is, the virtual volume control program 35 performs relocation (S88 to S93; Y) if there are relocation-incomplete pages (S81; Y) and if, as a result of performing relocation on all the pages (S93; N), there is a difference between the number of relocation-incomplete pages temporarily stored in the memory 32 or the like before relocation (S86) and the current number of relocation-incomplete pages (S94; N), the virtual volume control program 35 determines that, although there are relocation-incomplete pages, relocation cannot be performed beyond the existing relocation-incomplete pages and issues a warning. After issuing the warning (S95), if there are other virtual volumes VVOL requiring relocation (S82; N), the virtual volume control program 35 terminates this page relocation processing.

(4-3-4) Performance/Cost Level Warning Processing

Figure 37A:
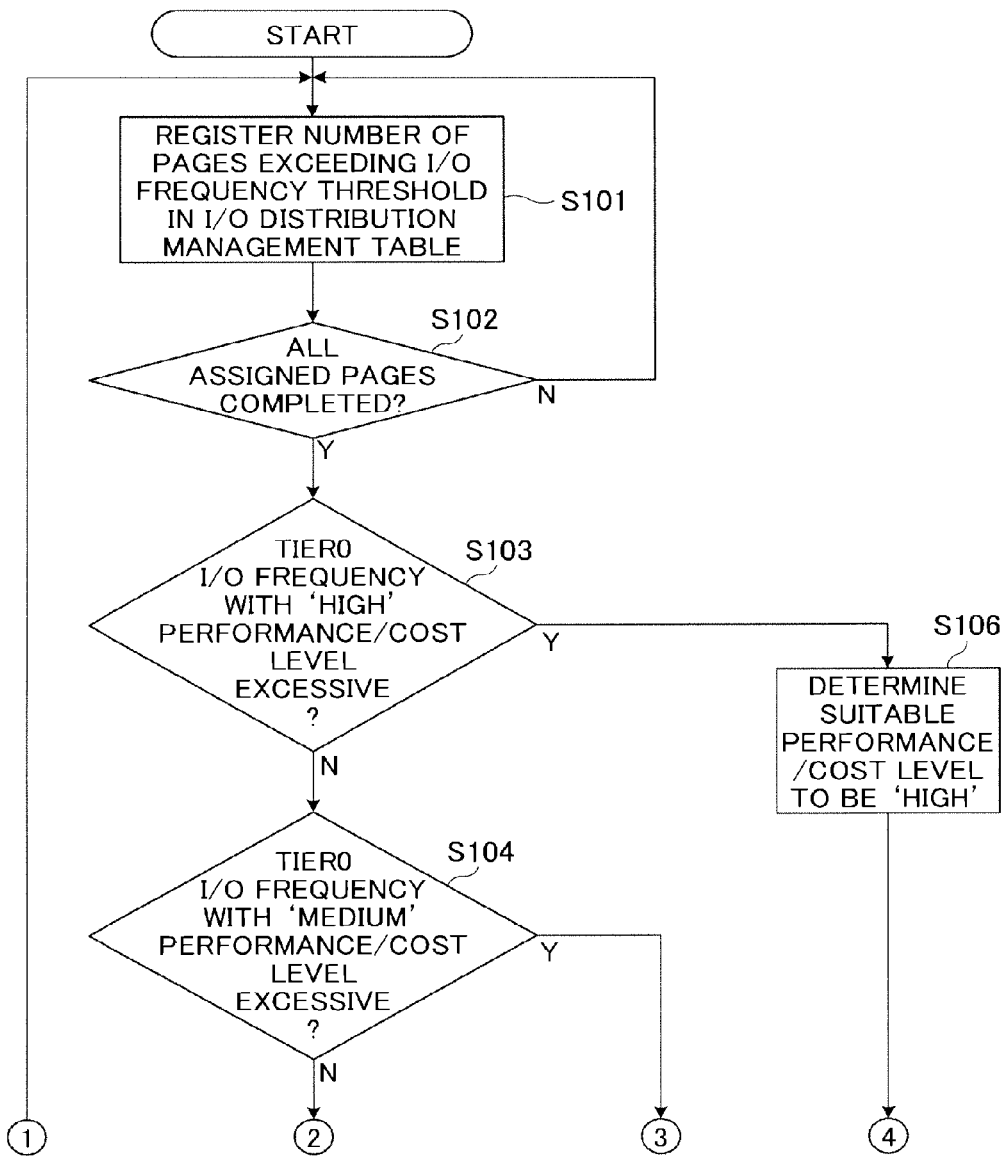
FIG. 37A is a flowchart showing a processing routine for performance/cost level warning processing.
Figure 37B:
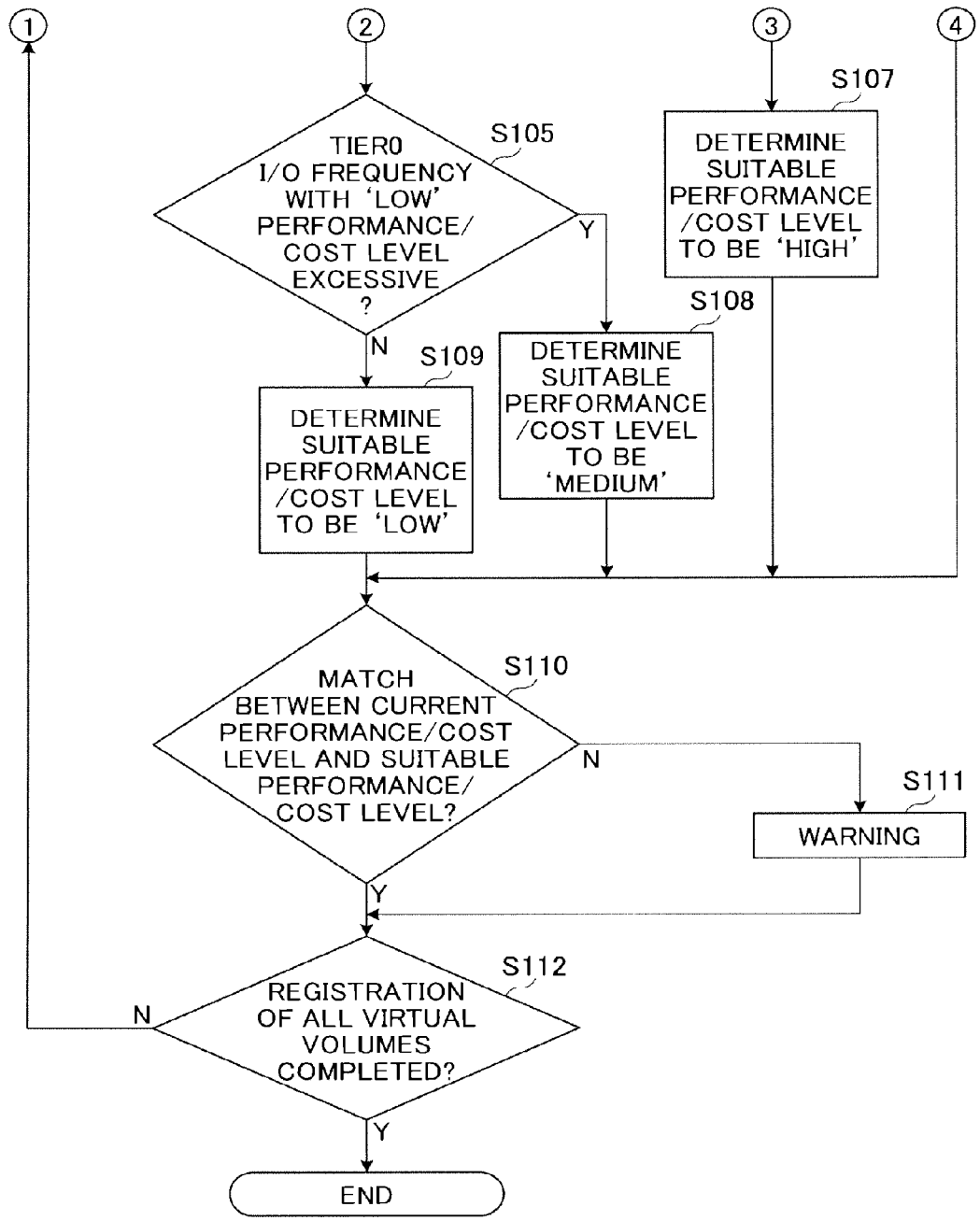
FIG. 37B is a flowchart showing a processing routine for performance/cost level warning processing.

FIG. 37 shows a processing routine for warning processing for the performance/cost level which is executed by the virtual volume control program 35 (see FIG. 4) of the storage apparatus 5D in association with the data management method according to this embodiment. The virtual volume control program 35 starts the performance/cost level warning processing when correcting the currently configured performance/cost level at regular or irregular intervals according to a schedule.

The virtual volume control program 35 first creates a new row (entry) in the I/O distribution management table 46 (see FIG. 33) and stores the volumes ID of the virtual volumes VVOL targeted for performance/cost level warning processing in the virtual volume ID field 45A in the entry thus created. The virtual volume control program 35 determines whether or not, in all cases (high, medium and low here) of performance/cost levels for these virtual volumes VVOL, the I/O frequency of the assigned pages exceeds the I/O frequency threshold, and if this threshold is exceeded, counts the number of pages exceeding the threshold. The virtual volume control program 35 then stores the number of pages counted in the I/O threshold-exceeding page count field 46B of the I/O distribution management table 46 (S101).

The virtual volume control program 35 determines whether or not the processing of this step S101 is complete for all the assigned pages in the virtual volume VVOL (S102).

Upon obtaining a negative result in this determination, the virtual volume control program 35 moves to step S101 and repeats the loop of steps S101 to S102 until the processing is complete for all the assigned pages.

However, if an affirmative result is obtained in the determination of step S102, the virtual volume control program 35 makes the determinations of steps S103 to S105 based on the I/O distribution management table 46 (see FIG. 33) and Tier management table 421 (see FIG. 32).

In other words, the virtual volume control program 35 determines whether or not the I/O distribution value of the first storage tier ST for a case where the performance/cost level is configured as 'high' exceeds the usage ratio of the first storage tier ST (S103).

In addition, the virtual volume control program 35 determines whether or not the I/O distribution value for the first storage tier ST for a case where the performance/cost level is configured as 'medium' exceeds the usage ratio of the first storage tier ST (S104).

Furthermore, the virtual volume control program 35 determines whether or not the I/O distribution value for the first storage tier ST for a case where the performance/cost level is configured as 'low' exceeds the usage ratio of the first storage tier ST (S105).

If an affirmative result is obtained in both of the determinations of steps S103 and S104, the virtual volume control program 35 determines a suitable performance/cost level to be 'high' (S106, S107).

When, on the other hand, a negative result is obtained in both of the determinations of steps S103 and S104 and an affirmative result is obtained in the determination of step S105, the virtual volume control program 35 determines a suitable performance/cost level to be 'medium' (S108).

Upon obtaining a negative result in both of the determinations of steps S103 to S105, the virtual volume control program 35 determines a suitable performance/cost level to be 'low' (S109).

The virtual volume control program 35 determines whether or not there is a match between the performance/cost level currently configured by the system administrator and the suitable performance/cost level determined in steps S106 to S108 above (S110).

Upon obtaining a negative result in this determination, the virtual volume control program 35 issues a warning to the effect that the currently configured performance/cost level is unsuitable (S111).

However, if an affirmative result is obtained in the determination of step S110, the virtual volume control program 35 determines whether or not registration in the I/O distribution management table 46 is complete for all the virtual volumes VVOL (S112).

Upon obtaining a negative result in this determination, the virtual volume control program 35 determines that there is another virtual volume VVOL to be registered in the I/O distribution management table 46 and advances to step S101, and repeats the loop of steps S101 to S112 until registration is complete for all the virtual volumes VVOL.

However, upon obtaining an affirmative result in the determination of step S112, the virtual volume control program 35 terminates the performance/cost level warning processing.

(4-4) Effect of the Embodiment

According to the embodiment as described above, the first to third storage tiers ST can be managed with the ratios left unchanged. Page relocation processing can also be implemented by considering the I/O frequency threshold. It is also possible to determine whether or not the performance/cost level chosen by the system administrator is suitable and if not suitable, issue a report to that effect. In comparison with the computer system according to the first embodiment, this embodiment affords a system build which tracks an actual operation.

(5) Fifth Embodiment (5-1) Computer System Configuration

In FIG. 1, 1E represents a computer system 1E according to a fifth embodiment. The computer system 1E is configured in the same way as the computer system 1A according to the first embodiment except for the fact that is also possible to change the configuration of the fourth embodiment and the I/O frequency threshold.

Figure 38:
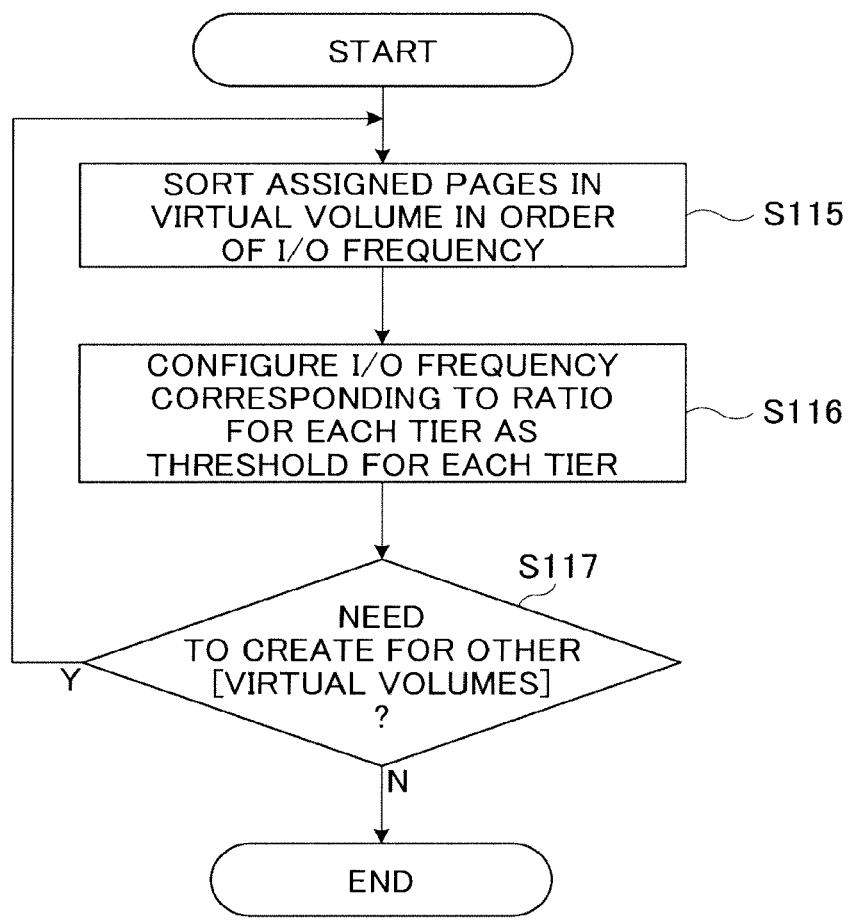
FIG. 38 is a flowchart showing a processing routine for the I/O frequency threshold management table creation processing.

(5-2) Various Processing (5-2-1) First I/O Frequency Threshold Management Table Creation Processing FIG. 38 shows a processing routine for first I/O frequency threshold management table creation processing which is executed by the virtual volume control program 35 (see FIG. 4) of a storage apparatus 5E in association with the data management method according to this embodiment. The virtual volume control program 35 performs page relocation processing for migrating data which is stored on pages assigned to logical blocks of virtual volumes VVOL between storage tiers ST at regular or irregular intervals according to a schedule but here the virtual volume control program 35 refers to the first I/O frequency threshold management table 45 (see FIG. 31). The virtual volume control program 35 stores information which is required in the first I/O frequency threshold management table 45 which is referred to when this page relocation processing is performed, and hence executes the first I/O frequency threshold management table creation processing shown in FIG. 38.

In reality, the user or system administrator is able to create this schedule by operating the host computer 3 or management computer 4A and is able to configure this schedule for the storage apparatus 5E. Thereafter, the virtual volume control program 35 of the storage apparatus 5E continually monitors this schedule and ultimately starts the first I/O frequency threshold management table creation processing shown in FIG. 38 before the timing for executing the page relocation processing.

The virtual volume control program 35 refers to the access frequency management table 43 (see FIG. 13) and sorts the assigned pages in the virtual volumes VVOL in order of I/O frequency (S115).

The virtual volume control program 35 subsequently refers to the Tier ratio management table 40 (see FIG. 10) and configures the I/O frequency corresponding to the ratio of each of the storage tiers ST as the I/O frequency threshold for each storage tier ST and stores the I/O frequency threshold in the threshold field 45B of the I/O frequency threshold management table 45 (S116).

The virtual volume control program 35 determines whether or not it is necessary to create the I/O frequency threshold management table 45 for other virtual volumes VVOL (S117).

Upon obtaining an affirmative result in this determination, the virtual volume control program 35 moves to step S115 and repeats the loop of the above steps S115 to S117 until the additional creation of I/O frequency threshold management tables 45 is complete.

If, on the other hand, a negative result is obtained in the determination of step S117, the virtual volume control program 35 terminates the first I/O frequency threshold management table creation processing.

(5-2-2) I/O Frequency Threshold Management Table Creation Processing

Figure 39:
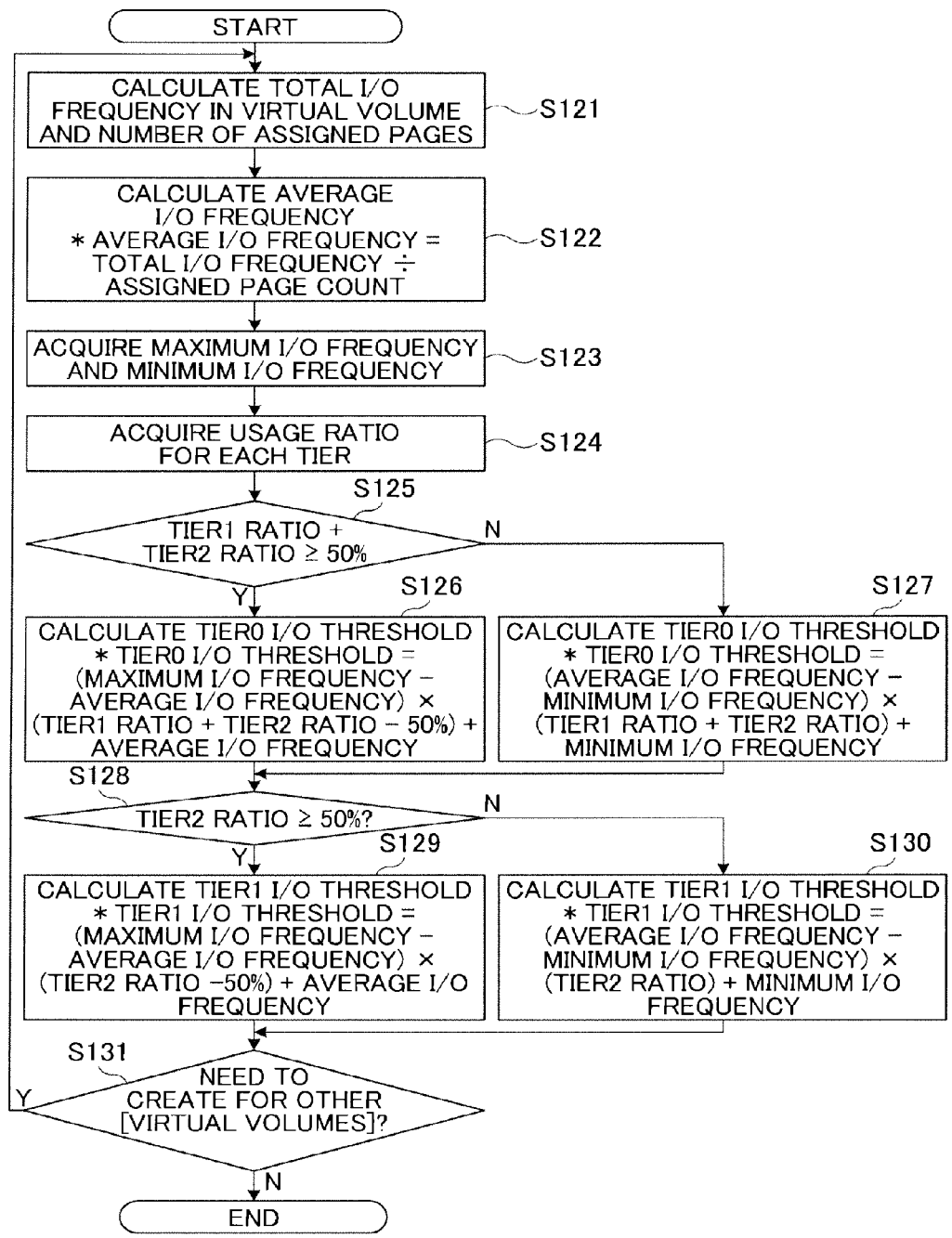
FIG. 39 is a flowchart showing a processing routine for the I/O frequency threshold management table creation processing.

Next, FIG. 39 shows a configuration example of the first I/O frequency threshold management table creation processing shown in FIG. 38 and represents a processing routine for second I/O frequency threshold management table creation processing which is executed by the virtual volume control program 35 (see FIG. 4) of the storage apparatus 5E.

The virtual volume control program 35 refers to the access frequency management table 43 (FIG. 13) and calculates the total I/O frequency and the number of assigned pages in the virtual volume VVOL (S121).

The virtual volume control program 35 then calculates the average I/O frequency (S122). The 'average I/O frequency' is calculated as total I/O frequency/number of assigned pages. The virtual volume control program 35 also refers to the access frequency management table 43 and acquires the maximum I/O frequency and minimum I/O frequency of the assigned page (S123). Moreover, the virtual volume control program 35 refers to the Tier ratio management table 40 (see FIG. 10) and acquires the usage ratios of each of the storage tiers ST (S124).

The virtual volume control program 35 determines whether or not 'Tier1 ratio'+'Tier2 ratio' is 50% or more (S125).

Upon obtaining an affirmative result in this determination, the virtual volume control program 35 computes the I/O threshold for the first storage tier ST as I/O frequency=(maximum I/O frequency−average I/O frequency)*(Tier1 ratio+Tier2 ratio−50%)+average I/O frequency (S126).

When a negative result is obtained in the determination of step S125, the virtual volume control program 35 computes the I/O threshold for the first storage tier ST as I/O frequency=(average I/O frequency−minimum I/O frequency)*(Tier1 ratio+Tier2 ratio)+minimum I/O frequency (S127).

In addition, the virtual volume control program 35 determines whether or not 'Tier2 ratio' is 50% or more (S128).

Upon obtaining an affirmative result in this determination, the virtual volume control program 35 computes the I/O frequency for the second storage tier ST as I/O frequency=(maximum I/O frequency−average I/O frequency)*(Tier2 ratio−50%)+average I/O frequency (S129).

If, on the other hand, a negative result is obtained in the determination of step S128, the virtual volume control program 35 computes the I/O frequency for the second storage tier ST as I/O frequency=(average I/O frequency−minimum I/O frequency)*(Tier2 ratio)+minimum I/O frequency (S130).

The virtual volume control program 35 determines whether or not it is necessary to create an I/O frequency threshold management table 45 for other virtual volumes VVOL (S131).

Upon obtaining an affirmative result in this determination, the virtual volume control program 35 returns to step S121 and creates an I/O frequency threshold management table 45 for other virtual volumes.

If, on the other hand, a negative result is obtained in the determination of step S131, the virtual volume control program 35 terminates the second I/O frequency threshold management table creation processing.

(5-3) Effect of the Embodiment

As mentioned earlier, with this embodiment, the I/O frequency threshold management table 45 (see FIG. 31) can be dynamically changed and a system build which is better suited to the requirements of the system administrator and the actual operation can be made in comparison with the computer systems 1A and 1D of the first and fourth embodiments.

(6) Sixth Embodiment

(6-1) Computer System Configuration

In FIG. 1, 1F represents a computer system 1F according to a sixth embodiment. The computer system 1E is configured in the same way as the computer system 1A according to the first embodiment except for the fact it is possible to configure the first storage tier ST with an upper limit value when implementing page relocation processing to migrate data between the first to third storage tiers ST for the virtual volumes VVOL defined in the storage apparatus 5E.

(6-2) Various Processing

(6-2-1) Write Processing According to Sixth Embodiment

Figure 40:
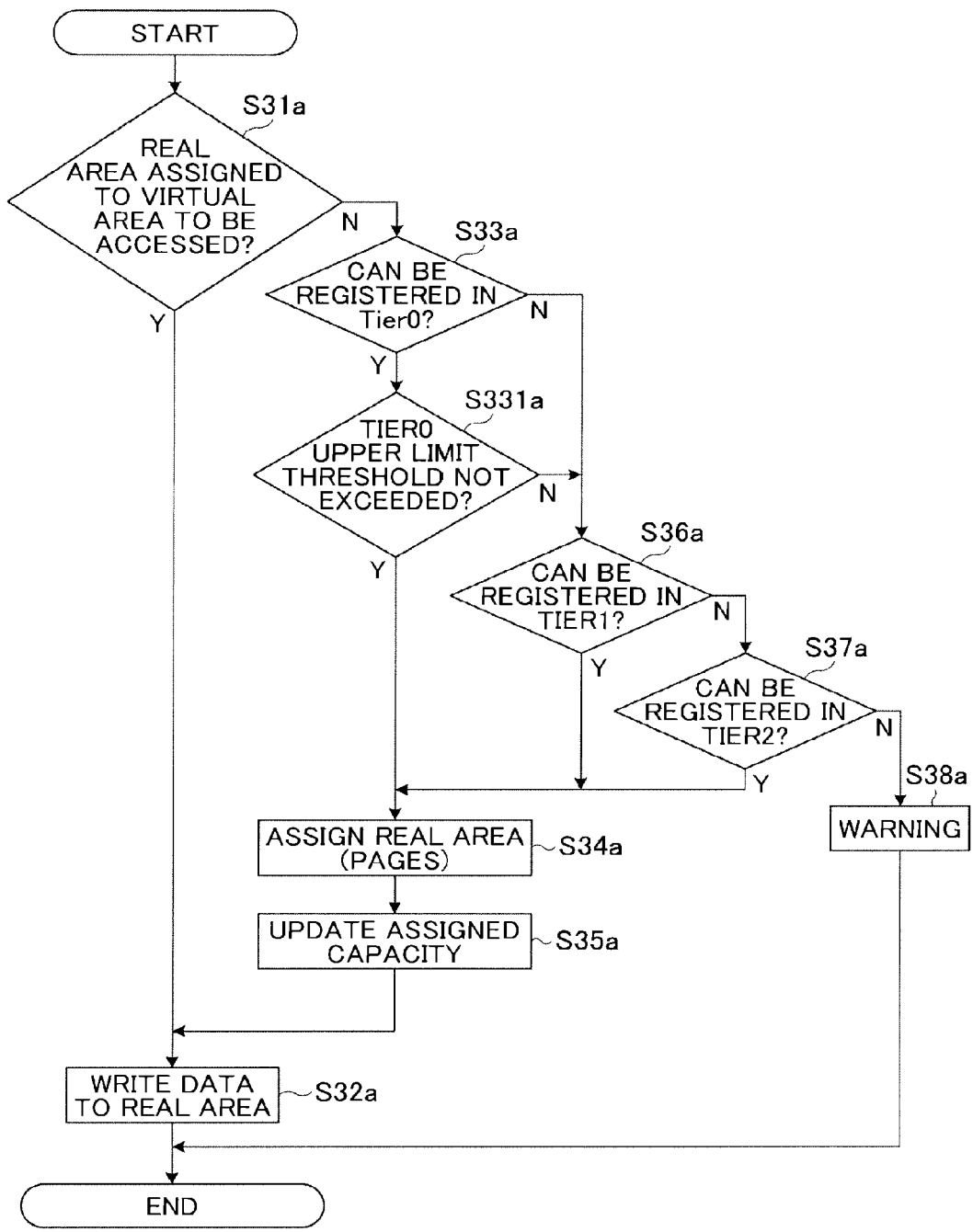
FIG. 40 is a flowchart showing the processing routine for write processing.

FIG. 40 shows a processing routine for write processing which is executed by the virtual volume control program 35 (see FIG. 4) of the storage apparatus 5F. The virtual volume control program 35 starts the write processing upon receiving a data write request from the host computer 3 to write to the storage apparatus 5F at regular or irregular intervals. In addition, in this write processing, the virtual volume control program 35 updates assigned capacities stored in the assigned capacity threshold 42F of the Tier management table 42.

First, upon receiving a data write request from the host computer 3, the virtual volume control program 35 determines whether or not a real area is assigned to the virtual area accessed by the write request (S31*a*).

That is, the virtual volume control program 35 determines whether or not pages have been assigned to logical blocks of the virtual volume VVOL from any of the storage tiers ST of the first to third storage tiers ST.

Upon obtaining an affirmative request in this determination, the virtual volume control program 35 writes data to the page which is the real area (S32*a*) and terminates the write processing.

If, on the other hand, a negative result is obtained in the determination of step S31*a*, the virtual volume control program 35 determines whether or not pages can be assigned from the first storage tier ST (Tier0). (S33*a*).

Here, in order to determine whether or not pages can be assigned from the first storage tier ST, the virtual volume control program 35 performs Tier registration determination processing (see FIG. 20). When an affirmative result is obtained in the determination of step 33*a*, the virtual volume control program 35 determines whether or not the upper limit threshold for the first threshold has not been exceeded (S331*a*).

Upon obtaining an affirmative result in this determination, the virtual volume control program 35 assigns pages from the first storage tier ST (S34*a*) and updates the assigned capacity field 42F of the Tier management table 42 (see FIG. 12) (S35*a*). The virtual volume control program 35 subsequently writes data to the pages assigned from the first storage tier ST (S32*a*) and terminates the write processing.

However, when a negative result is obtained in the determination of step S33*a* or when a negative result is obtained in the determination of step S331*a*, the virtual volume control program 35 performs Tier registration determination processing (see FIG. 20) and determines whether or not pages can be assigned from the second storage tier ST (S36*a*).

Upon obtaining an affirmative result in this determination, the virtual volume control program 35 assigns pages from the second storage tier ST (S34*a*) and updates the assigned capacity field F in the Tier management table 42 (see FIG. 12) (S35*a*). The virtual volume control program 35 then writes data to the pages assigned from the second storage tier ST (S32*a*) and terminates the write processing.

If, however, a negative result is obtained in the determination of step S36*a*, the virtual volume control program 35 performs Tier registration determination processing (see FIG. 20) and determines whether or not pages can be assigned from the third storage tier ST (S37*a*).

Upon obtaining an affirmative result in this determination, the virtual volume control program 35 assigns pages from the third storage tier ST (S37*a*) and updates the assigned capacity field 42F of the Tier management table 42 (see FIG. 12) (S35*a*). The virtual volume control program 35 writes the data to the pages assigned from the third storage tier ST (S32*a*) and terminates the write processing.

If, however, a negative result is obtained in the determination of step S37*a*, the virtual volume control program 35 issues a warning to the effect that pages cannot be assigned from any of the storage tiers ST among the first to third storage tiers ST (S38*a*). More specifically, the virtual volume control program 35 issues a warning to the host computers 3 to the effect that data cannot be written to the virtual volume VVOL.

The virtual volume control program 35 then accordingly terminates the write processing.

(6-2-2) Page Relocation Processing According to the Sixth Embodiment

Figure 41A:
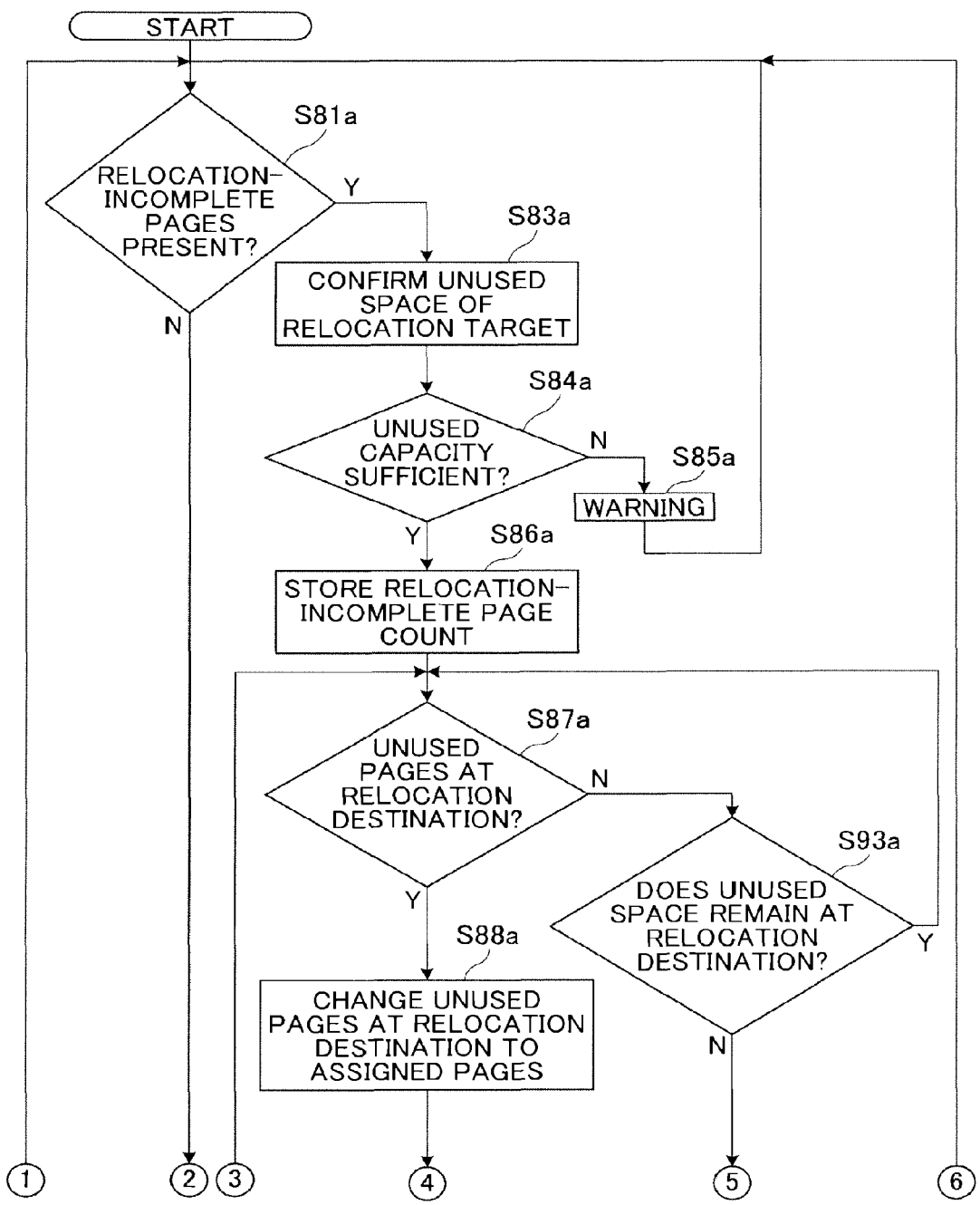
FIG. 41A is a flowchart showing the processing routine for page relocation processing.

FIG. 41 shows a processing routine for page relocation processing which is executed by the virtual volume control program 35 (see FIG. 4) of the storage apparatus 5F in association with the data management method according to this embodiment. The virtual volume control program 35 executes this page relocation processing when data stored on the pages assigned to the logical blocks in the virtual volume VVOL is migrated between storage tiers ST at regular or irregular intervals according to a schedule.

In reality, the user or system administrator is able to create this schedule by operating the host computer 3 or management computer 4 and is able to configure the schedule in the storage apparatus 5F. The virtual volume control program 35 of the storage apparatus 5F then continually monitors this schedule and ultimately starts the page relocation processing shown in FIG. 41 according to the timing for executing the page relocation processing.

The virtual volume control program 35 first refers to the relocation-incomplete page count field 44C of the Tier migration page management table 44 (see FIG. 14) and determines whether there is a page for which relocation is incomplete among the pages assigned to the virtual volume VVOL which is targeted for page relocation processing (S81a).

Upon obtaining a negative result in this determination, the virtual volume control program 35 determines that there is no need to perform page relocation processing for this virtual volume VVOL and determines whether or not there is another virtual volume VVOL requiring page relocation processing (S82a).

Upon obtaining a negative result in this determination, the virtual volume control program 35 determines whether or not the capacity of the first storage tier ST has not been exceeded (S821a), and when an affirmative result is obtained in this determination, the virtual volume control program 35 terminates the page relocation processing. If, however, a negative result is obtained in the determination of step S821a, the virtual volume control program 35 issues a warning to the effect that it is necessary to add an SSD storage device 30 to provide the first storage tier ST (S822a) and terminates the page relocation processing.

If, however, an affirmative result is obtained in the determination of step S82a, the virtual volume control program 35 moves to step S81a.

Returning to step S81a, upon obtaining an affirmative result in the determination of step S81a, the virtual volume control program 35 refers to the pool capacity management table 41 (see FIG. 11), checks the unused capacity (number of unused pages) targeted for relocation (S83a), and determines whether or not there is sufficient unused capacity in the storage tier ST targeted for relocation (S84a).

Upon obtaining a negative result in the determination, the virtual volume control program 35 issues a warning to the effect that there is insufficient unused capacity (S85a).

If, however, an affirmative result is obtained in the determination of step S84a, the virtual volume control program 35 temporarily stores the number of relocation-incomplete pages in the memory 32 or the like (S86a). Here, if the number of relocation-incomplete pages is '1000' pages, for example, the virtual volume control program 35 stores the value '1000' in the memory 32 or the like.

The virtual volume control program 35 determines whether or not there are unused pages at the relocation destination (S87a).

Upon obtaining an affirmative result in this determination, the virtual volume control program 35 changes the unused pages at the relocation destination to assigned pages (S88a). The virtual volume control program 35 subsequently implements page relocation and updates the number of pages in the relocation complete page count field 44D of the Tier migration page management table 44 (see FIG. 14) following relocation completion (S89a).

The virtual volume control program 35 also changes the assigned pages at the relocation source to unused pages (S90a). The virtual volume control program 35 then updates the number of pages in the relocation-incomplete page count field 44C of the Tier migration page management table 44 (S91a).

The virtual volume control program 35 determines whether or not relocation-incomplete pages still remain (S92a).

Upon obtaining a negative result in this determination, the virtual volume control program 35 moves to step S82a and determines whether or not there is another virtual volume VVOL requiring relocation (S82a), and when a negative result is obtained in this determination and when an affirmative result is obtained as a result of determining whether the capacity threshold for the first storage tier ST has not been exceeded (S821a), the virtual volume control program 35 terminates the page relocation processing.

If, however, an affirmative result is obtained in the determination of step S92a, the virtual volume control program 35 moves to step S87a and repeats the above-described processing of steps S87a to S92a for the other pages.

If a negative result is obtained in the determination of step S87a, the virtual volume control program 35 determines whether or not relocation-incomplete pages still remain (S93a). In step S93a, there are sometimes cases where, as a result of implementing the page relocation of steps S87a to S92a, though there may be assigned pages before relocation is carried out, these pages are unused following the relocation. It is therefore determined once again in step S93a whether or not relocation-incomplete pages still remain.

Upon obtaining in affirmative result in this determination, the virtual volume control program 35 advances to step S87a and repeats the processing of steps S87a to S93a for the other pages.

When a negative result is obtained in the determination of step S93a, the virtual volume control program 35 compares the number of relocation-incomplete pages temporarily stored in the memory 32 or the like in step S87a with the current number of relocation-incomplete pages and determines whether or not there is any difference (S94a).

Upon obtaining an affirmative result in this determination, the virtual volume control program 35 advances to step S81a and determines whether or not there are once again relocation-incomplete pages. That is, the virtual volume control program 35 performs relocation (S88a to S92a) when there are relocation-incomplete pages (S81a; Y), and if, as a result of implementing relocation on all the pages (S93a; N), there is a difference between the number of relocation-incomplete pages temporarily stored in the memory 32 or the like prior to performing relocation (S86a) and the current number of relocation-incomplete pages (S94a; Y), the virtual volume control program 35 determines that relocation can be performed once again and carries out relocation. When there are no relocation-incomplete pages (S81a; N), a negative result is obtained in the determination of step S82a, and an affirmative result is obtained in the determination of step S821a, the virtual volume control program 35 then terminates this page relocation processing.

Meanwhile, upon obtaining a negative result in the determination of step S94a, the virtual volume control program 35 issues a warning (S95a) and terminates the page relocation processing. That is, the virtual volume control program 35 performs relocation (S88a to S93a; Y) when there are relocation-incomplete pages (S81a; Y) and unless, as a result of performing relocation on all the pages (S93a; N), there is a difference between the number of relocation-incomplete pages temporarily stored in the memory 32 or the like prior to performing relocation (S86a) and the current number of relocation-incomplete pages (S94: N), the virtual volume control program 35 determines that, although there are relocation-incomplete pages, relocation cannot be performed beyond the existing relocation-incomplete pages and issues a warning. After issuing the warning (S95a), if a negative result is obtained in the determination of step S82a and an affirmative result is obtained in the determination of step S821a, the virtual volume control program 35 then terminates this page relocation processing.

(6-3) Effect of the Embodiment

As mentioned earlier, with this embodiment, upper limit values can be provided in the first storage tier ST. Accordingly, even in cases where the usage ratios for the first to third storage tiers ST chosen by the system administrator are slightly excessive, as long as these usage ratios lie within the scope of the upper limit value, the operation can be performed flexibly.

(7) Seventh Embodiment

(7-1) Computer System Configuration

In FIG. 1, 1G represents a computer system 1G according to a seventh embodiment. The computer system 1G is configured in the same way as the computer system 1A according to the first embodiment except for the fact it is possible to change the I/O frequency threshold when the first storage tier ST exceeds the threshold when data is migrated between the first to third storage tiers ST for the performance/cost levels of the virtual volumes VVOL created in a storage apparatus 5G.

(7-2) Hierarchical-Type Data Management Method

(7-2-1) Tier Ratio Management Table According to the Seventh Embodiment

The Tier ratio management table 401 is a table for managing combinations of usage ratios for each of the storage tiers ST for each performance/cost level and, as shown in FIG. 42, is configured from a performance/cost level field 401A, a usage ratio field 401B of each storage tier ST and a Tier0 upper limit ratio field 401C.

The performance/cost level field 401A stores the performance/cost level types (high, medium or low here), and the usage ratio field 401B for each storage tier ST stores, for each type of performance/cost level, the usage ratios of each of the storage tiers ST of predefined combinations. Furthermore, the Tier0 upper limit ratio field 401C stores the upper limit ratio for the first storage tier ST.

Note that here the Tier ratio management table 401 is configured provided with a Tier0 upper limit ratio field 401C but is not limited thereto; rather, a configuration that also includes a Tier1 upper limit ratio field and/or Tier 2 upper limit ratio field is also possible.

Furthermore, 75%, 36%, 10% . . . are configured as fixed values in the Tier0 upper limit ratio field 401C but values are not limited to these percentages; any values desired by the system administrator may also be configured.

Hence, in the case of FIG. 42, it can be seen that the usage ratios of each of the storage tiers ST with a 'high' performance/cost level, for example, have been chosen as '50%' for the usage ratio of the first storage tier ST, '40%' for the usage ratio of the second storage tier ST, and '10%' for the usage ratio of the third storage tier ST, and that the upper limit ratio for the first storage tier ST has been chosen to be '75%.'

(7-2-2) Virtual Volume Creation Management Table According to the Seventh Embodiment The virtual volume creation management table 393 is a table for managing, in the storage apparatus 5G, virtual volumes VVOL whose creation is instructed by the system administrator via the virtual volume creation screen displayed on the management computer 4G and, as shown in FIG. 43, the virtual volume creation management table 393 is configured from a virtual volume ID field 393A, a capacity field 393B, a pool ID field 393C, a threshold field 393D, and a usage ratio field 393E and a Tier0 upper limit ratio field 393F.

The virtual volume ID field 393A, capacity field 393B, pool ID field 393C, threshold field 393D, and usage ratio field 393E contain the same various information which is stored in the virtual volume ID field 392A, threshold field 392B, pool ID field 392C, threshold field 392D, and usage ratio field 392E in the virtual volume creation management table 392 according to the fourth embodiment and will not be described here. The Tier0 upper limit ratio field 393F stores the upper limit ratio of the first storage tier ST. Note that here the virtual volume creation management table 393 is configured comprising a Tier0 upper limit ratio field 393F but is not limited to this configuration; rather, the configuration may also include a Tier1 upper limit ratio field and/or Tier2 upper limit ratio field.

Hence, in the case of FIG. 43, it can be seen that, in the storage apparatus 5G, the virtual volume VVOL 'v101,' for example, has a capacity of '10 GB' and is associated with a virtual volume pool VVP 'Pool': It can also be seen that the virtual volume VVOL 'v101' is configured with a threshold of '8 GB,' and that the usage ratios of each of the storage tiers ST associated with this virtual volume VVOL are configured as '50%' for the first storage tier ST ('Tier0'), '40%' for the second storage tier ST ('Tier1'), and '10%' for the third storage tier ST ('Tier2'). It can also be seen that an upper limit ratio of '75%' for the first storage tier ST is provided in the virtual volume VVOL 'v101.'

(7-3) Access Frequency Management Table Creation Processing According to the Seventh Embodiment FIG. 44 shows a processing routine for access frequency management table creation processing which is executed by the virtual volume control program 35 (see FIG. 4) of the storage apparatus 5G in association with the data management method according to this embodiment. The virtual volume control program 35 of the storage apparatus 5G performs page relocation processing for migrating data, which is stored on the pages assigned to the logic blocks in the virtual volume VVOL, between storage tiers ST at regular or irregular intervals according to the schedule, referring at this time to the access frequency management table 43 (see FIG. 13) and the Tier migration page management table 44 (see FIG. 14). The virtual volume control program 35 executes access frequency management table creation processing which is shown in FIG. 44 in order to store information required in the access frequency management table 43 which is referred to when page relocation processing is performed.

In reality, the user or system administrator is able to create this schedule by operating the host computer 3 or management computer 4G and is able to configure this schedule for the storage apparatus 5G. The virtual volume control program 35 of the storage apparatus 5G continually monitors this schedule and ultimately starts the access frequency management table creation processing shown in FIG. 44 before the timing for executing the data migration processing.

First, the virtual volume control program 35 creates a new row (entry) in the access frequency management table 43 (see FIG. 13) and, among each of the fields of the created entry (the virtual volume ID field 43A, the pool ID field 43B, the assigned LBA field 43C, the page ID field 43D, the I/O frequency field 43E, the Tier field 43F, and the migration destination Tier field 43G), stores the required information in all the fields (43A to 43F) excluding the migration destination Tier field 43G. Note that, here, the virtual volume control program 35 extracts the information required from the virtual volume requirement information, virtual volume-assignment pool page management table 36, pool-logical volume assignment management table 37, and the pool-logical volume information 38.

Further, the virtual volume control program 35 refers to the access frequency management table 43 (see FIG. 13) and acquires the storage tiers ST ('Tier') and 'I/O frequency' of assigned pages which are registered in the access frequency management table 43 (S71a).

The virtual volume control program 35 then refers to the I/O frequency threshold management table 45 (see FIG. 31) and acquires the 'I/O frequency threshold' for each of the storage tiers ST registered in the access frequency management table 43 (S72a).

Thereafter, the virtual volume control program 35 determines whether the I/O frequencies of pages assigned from the first storage tier ST acquired in step S71a are greater than the I/O frequency threshold of the first storage tier ST acquired in step S72a (S73a).

That is, the virtual volume control program 35 determines whether or not the I/O frequencies of pages assigned from Tier0 exceed the I/O frequency threshold.

Upon obtaining an affirmative result in this determination, the virtual volume control program 35 registers 'Tier0' in the migration destination Tier field 43G of the access frequency management table 43 corresponding to this page (S74a).

If, however, a negative result is obtained in the determination of step S73a, the virtual volume control program 35 determines whether or not the I/O frequencies of the pages assigned from the second storage tier ST acquired in step S71a are greater than the I/O frequency threshold of the second storage tier ST acquired in step S72a (S78a).

That is, the virtual volume control program 35 determines whether or not the I/O frequencies of pages which are assigned from Tier1 exceed the I/O frequency threshold.

Upon obtaining an affirmative result in this determination, the virtual volume control program 35 registers 'Tier1' in the migration destination Tier field 43G of the access frequency management table 43 which corresponds to these pages (S79a).

If, however, an affirmative result is obtained in the determination of step S78a, the virtual volume control program 35 registers 'Tier2' in the migration destination Tier field 43G in the access frequency management table 43 which corresponds to these pages (S80a).

The virtual volume control program 35 determines whether or not the comparison between the I/O frequency and I/O frequency threshold is complete for all the assigned pages (S75a).

That is, the virtual volume control program 35 determines whether or not the processing of the above-described steps S71a to S74a and S78a to 80a is complete for all the assigned pages.

Upon obtaining a negative result in this determination, the virtual volume control program 35 moves to step S71a and makes a comparison between the I/O frequencies and I/O frequency threshold for the other assigned pages.

If, however, an affirmative result is obtained in the determination of step S75a, the virtual volume control program 35 refers to the access frequency management table 43 thus created and updates the Tier migration page management table 44 (see FIG. 14) (S76a).

The virtual volume control program 35 subsequently refers to the assigned capacities of Tier management table 421 (see FIG. 32) and the number of pages to be migrated to Tier0 in the Tier migration page management table 44 (see FIG. 14) and calculates the usage ratios of the first storage tier ST following migration (S761a).

The virtual volume control program 35 determines whether or not the usage ratio of the first storage tier ST after migration exceeds an upper limit ratio for the first storage tier ST in the Tier ratio management table 401 (see FIG. 42) (S762a).

Upon obtaining a negative result in this determination, the virtual volume control program 35 determines whether or not registration of the access frequency management table 43 is complete for all the virtual volumes VVOL (S77a).

Upon obtaining a negative result in this determination, the virtual volume control program 35 determines that there are other virtual volumes VVOL registered in the access frequency management table 43 and moves to step S71a and repeats the above processing until registration is complete for all the virtual volumes VVOL.

If, however, an affirmative result is obtained in the determination of step S77a, the virtual volume control program 35 terminates the access frequency management table creation processing.

Returning to step S762a, upon obtaining an affirmative result in the determination of step S762a, the virtual volume control program 35 refers to the access frequency management table 43 and sorts the pages in the virtual volumes VVOL in order of I/O frequency (S763a).

The virtual volume control program 35 subsequently configures the I/O frequencies of the pages corresponding to the usage ratios of each of the storage tiers ST as the I/O frequency threshold value of each of the storage tiers ST (S764a).

The virtual volume control program 35 then moves to step S71a and repeats the above processing. Upon obtaining an affirmative result in the determination of step S77a, the virtual volume control program 35 terminates the access frequency management table creation processing.

(7-4) Effect of the Embodiment

As mentioned earlier, with this embodiment, if the access frequency of access by the host computer 3 to the first storage tier ST exceeds the upper limit ratio of the first storage tier ST, the I/O frequency values of each of the storage tiers ST can be changed flexibly. Thus, even in cases where the usage ratios for the first to third storage tiers ST chosen by the system administrator are slightly excessive, as long as these usage ratios lie within the scope of the upper limit value, the operation can be performed flexibly.

INDUSTRIAL APPLICABILITY

The present invention can be broadly applied to storage apparatuses of various configurations with a built-in hierarchical-type data management function.

REFERENCE SIGNS LIST 1A to 1G Computer system
3 Host computer
4A to 4G Management computer
5A to 5G Storage apparatus
20 Processor
21A Virtual volume creation program
30 Storage device
31 Controller
35 Virtual volume control program
36 Virtual volume-assignment pool page management table
37 Pool-logical volume assignment management table
38 Pool-logical volume information
39 Virtual volume creation management table
40 Tier ratio management table
41 Pool capacity management table
42 Tier management table
43 Access frequency management table
44 Tier migration page management table
50 Virtual volume creation screen
60 Virtual volume creation screen
70 Virtual volume creation screen
VVOL Virtual volume
VVP Virtual volume pool
PVOL Pool volume
ST Storage tier

The invention claimed is:

1. A storage apparatus coupled to a host computer, the storage apparatus comprising:
storage devices of a plurality of types of varying performance, each of the storage devices belonging to one tier of a plurality of tiers according to a type of the storage devices; and
a controller, which is communicably connected to an external terminal, wherein the controller is configured to:
manage the storage devices of a same type as storage tiers of the same type;
provide a virtual volume to the host computer;
allocate a storage area provided by the storage devices of the storage tiers to a page of the virtual volume;
manage a usage ratio of tiers indicated by the external terminal and predetermined for the virtual volume; and
determine locatable capacity of each storage tier for the virtual volume by using the usage ratio of tiers,
wherein the storage area allocated to the page is determined based on an access frequency related to the page, the usage ratio of tiers, and a RAID level indicated by the external terminal and predetermined for the virtual volume.

2. The storage apparatus according to claim 1, wherein the controller is further configured to:
manage the usage ratio of tiers for each virtual volume of a plurality of types; and
when the storage areas are assigned to the virtual volumes of the plurality of types, assign storage areas to the virtual volumes of a plurality of types on the basis of the usage ratio of tiers managed.

3. The storage apparatus according to claim 1, wherein the controller is further configured to:
determine whether or not there is storage area which can be assigned from the storage tiers of a plurality of types on the basis of the usage ratio of tiers;
when there is storage area which can be assigned from all the storage tiers of a plurality of types, assign storage area to the virtual volumes within a range for the usage ratio of tiers; and
when there is no assignable storage area in any of the storage tiers among the storage tiers of a plurality of types, report that there is insufficient capacity.

4. The storage apparatus according to claim 1, wherein the controller is further configured to:
manage the usage ratio of tiers according to a performance/cost level and assigns storage area to the virtual volume on the basis of the performance/cost level managed,
wherein the performance/cost level is a usage ratio of tiers based on any one combination of a plurality of combinations of usage ratio of tiers is determined beforehand.

5. The storage apparatus according to claim 1,
wherein the controller is further configured to assign storage area to the virtual volume on the basis of the usage ratio of tiers and RAID level indicated by the external terminal.

6. The storage apparatus according to claim 1, wherein, when, based on an access frequency by the host computer, data stored in a storage area assigned to the virtual volume is migrated between the storage tiers and the storage area where the data is stored is re-assigned, the controller is configured to reassign a storage area to the virtual volume on the basis of the usage ratio of tiers of the storage area.

7. The storage apparatus according to claim 1, wherein the controller is further configured to:
manage the usage ratio of tiers according to a performance/cost level;
determine whether or not the performance/cost level managed is suitable based on the access frequency by the host computer; and
when, as a result of this determination, the performance/cost level is not suitable, issue a warning to the effect that the currently managed performance/cost level is unsuitable.

8. A data management method for a storage apparatus coupled to a host computer, wherein the storage apparatus comprises storage devices of a plurality of types of varying performance, each of the storage devices belonging to one tier of a plurality of tiers according to a type of the storage devices, and a controller, which is communicably connected to an external terminal, the data management method comprising:
managing, by the controller, storage devices of the same type as storage tiers of the same type;
providing, by the controller, a virtual volume to the host computer;
allocating, by the controller, storage areas provided by the storage devices of the storage tiers to a page of the virtual volumes;
managing a usage ratio of tiers indicated by the external terminal and predetermined for the virtual volume; and determining locatable capacity of each storage tier for the virtual volume by using the usage ratio of tiers, wherein the storage area allocated to the page is determined based on an access frequency related to the page, the usage ratio of tiers, and a RAID level indicated by the external terminal and predetermined for the virtual volume.

9. The data management method according to claim 8, further comprising:

managing the usage ratio of tiers by managing the usage ratio of tiers for each of the virtual volumes of a plurality of types; and when storage area is assigned to the virtual volume of a plurality of types, assigning storage area to the virtual volumes of a plurality of types on the basis of the usage ratio of tiers managed.

10. The data management method according to claim 8, further comprising:

determining whether or not there is storage area assignable from the storage tiers of a plurality of types based on the usage ratio of tiers;

when there is assignable storage area in all of the storage tiers of a plurality of types, assigning storage area to the virtual volumes within a range of the usage ratio of tiers; and when there is no assignable storage area in any of the storage tiers among the storage tiers of a plurality of types, issuing a warning to the effect that there is insufficient capacity.

11. The data management method according to claim 8, wherein managing the usage ratio of tiers comprises managing the usage ratio of tiers and RAID level indicated by the external terminal, wherein the storage area is assigned to the virtual volume on the basis of the usage ratio of tiers and RAID level managed.

12. The data management method according to claim 8, further comprising:

when, on the basis of the access frequency by the host computer, data stored in a storage area assigned to the virtual volume is migrated between the storage tiers and the storage area storing the data is re-assigned, reassigning, by the controller, the storage area to the virtual volume on the basis of the usage ratio of tiers.

13. The data management method according to claim 8, further comprising:

managing the usage ratio of tiers according to a performance/cost level;

determining whether or not the performance/cost level managed is suitable based on the access frequency by the host computer; and when as a result of the determination, the performance/cost level is not suitable, issuing, by the controller, a warning to the effect that the currently managed performance/cost level is unsuitable.

\* \* \* \* \*